United States Patent
Imazaki et al.

(10) Patent No.: US 9,361,033 B2
(45) Date of Patent: Jun. 7, 2016

(54) COMPOUND STORAGE SYSTEM AND STORAGE CONTROL METHOD

(71) Applicant: Hitachi, Ltd., Tokyo (JP)

(72) Inventors: Miho Imazaki, Yokohama (JP); Shigeo Homma, Odawara (JP); Hiroaki Akutsu, Yokohama (JP); Yoshiaki Eguchi, Yokohama (JP); Akira Yamamoto, Sagamihara (JP); Junji Ogawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/645,024

(22) Filed: Mar. 11, 2015

(65) Prior Publication Data

US 2015/0186063 A1 Jul. 2, 2015

Related U.S. Application Data

(63) Continuation of application No. 13/980,234, filed as application No. PCT/JP2013/001841 on Mar. 18, 2013, now Pat. No. 9,003,087.

(51) Int. Cl.
*G06F 3/06* (2006.01)
*G06F 13/20* (2006.01)

(52) U.S. Cl.
CPC .............. *G06F 3/0619* (2013.01); *G06F 3/061* (2013.01); *G06F 3/067* (2013.01); *G06F 3/0631* (2013.01); *G06F 3/0635* (2013.01); *G06F 3/0647* (2013.01); *G06F 3/0665* (2013.01); *G06F 3/0689* (2013.01); *G06F 13/20* (2013.01)

(58) Field of Classification Search
None
See application file for complete search history.

(56) References Cited

U.S. PATENT DOCUMENTS

| | | | |
|---|---|---|---|
| 6,535,954 B2 | 3/2003 | Obara et al. | |
| 7,461,196 B2 | 12/2008 | Kawamura et al. | |
| 2011/0252214 A1* | 10/2011 | Naganuma | G06F 3/0607 711/170 |
| 2011/0307680 A1 | 12/2011 | Yamamoto | |
| 2012/0198190 A1 | 8/2012 | Hart et al. | |

FOREIGN PATENT DOCUMENTS

| | | |
|---|---|---|
| EP | 1 357 476 A2 | 10/2003 |
| EP | 1 727 033 A1 | 11/2006 |
| JP | 11-296313 | 10/1999 |
| JP | 2007-310495 A | 11/2007 |

OTHER PUBLICATIONS

Partial Search Report received in PCT/JP2013/001841 dated Sep. 4, 2013.

* cited by examiner

*Primary Examiner* — Scott Sun

(74) *Attorney, Agent, or Firm* — Foley & Lardner LLP

(57) ABSTRACT

A shared device unit, which comprises a storage device, is coupled to a plurality of storage systems. The shared device unit provides a plurality of storage areas, which are based on the storage device, to the plurality of storage systems. Each storage system stores allocation management information which comprises an ID of a storage area provided to thereof among the plurality of storage areas, and provides the storage area corresponded to the ID included in the allocation management information to the host computer coupled thereto among the plurality of host computers.

16 Claims, 42 Drawing Sheets

Host computer allocation management table

Host computer #0: default storage system #0

| Host LUN | Owner storage system # | Size |
|---|---|---|
| 0 | 0 | 500GB |

Host computer #1: default storage system #1

| Host LUN | Owner storage system # | Size |
|---|---|---|
| 3 | 1 | 300GB |
| 4 | 1 | 300GB |

Host computer #2: default storage system #2

| Host LUN | Owner storage system # | Size |
|---|---|---|
| 1 | 1 | 500GB |
| 2 | 2 | 300GB |

Storage system #1 allocation management information (100B)

Exclusive device unit management table (110)

| Host LUN (110a) | Internal LUN (110b) | Size (110c) | Parity Group# (110d) | RAID level (110e) | First physical address (110f) | Device unit # (110g) |
|---|---|---|---|---|---|---|
| 0 | 0 | 300 GB | 1 | RAID5 (4D+1P) | 0x00000600 | 1 |
| 1 | 1 | 300 GB | 1 | RAID5 (4D+1P) | 0x00000500 | 1 |

Fig. 7

Device management table (76)

Device unit #0 (160A)

| Parity Group# (160a) | RAID level (160b) | Device ID (160c) | Size (160d) |
|---|---|---|---|
| 0 | 5 (4D+1P) | 00-04 | 2000 GB |
| 1 | 5 (4D+1P) | 05-09 | 2000 GB |
| 2 | 5 (4D+1P) | 10-14 | 2000 GB |

⋮

Device unit #1 (160B)

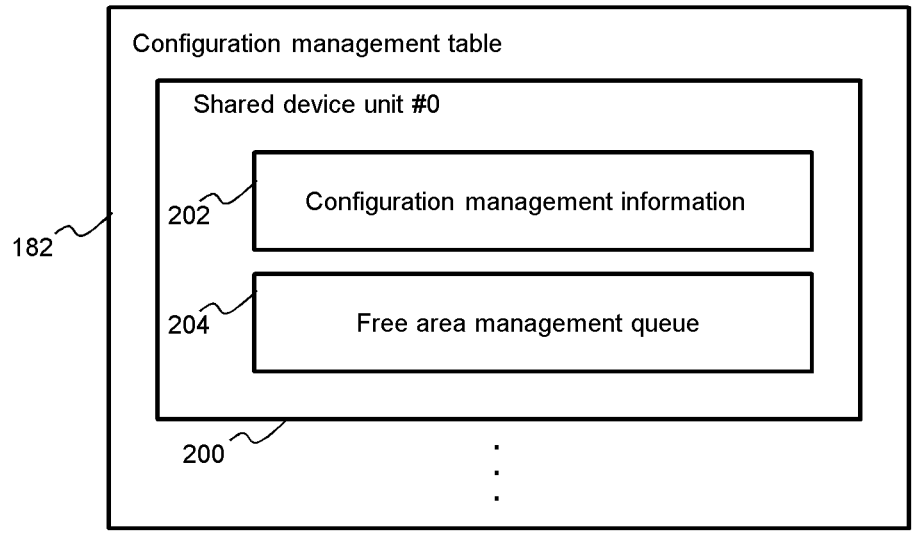

```
┌─────────────────────────────────────────────┐
│ Configuration management table              │
│   ┌───────────────────────────────────────┐ │
│   │ Shared device unit #0                 │ │
│   │   ┌─────────────────────────────────┐ │ │
│   │202│ Configuration management information│ │
│   │   └─────────────────────────────────┘ │ │
│182│                                       │ │
│   │   ┌─────────────────────────────────┐ │ │
│   │204│ Free area management queue       │ │
│   │   └─────────────────────────────────┘ │ │
│   └───────────────────────────────────────┘ │
│  200                  ⋮                     │
└─────────────────────────────────────────────┘
```

Fig. 11

Configuration management information

| Internal LUN (202a) | Storage system # (202b) |
|---|---|
| 0 | 0 |
| 1 | 1 |
| 2 | 2 |
| 3 | 0 |
| 4 | 2 |
| 5 | null |

Fig. 12

LUN management table

| Host LUN (102a) | Internal LUN (102b) | Size (102c) | Owner storage system # (102g) |
|---|---|---|---|
| 0 | 0 | 500 GB | 0 |
| 2 | 1 | 300 GB | 1 |
| 0 | 2 | 500 GB | 2 |

Virtual-logical translation table

| Page # (1076a) | Internal LUN (1076b) | Virtual address (1076c) | Pool # (1076d) | Parity Group # (1076e) | Physical address (1076f) |
|---|---|---|---|---|---|
| 1 | 0 | 0x0000 | 1 | 3 | 0x0040 |
| 2 | 0 | 0x0010 | 1 | 1 | 0x0050 |
| 3 | 1 | 0x0000 | 1 | 3 | 0x0020 |
| 4 | 1 | 0x0010 | 1 | 2 | 0x0040 |
| 5 | 1 | 0x0020 | 1 | 1 | 0x0010 |
| ... | ... | ... | ... | ... | ... |

| Granular monitoring table | | | |
|---|---|---|---|
| 1061a | 1061b | 1061c | 1061d |
| Page # | Internal LUN | Virtual address | Number of I/Os |
| 1 | 1 | 0x0000 | 1000 |
| 2 | 1 | 0x0010 | 200 |
| 3 | 2 | 0x0000 | 0 |
| 4 | 2 | 0x0010 | 0 |
| 5 | 2 | 0x0020 | 50 |
| ... | ... | ... | ... |

LUN management table: storage system #0

| Host LUN (1086a) | Internal LUN (1086b) | Size (1086c) |
|---|---|---|
| 2 | 1 | 300 GB |

Parity Group monitoring table

| Parity Group # (1080a) | Tier (1080b) | Pool# (1080c) |
|---|---|---|
| 1 | 0 | 1 |
| 2 | 1 | 1 |
| 0 | 2 | 1 |

Configuration management information (202')

Tier 1

| Parity Group # (1090a) | Page # (1090b) |
|---|---|
| 0 | 0 |
| 0 | 1 |
| 0 | 2 |

⋮

1090A

Tier 2

COMPOUND STORAGE SYSTEM AND STORAGE CONTROL METHOD

CROSS-REFERENCE TO RELATED PATENT APPLICATIONS

This application is a Continuation of U.S. application Ser. No. 13/980,234 (National Stage of PCT/JP2013/001841), filed Jul. 17, 2013, incorporated herein by reference in its entirety.

TECHNICAL FIELD

The present invention relates to storage control in a compound storage system (for example, a scale-out storage system), which is a system comprising a plurality of storage systems.

BACKGROUND ART

The development of high-speed storage devices, such as a SSD (Solid State Drive), a flash drive, and so forth, has made progress in recent years. A configuration for mounting a high-speed device in addition to a HDD (Hard Disk Drive), such as a SATA (Serial-ATA) disk and a SAS (Serial Attached SCSI) disk, is becoming widespread in storage systems. Device development will proceed ahead in the future as well, and the processing performance per device is on the rise.

For example, in a case where an extremely high-speed device like a flash drive is mounted in a storage system, there is the likelihood that the CPU processing performance in a single storage system will not be able to keep up with the processing performance of the flash drive, resulting in the storage system CPU performance becoming a bottleneck and making it impossible to fully utilize the flash drive resource. The high-speed device is generally more expensive than the HDD, raising a problem from the operating costs standpoint when it is not possible to make full use of the resource.

PTL 1 discloses a technology for alternating a volume, which is managed between disk control apparatuses, in accordance with the load on a disk control apparatus in a configuration that couples a plurality of disk control apparatuses to a plurality of disk drive apparatuses using either a network or a switch.

CITATION LIST

Patent Literature

[PTL 1]
Japanese Patent Application Laid-open No. H11-296313

SUMMARY OF INVENTION

Technical Problem

By using the technology disclosed in PTL 1, it is possible to alternate storage control apparatuses, which manage a volume created using a high-speed storage device, between storage control apparatuses in accordance with the load on the storage control apparatus. The mutual accommodation and allocation of a high-speed storage device area between a plurality of disk control apparatuses is performed under the control of a management-source apparatus, such as a route control apparatus or a host computer.

However, when a route control apparatus like a node through which passes an I/O (Input/Output) command sent from a host computer, or a host computer, which issues an I/O command, is used as the management-source apparatus, the management-source apparatus can become a bottleneck in either the issuing or flow of the I/O command.

This kind of problem is also possible in a case where the storage device inside a device unit (shared device unit), which is shared by a plurality of storage systems (for example, disk control apparatuses), is a low-speed storage device (for example, an ordinary HDD) rather than a high-speed storage device.

In addition, as one possible application, when the technology disclosed in PTL1 is also used in a configuration in which a plurality of hosts are coupled to a storage system, it is a problem from the standpoint of usability in that a user is able to view, on the system, a storage device area to which the user does not have access rights.

Solution to Problem

A shared device unit, which comprises a storage device, is coupled to a plurality of storage systems. A shared storage device provides the plurality of storage systems with a plurality of storage areas based on the storage device. Each storage system stores allocation management information which comprises an ID of a storage area provided to thereof among the plurality of storage areas, and provides the storage area corresponded to the ID included in the allocation management information to the host computer coupled thereto among the plurality of host computers.

Advantageous Effects of Invention

According to the present invention, it is possible for a resource of one device unit to be effectively shared by a plurality of storage systems.

BRIEF DESCRIPTION OF DRAWINGS

FIG. 5 is a block diagram of a host computer allocation management table related to the first example.

FIG. 7 is a block diagram of storage system allocation management information related to the first example.

FIG. 8 is a block diagram of a device management table related to the first example.

FIG. 11 is a block diagram of a configuration management table related to the first example.

FIG. 12 is a block diagram of configuration management information related to the first example.

FIG. 48 is a block diagram of a LUN management table related to the fourth example.

FIG. 49 is a block diagram of a virtual-logical translation table related to the fourth example.

FIG. 52 is a block diagram of a LUN management table related to the fourth example.

FIG. 53 is a block diagram of a parity group monitoring table related to the fourth example.

FIG. 54 is a block diagram of configuration management information related to the fourth example.

DESCRIPTION OF EMBODIMENT

Figure 1:
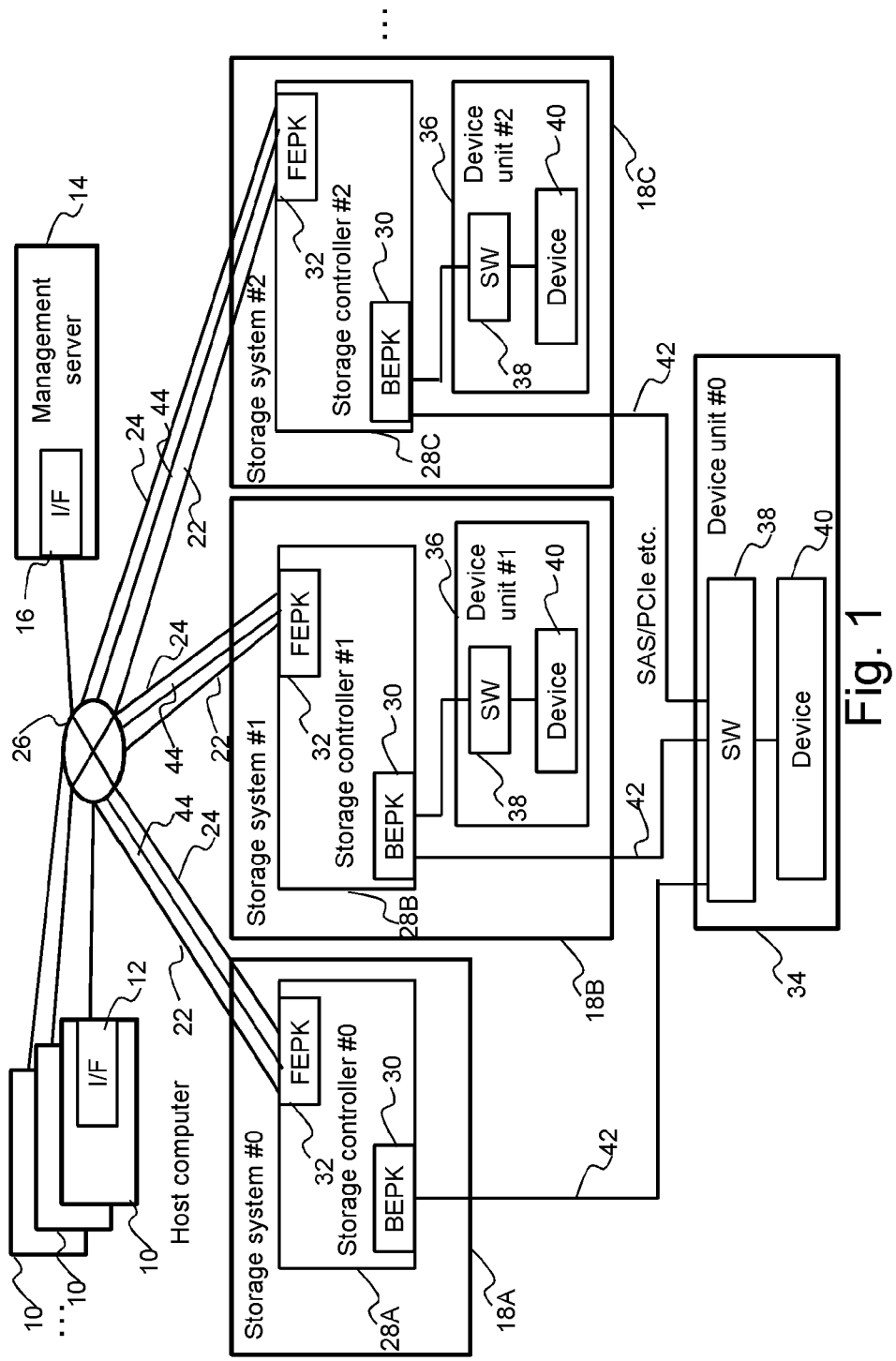
FIG. 1 is a block diagram of a computer system related to a first example.

Examples will be explained by referring to the drawings. The examples explained hereinbelow do not limit the invention related to the claims, and not all of the elements and combinations thereof explained in the examples are essential to a solution of the invention.

In the following explanation, the information of the present invention is explained using expressions such as "aaa table", but this information may also be expressed using a data structure other than a table. Therefore, to show that this information is not dependent on the data structure, "aaa table" and so forth may be called "aaa information".

When explaining the content of the respective information, the expression "number" is used, but this expression is interchangeable with identification information, identifier, name, and so forth.

Example 1

First, an overview of a first example will be explained.

The emergence of high-speed devices, which are capable of processing that is equal to or greater than the processing of a single storage system CPU, is a problem in that it makes it impossible to effectively utilize the high-speed device resource. In contrast to this, in a computer system related to a first example, a single device unit is shared by a plurality of storage systems. Specifically, in accordance with partitioning a storage area inside a single device unit and allocating the partitioned storage area (device allocation area) to the storage systems, the storage systems are able to share the device unit. Here, in a situation in which a load of equal to or greater than the system performance limit of the storage system is placed on each storage system coupled to the device unit being shared, the storage system constitutes a performance bottleneck, making it impossible to effectively utilize the resources of the device unit. In contrast to this, in the computer system related to the first example, performance monitoring information is collected for each storage system and for each device allocation area, and based on this performance monitoring information, performance load leveling is implemented with respect to the storage system in accordance with changing the storage system that allocates the device allocation area. In the computer system related to the first example, since the storage systems hold the device allocation area allocation management information, there is no need to install a new apparatus, thereby enabling cost increases to be prevented.

The computer system related to the first example will be explained in detail hereinbelow.

FIG. 1 is a block diagram of the computer system related to the first example.

The computer system comprises one or more host computers 10, a management server 14, a plurality of storage systems 18 (18A, 18B, 18C, and so forth), and a shared device unit 34. The host computer 10, the management server 14, and the storage systems 18 are coupled via a network 26.

The host computer 10 is coupled to the network 26 via an I/F 12. The host computer 10 carries out communications with the storage system 18, which is coupled to the network 26, using a block protocol.

The management server 14 holds all the configuration information of the computer system. The management server 14 is coupled to the network 26 via an I/F 16. The management server 14 carries out communications with the storage system 18 and the host computer 10 via the network 26.

The storage system 18, in accordance with a command from the management server 14, changes a parameter, such as the configuration of a logical unit (LU) inside a storage area, and collects performance monitoring information. The storage system 18 manages a storage area, which is realized using a storage medium of the shared device unit 34 and/or an exclusive device unit 36, and in accordance with a command from the host computer 10 coupled to the network 26, executes a read/write of data (user data) with respect to the storage area.

The storage system 18 comprises a storage controller 28 (28A, 28B, 28C, and so forth). The storage controller 28 executes a control process of the storage system 18. The storage controller 28 comprises a FEPK (Front End Package) 32 and a BEPK (Back End Package) 30. The FEPK 32 is an interface for communicating with the host computer 10 and the management server 14. The FEPK 32 is coupled to the network 26 via the network cable 44.

The FEPK 32 is also coupled to the network 26 via a network cable 22 as an initiator, and a network cable 24 as a target. The network cable 22, the network cable 24, and the network 26 constitute paths for communicating with the other storage systems 18. The configuration of the paths for communicating with the other storage systems 18 is not limited thereto, and in a case, which uses a network cable that can change its setting to either initiator or target, the network cable 22 and the network cable 24 may be configured as a single network cable or the network cable 22, the network cable 24, and the network cable 44 may be configured as a single network cable. The BEPK 30 is an interface for coupling to the shared device unit 34 and the exclusive device unit 36.

The storage system 18, for example, may comprise an exclusive device unit 36 internally like the storage systems 18B and 18C, or may not comprise an exclusive device unit 36 internally like storage system 18A. The exclusive device unit 36 comprises a switch (SW) 38 and a device 40. The switch 38 of the exclusive device unit 36 is coupled to the BEPK 30 of the storage controller 28 in the storage system 18 to which the exclusive device unit 36 belongs, and only this storage controller 28 is able to access the device 40.

The shared device unit (may also referred to as device unit #0) 34 comprises a switch (SW) 38 and a device 40. The device 40 comprises a storage area. The switch 38 of the shared device unit 34 is coupled to the storage controller 28 (specifically, to the BEPK 30 of the storage controller 28) of a plurality of storage systems 18 via a cable 42. In the example shown in FIG. 1, the switch 38 is coupled to the storage controllers 18A, 18B, and 18C via the cable 42. The cable 42, for example, may be a SAS cable or a PCIe cable. In accordance with a configuration like this, a plurality of storage systems 18 are able to access the storage area of the device 40 in the shared device unit 34.

Figure 2:
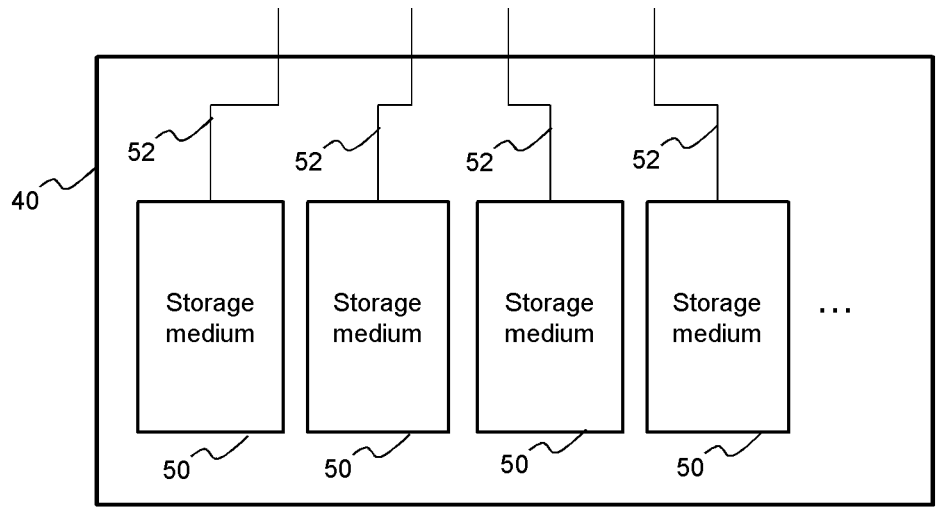
FIG. 2 is a block diagram of a device related to the first example.

FIG. 2 is a block diagram of a device related to the first example.

The device 40 comprises one or more storage media 50. The storage medium 50 is coupled to the switch 38 via a cable 52. The storage medium 50 may be an HDD, such as a SATA disk or a SAS disk, or may be a high-speed storage medium, such as a SSD or a flash drive.

Figure 3:
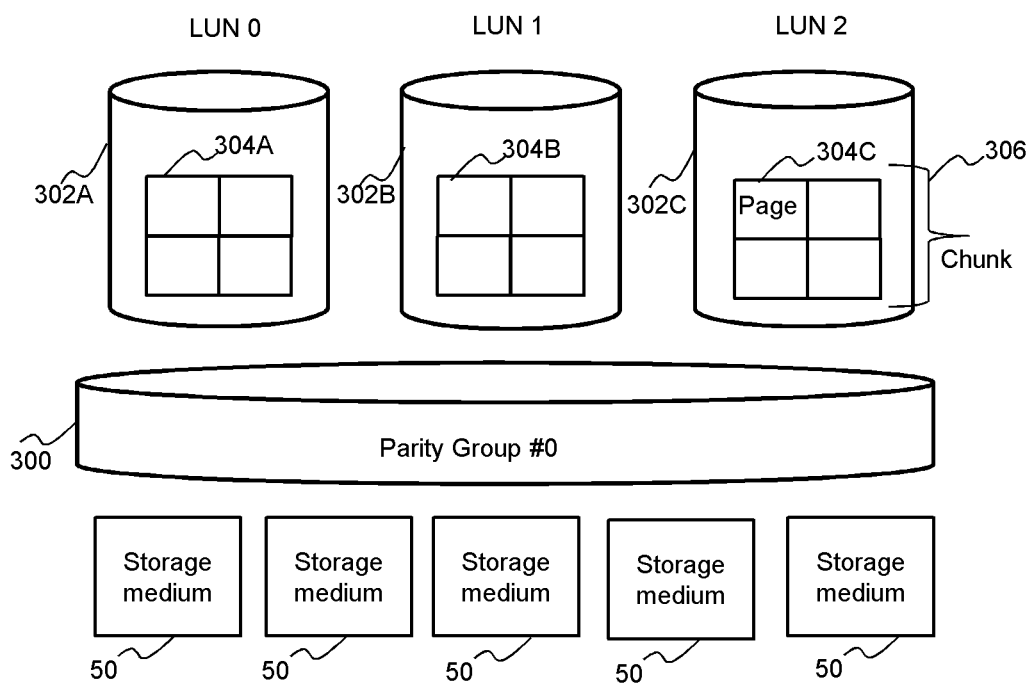
FIG. 3 is a drawing illustrating a device allocation unit related to the first example.

FIG. 3 is a drawing illustrating a device allocation unit related to the first example.

A parity group 300 comprises a storage area of a plurality of storage media 50. In consideration of data parity in preparation for a failure, the parity group 300 constitutes a RAID configuration of a prescribed RAID (Redundant Array of Independent Disks) level. However, the storage media, which comprise the parity group 300, must be stored in the same device unit.

The parity group 300 comprises one or more logical units (LU) 302 (in FIG. 3, 302A, 302B, and 302C). The LU 302 is partitioned into a unit of a chunk 306, which is a prescribed data unit. The LU 302 may also be partitioned into a page 304 (304C), which is a data unit obtained by further partitioning the chunk 306. The data unit, which is allocated to the storage system 18 by the shared device unit 34 and the exclusive device unit 36 may be a parity group 300 unit, a LU 302 unit, a chunk 306 unit, or a page 304 unit. However, since the host computer 10 recognizes the LU 302 as the data allocation unit, it is preferable that a data allocation layout change that takes into account performance load balancing, which will be explained further below, be implemented in units of LU 302. Hereinbelow, an explanation will be given using an example of a case in which the unit for allocating data to the storage system 18 is the LU 302.

Figure 4:
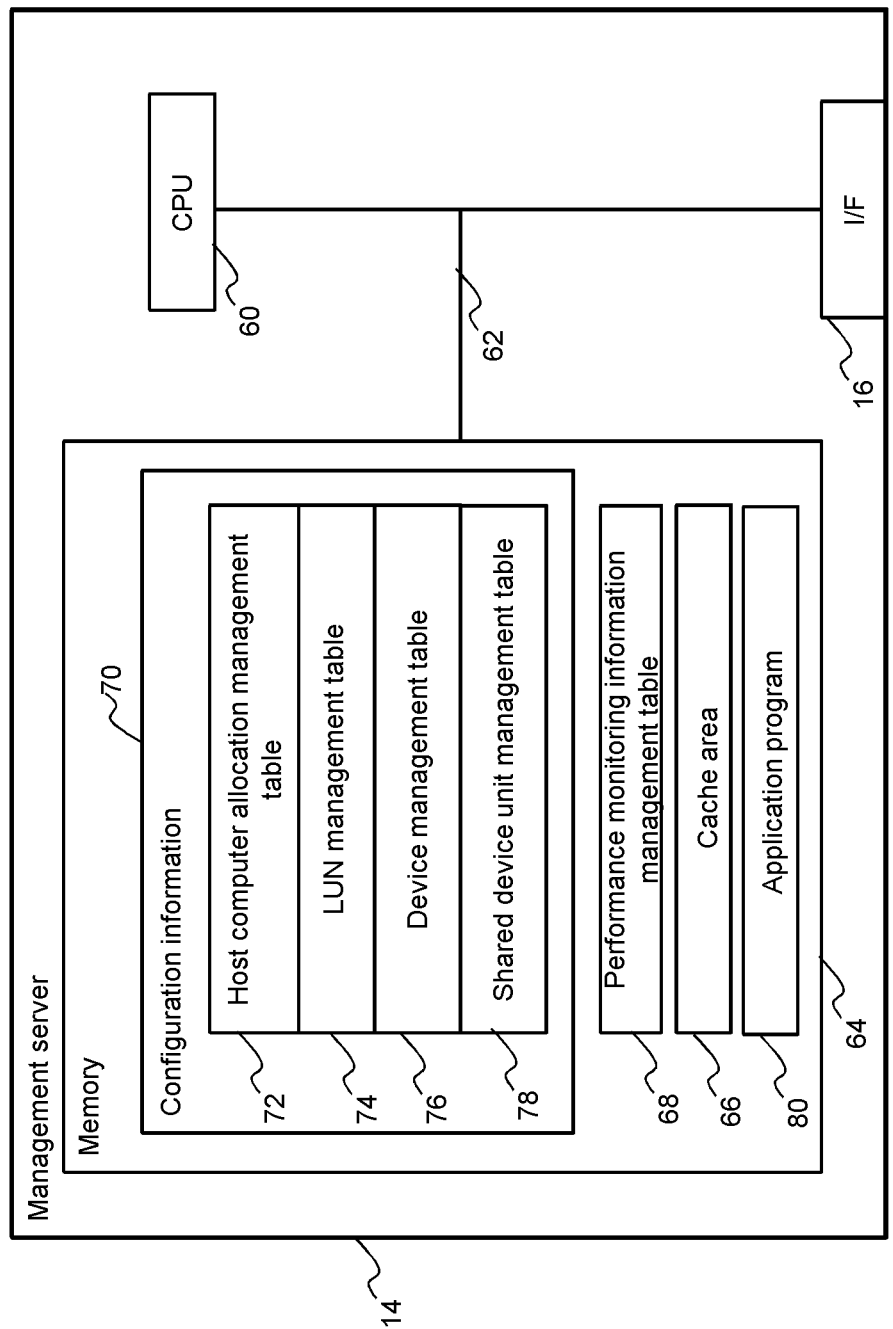
FIG. 4 is a block diagram of a management server related to the first example.

FIG. 4 is a block diagram of a management server related to the first example.

The management server 14 comprises a CPU 60, a memory 64, and an I/F 16. The CPU 60, the memory 64, and the I/F 62 are coupled via an internal cable 62. The CPU 60 executes various processes using a program and data stored in the memory 64. The I/F 16 is an interface for coupling to the network 26. The memory 64 comprises computer system configuration information 70, a performance monitoring information management table 68, a cache area 66, and an application program 80. The configuration information 70 comprises a host computer allocation management table 72, a LUN management table 74, a device management table 76, and a shared device unit management table 78.

FIG. 5 is a block diagram of a host computer allocation management table related to the first example.

The host computer allocation management table 72 stores management information 90 (90A, 90B, 90C, and so forth) for managing a storage area, which has been allocated to each host computer 10. In FIG. 5, the management information 90A is the management information for host computer #0, the management information 90B is the management information for host computer #1, and the management information 90C is the management information for host computer #2.

The management information 90 holds a default storage system number (#) 98 (98A, 98B, 98C and so forth), and, in addition, holds a host LUN 92 (92A, 92B, 92C and so forth), an owner storage system number (#) 94 (94A, 94B, 94C and so forth), and a size 96 (96A, 96B, 96C and so forth). The default storage system number 98 is a storage system number (default storage system number) for identifying the default storage system (default storage system), which is in charge of an I/O process for the host computer 10. The host LUN 92 is the identification number of the LU, which is recognized by the host computer 10. The owner storage system number 94 is the number of the storage system, which is in charge of processing a LU corresponding to the host LUN 92. The owner storage system number 94 is configured in the default storage system number 98 of each host computer 10 when a new LU is allocated, but the owner storage system number 94 may be changed in a case where a performance load balancing process, which will be explained further below (refer to FIG. 28), has been executed. The size 96 is the size of the LU corresponding to the host LUN 92.

Figure 6:
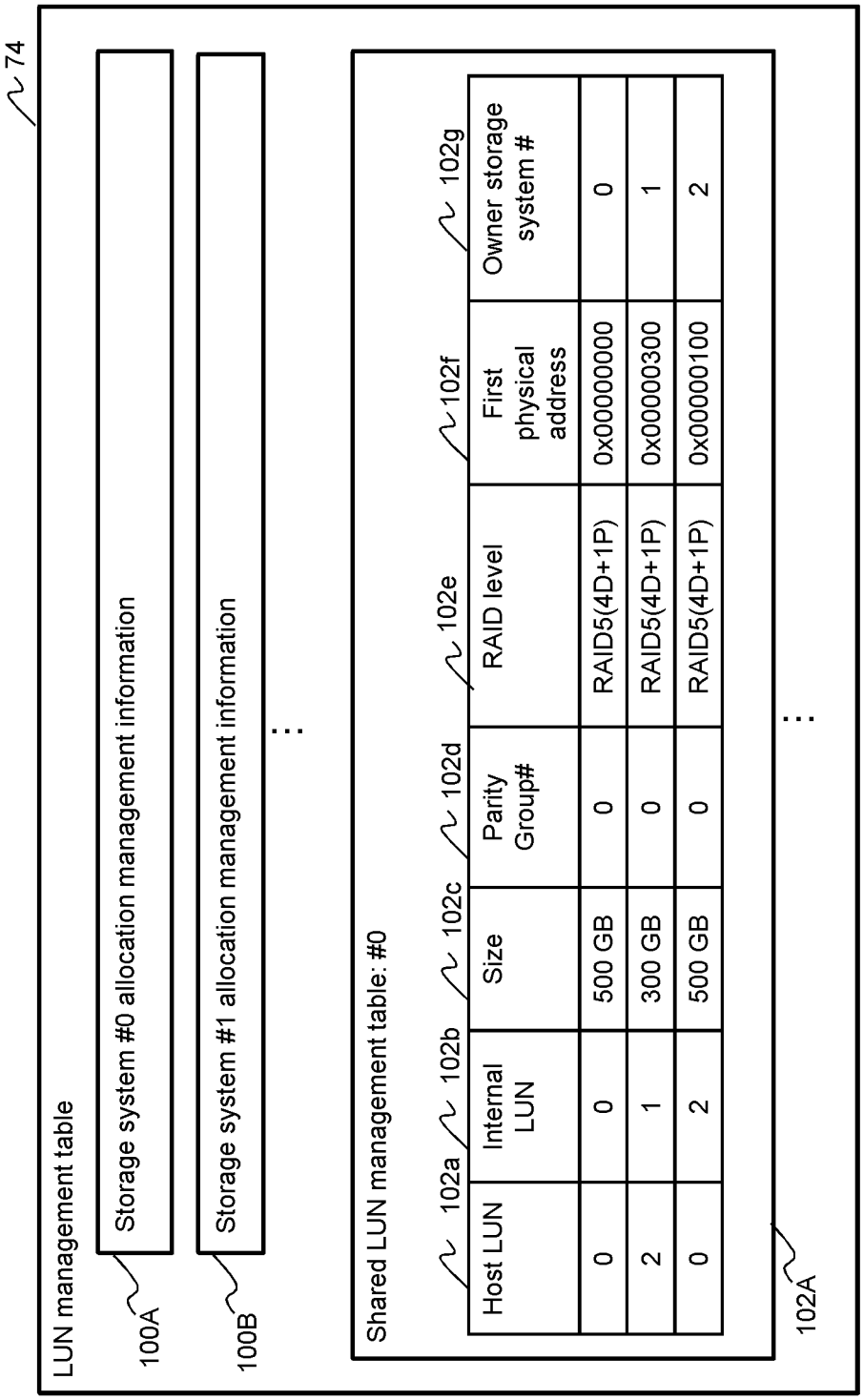
FIG. 6 is a block diagram of a LUN management table related to the first example.

FIG. 6 is a block diagram of a LUN management table related to the first example.

The LUN management table 74 comprises storage system allocation management information 100 (100A, 100B, and so forth) related to each storage system, and one or more shared LUN management tables 102 (102A and so forth). The shared LUN management table 102 manages LUN information of a LU stored in the shared device unit 34. In a case where a plurality of shared device units 34 exist in the computer system, one shared LUN management table 102 is managed for each shared device unit 34 in the LUN management table 74.

The shared LUN management table 102 comprises a host LUN 102a, an internal LUN 102b, a size 102c, a parity group number (#) 102d, a RAID level 102e, a first physical address 102f, and an owner storage system number 102g.

The host LUN 102a is the identification number of the LU, which is recognized by the host computer 10. The internal LUN 102b is the identification number (internal LUN) of the LU, which is recognized by the storage system 18. The internal LUN, for example, is used in a storage system' s internal processing. The size 102c is the size of the LU corresponding to the host LUN 102a. The parity group number 102d is the number of the parity group to which the LU corresponding to the host LUN 102a belongs. The RAID level 102e is the RAID level of the parity group in the parity group number 102d. The first physical address 102f is the first physical address showing the top of the physical data storage location of the device in which is stored the data of the LU corresponding to the host LUN 102a. The owner storage system number 102g is the number of the storage system, which processes the LU corresponding to the host LUN 102a.

FIG. 7 is a block diagram of storage system allocation management information related to the first example. FIG. 7 shows the storage system allocation management information 100B of the storage system #1. The storage system allocation management information of the other storage systems has the same configuration.

The storage system allocation management information 100B is for managing the allocation of data in the exclusive device unit 36 of the storage system 18, and, for example, comprises an exclusive device unit management table 110. The exclusive device unit management table 110 manages information related to a host LUN 110a, which has been allocated to the storage system 18.

The exclusive device unit management table 110 comprises the host LUN 110a, an internal LUN 110b, a size 110c, a parity group number 110d, a RAID level 110e, a first physical address 110f, and a device unit number (#) 110g.

The host LUN 110a is the identification number of the LU, which is recognized by the host computer 10. The internal LUN 110b is the identification number (internal LUN) of the LU, which is recognized by the storage system. The internal LUN, for example, is used in a storage system's internal processing. The size 110c is the size of the LU corresponding to the host LUN 110a. The parity group number 110d is the number of the parity group to which the LU corresponding to the host LUN 110a belongs. The RAID level 110e is the RAID level of the parity group corresponding to the parity group number 110d. The first physical address 110f is the first physical address showing the top of the physical data storage location of the device in which is stored the data of the LU corresponding to the host LUN 110a. The device unit number 110g is the number of the device unit, which stores the LU corresponding to the host LUN 110a.

FIG. 8 is a block diagram of a device management table related to the first example.

The device management table 76 stores a device unit management table 160 (160A, 160B, and so forth) in device unit units. The device unit management table 160 stores the configuration information of the device unit (34, 36, and so forth).

The device unit management table 160 comprises a parity group number 160a, a RAID level 160b, a device ID 160c, and a size 160d. The parity group number 160a is the number of the parity group. The RAID level 160b is the RAID level of the parity group corresponding to the parity group number 160a. The device ID 160c is the identification number of the storage medium 50, which comprises the parity group. The size 160d is the size of the parity group.

Figure 9:
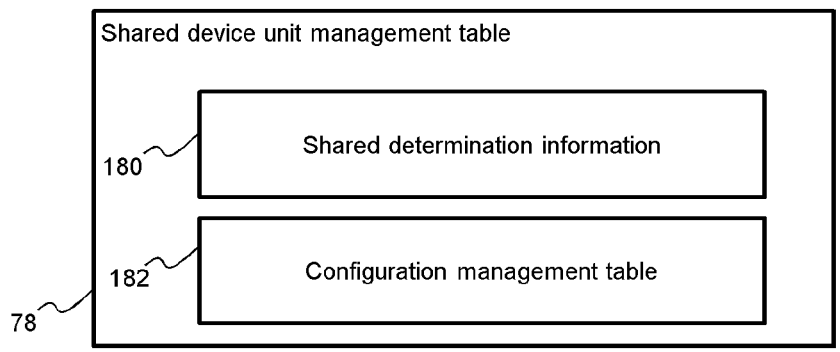
FIG. 9 is a block diagram of a shared device unit management table related to the first example.

FIG. 9 is a block diagram of a shared device unit management table related to the first example.

The shared device unit management table 78 comprises shared determination information 180 (refer to FIG. 10), and a configuration management table 182 (refer to FIG. 11).

Figure 10:
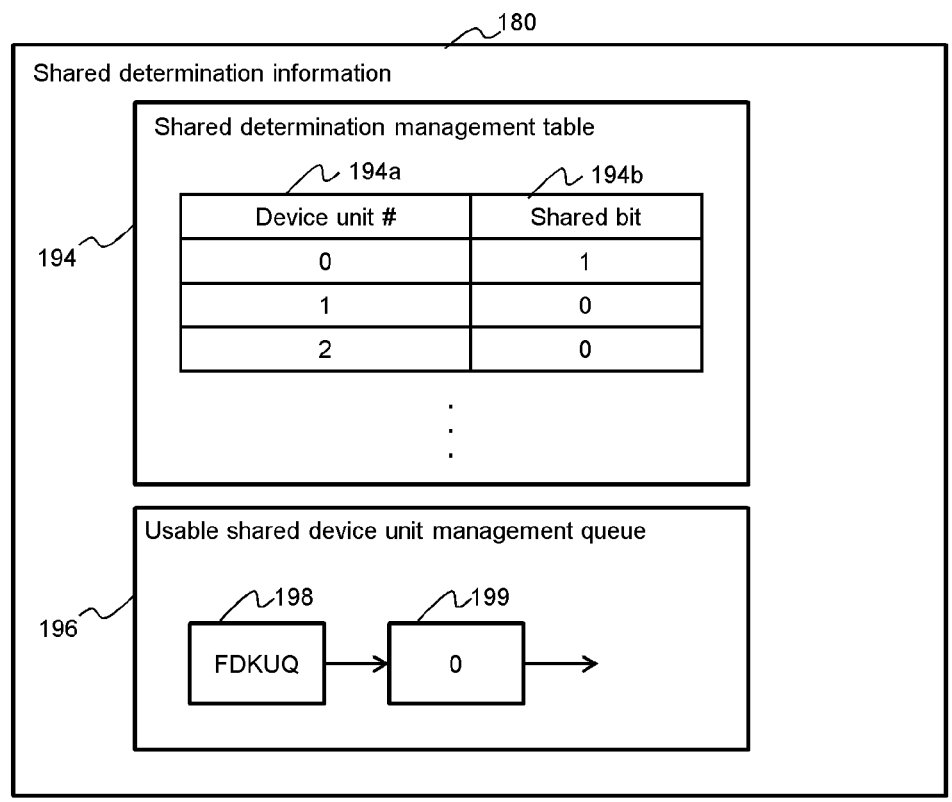
FIG. 10 is a block diagram of shared determination information related to the first example.

FIG. 10 is a block diagram of shared determination information related to the first example.

The shared determination information 180 comprises a shared determination management table 194, and a usable shared device unit management queue 196.

The shared determination management table 194 is for managing information as to whether or not a plurality of storage systems are sharing a relevant device unit for all the device units comprising the computer system, and stores a device unit number 194a and a shared bit 194b for each device unit.

The device unit number 194a is the identification number for identifying a device unit. The shared bit 194b is a bit, which shows whether or not the device unit corresponding to the device unit number 194a is being shared by a plurality of storage systems, and, for example, in a case where the device unit is being shared, a "1" is configured, and in a case where the device unit is not being shared, a "0" is configured. In a case where the computer system is the configuration shown in FIG. 1, the shared bit 194b is configured to "1" with respect to the device unit number 194a "0".

The usable shared device unit management queue 196 manages a device unit, which is able to be used as a shared device unit from among the device unit numbers 194a for which the shared bit 194b is "1" in the shared determination management table 194. The usable shared device unit management queue 196 creates a FDKUQ 198, and couples an entry (for example, the entry showing the device unit number), which shows a usable shared device unit, to the FDKUQ 198. In the example of FIG. 10, an entry 199 in which "0" is included is coupled to the FDKUQ 198. The entry 199 shows that the device unit (shared device unit 34) in the device unit number 0 is usable.

FIG. 11 is a block diagram of a configuration management table related to the first example.

The configuration management table 182 holds a shared device unit management table 200 for each shared device unit. The shared device unit management table 200 comprises shared device unit configuration management information (refer to FIG. 12) 202 and a free area management queue 204 (refer to FIG. 13).

FIG. 12 is a block diagram of configuration management information related to the first example.

The configuration management information 202 comprises an internal LUN 202a and a storage system number (#) 202b. The internal LUN 202a is the identification number (internal LUN) of the storage system 18-recognized LU inside the shared device unit 34. The storage system number 202b is the number of the storage system 18, which executes processing with respect to the LU corresponding to the internal LUN 202a.

Figure 13:
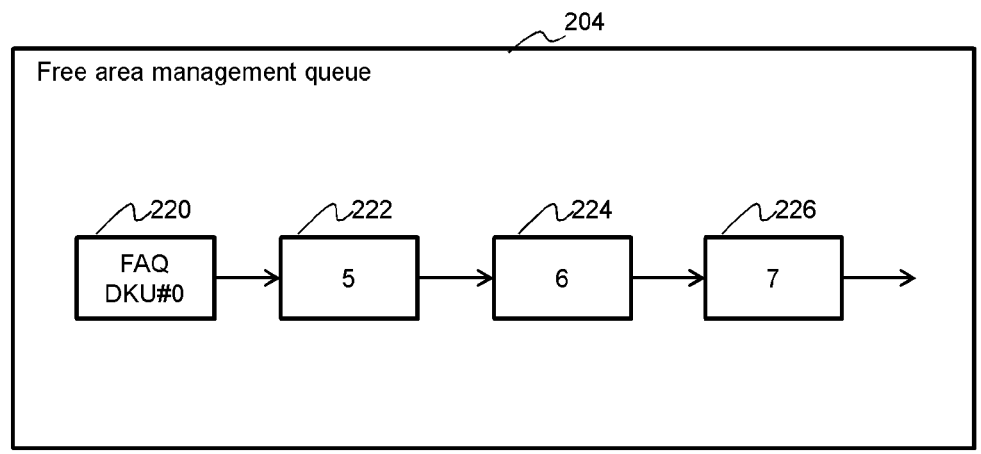
FIG. 13 is a block diagram of a free area management queue related to the first example.

FIG. 13 is a block diagram of a free area management queue related to the first example.

The free area management queue 204 is created by a set of LUs for a single shared device unit 34, and manages the LUs, which are free areas in the shared device unit 34. The free area management queue 204 couples entries 222, 224, 226, and so forth, which show the internal LUs constituting the free areas, to a first entry 220. In the example shown in FIG. 13, the first entry 220 of the free area management queue is created for the device unit (shared device unit 34) of the device unit #0, the entry 222, which shows the internal LUN "5", is coupled to the first entry 220, next, the entry 224, which shows the internal LUN "6", is coupled, and then the entry 226, which shows the internal LUN "7", is coupled. According to this free area management queue 204, it is clear that the internal LUNs "5", "6", and "7" are the free areas.

The free area management queue 204 is managed as follows. That is, in a case where the host LUN has been deleted, the management server 14 adds to the free area management queue 204 of the shared device unit, which stores the LU of the internal LUN corresponding to the relevant host LUN, an entry, which corresponds to this internal LUN. In a case where the host LUN has been configured anew, the management server 14 looks at the free area management queue 204, determines the internal LUN, which shows an allocatable LU, and deletes the entry of the relevant internal LUN from the free area management queue 204.

Figure 14:
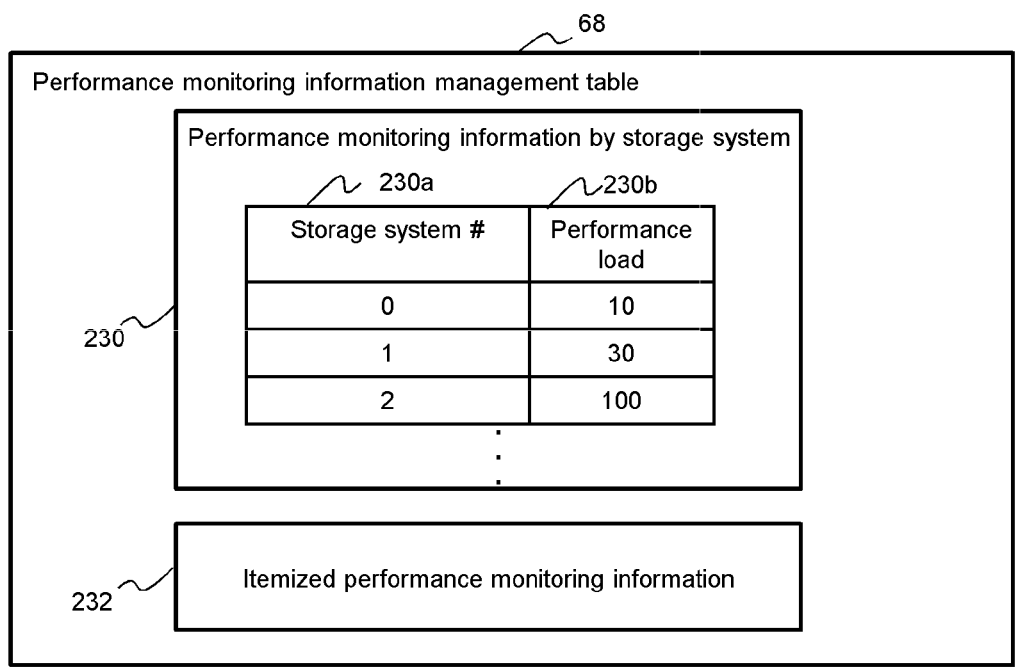
FIG. 14 is a block diagram of a performance monitoring information management table related to the first example.

FIG. 14 is a block diagram of a performance monitoring information management table related to the first example.

Figure 15:
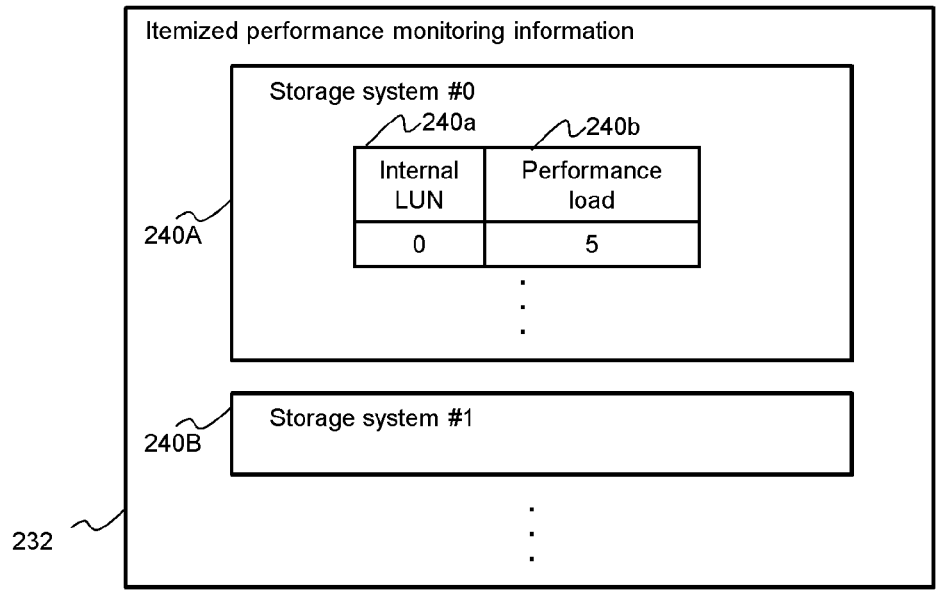
FIG. 15 is a block diagram of itemized performance monitoring information related to the first example.

The performance monitoring information management table 68 comprises performance monitoring information by storage system 230 and itemized performance monitoring information 232 for managing the performance monitoring information inside the storage system (refer to FIG. 15). The performance monitoring information by storage system 230 is a table for managing the performance load of each storage system, and manages a storage system number (#) 230a and a performance load 230b. The storage system number 230a is the identification number for identifying the storage system 18. The performance load 230b, for example, is the load on the CPU 260 (refer to FIG. 17) of the storage system 18 corresponding to the storage system number 230a. In this example, the CPU 260 load, for example, is the number of I/Os per second (the average number of I/Os) processed by the CPU 260.

FIG. 15 is a block diagram of itemized performance monitoring information related to the first example.

The itemized performance monitoring information 232 comprises performance monitoring information 240 (240A, 240B, and so forth) for each storage system for each of the storage systems 18. The performance monitoring information 240 for each storage system comprises an internal LUN 240a and a performance load 240b. The internal LUN 240a is the internal LUN of the LU for which the storage system 18 corresponding to the performance monitoring information 240 for each storage system is in charge of processing. The performance load 240b is the performance load with respect to the LU corresponding to the internal LUN 240a.

Figure 16:
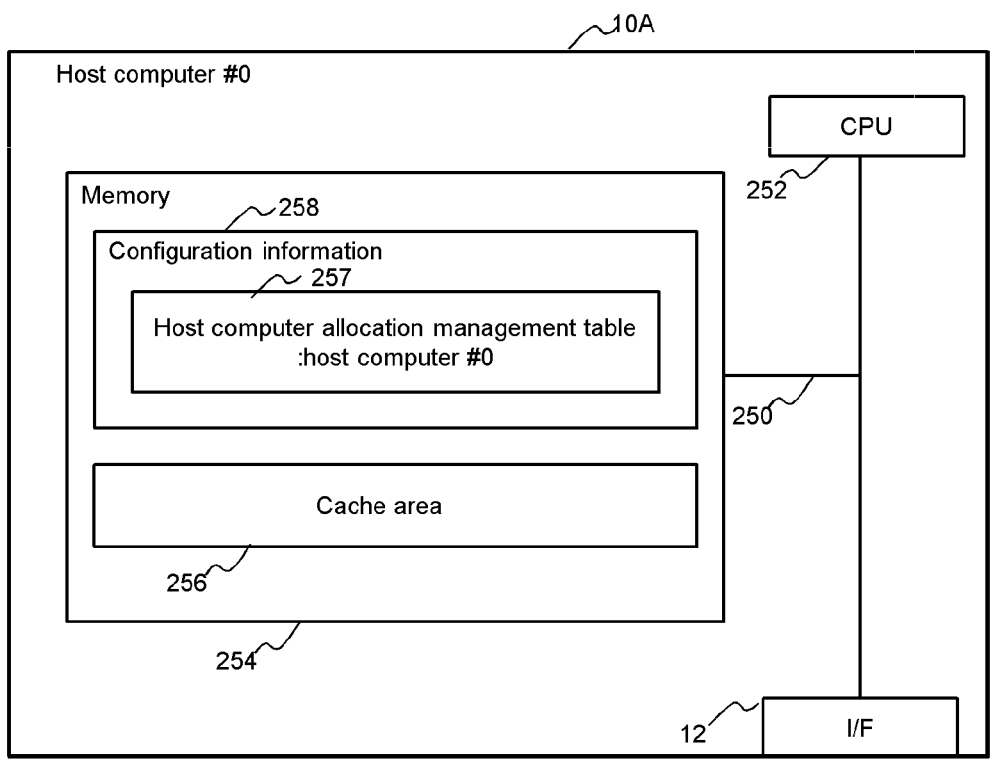
FIG. 16 is a block diagram of a host computer related to the first example.

FIG. 16 is a block diagram of a host computer related to the first example. FIG. 16 shows the configuration of the host computer #0, but the other host computers have the same configuration.

The host computer 10 (10A) comprises a CPU 252, an I/F 12, and a memory 254. The CPU 252, the memory 254, and the I/F 12 are coupled via an internal cable 250.

The CPU 252 executes various processes in accordance with executing a program stored in the memory 254. The memory 254 comprises configuration information 258 and a cache area 256. The configuration information 258 comprises a host computer allocation management table 257 for managing an area, which has been allocated to the relevant host computer 10. The host computer allocation management table 257 stores information similar to the host computer allocation management information 90 corresponding to the relevant host computer 10 inside the host computer allocation management table 72 held by the management server 14. In the example of FIG. 16, the host computer allocation management table 257 stores information similar to a host computer allocation management table 90A, which corresponds to the host computer #0 of FIG. 5.

Figures 17, 18:
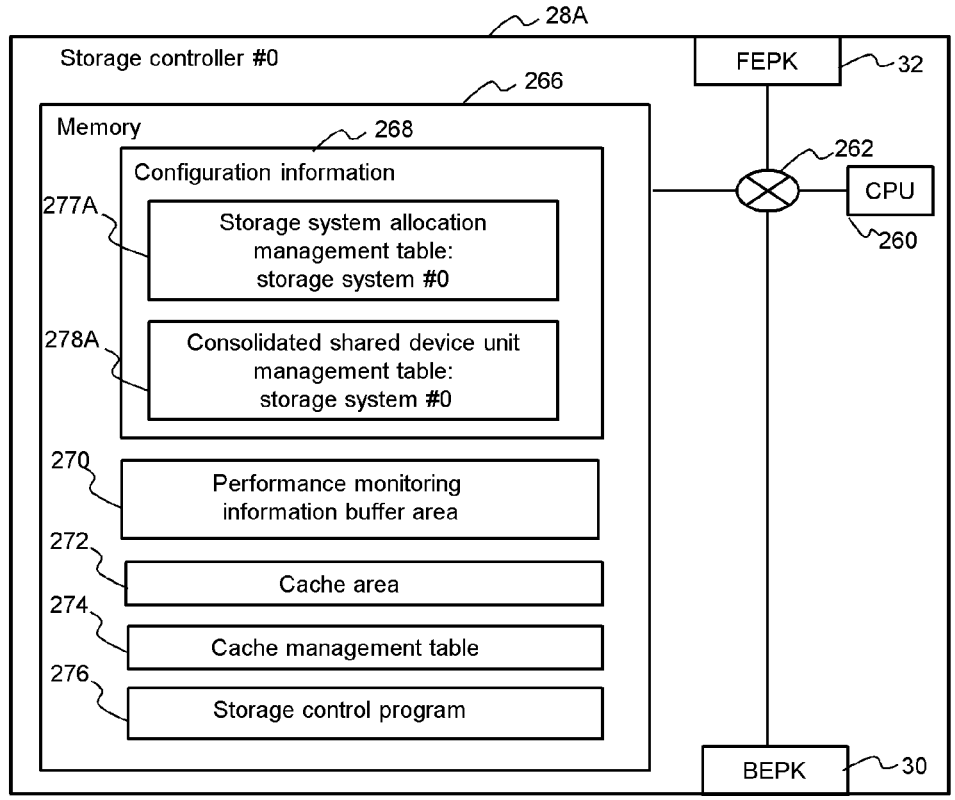
FIG. 17 is a block diagram of a storage controller related to the first example.
FIG. 18 is a block diagram of a consolidated shared device unit management table related to the first example.

FIG. 17 is a block diagram of a storage controller related to the first example. FIG. 17 shows as an example the storage controller 28A of the storage system 18A (storage system #0). The configurations of the other storage controllers are the same.

The storage controller 28 comprises a CPU 260, a FEPK 32, a BEPK 30, and a memory 266. The CPU 260, the FEPK 32, the BEPK 30, and the memory 266 are coupled via an internal network 262.

The CPU 260 executes various processes in accordance with executing a program stored in the memory 266. The memory 266 stores configuration information 268, a performance monitoring information buffer area 270, a cache area 272, a cache management table 274 (refer to FIG. 19), and a storage control program 276.

The configuration information 268 comprises a storage system allocation management table 277 for managing an area (allocation area), which has been allocated to the storage system, and a consolidated shared device unit management table 278 (refer to FIG. 18) for managing an area inside the shared device unit 34 in the computer system. The storage system allocation management table 277 stores information similar to the storage system allocation management information 100 of the LUN management table 74 held by the management server 14.

The performance monitoring information buffer area 270 is for temporarily holding performance monitoring information in order to send the performance monitoring information collected in the storage system 18 to the management server 14 at more or less the same time. The storage control program 276 is for executing various processes in a storage system. The cache area 272 is for temporarily storing either data, which is to be written to the device unit, or data, which was read from the device unit.

FIG. 18 is a block diagram of a consolidated shared device unit management table related to the first example. The example of FIG. 18 shows the consolidated shared device unit management table 278 (278A) inside the storage controller 28A.

The consolidated shared device unit management table 278 is managed for each storage controller 28 in the computer system. The consolidated shared device unit management table 278 comprises a consolidated shared management table 279 (279A and so forth) for managing the information for each shared device unit 34 that exists in the computer system. In a case where a plurality of shared device units 34 exist in the computer system, a plurality of consolidated shared management tables 279 are stored in the consolidated shared device unit management table 278 for each storage system.

The consolidated shared management table 279 stores information having substantially the same content as the shared LUN management table 102 stored in the management server 14. The consolidated shared management table 279 comprises a host LUN 279a, an internal LUN 279b, a size 279c, a parity group number 279d, a RAID level 279e, a first physical address 279f, and an owner bit 279g. The host LUN 279a, the internal LUN 279b, the size 279c, the parity group number 279d, the RAID level 279e, and the first physical address 279f are the same contents as the information of the same names in the shared LUN management table 102 stored in the management server 14.

The owner bit 279g is the bit for showing whether or not the storage system 18, which comprises the relevant storage controller 28, is the storage system 18 for processing the LU of the host LUN 279a, and in a case where the storage system 18 is for processing the LU of the host LUN 279a, is configured to ON (for example, "1"), and in a case where the storage system is not for processing the LU of the host LUN 279a, is configured to OFF (for example, "0").

Figure 19:
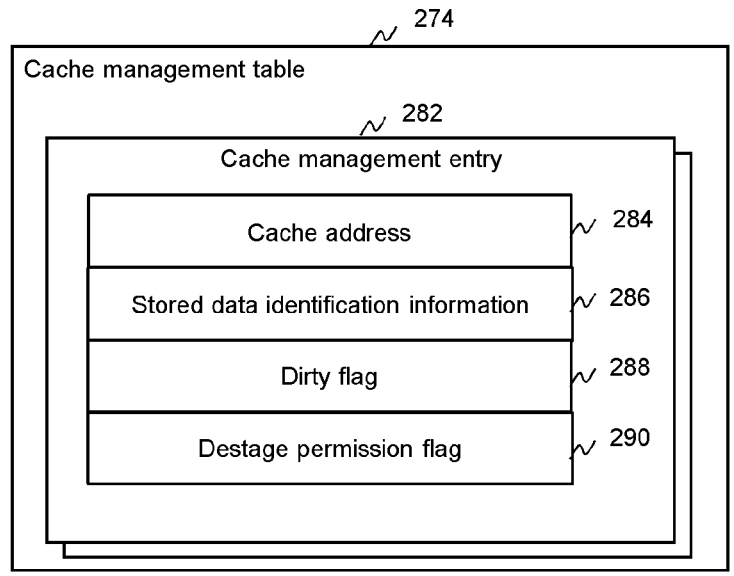
FIG. 19 is a block diagram of a cache management table related to the first example.

FIG. 19 is a block diagram of a cache management table related to the first example.

The cache management table 274 is for managing the state of the cache management unit, and stores a cache management entry 282 for each cache management unit. The cache management entry 282 stores a cache address 284, stored data identification information 286, a dirty flag 288, and a destage permission flag 290. The cache address 284 is the address of data, which is being cached. The stored data identification information 286 is identification information for identifying the cached data (stored data). The dirty flag 288 is the flag for showing whether or not the cached data is dirty data (that is, data, which is not reflected in the storage medium 50). The destage permission flag 290 is the flag for showing whether or not the cached data is capable of being destaged to the storage medium 50.

Figure 20:
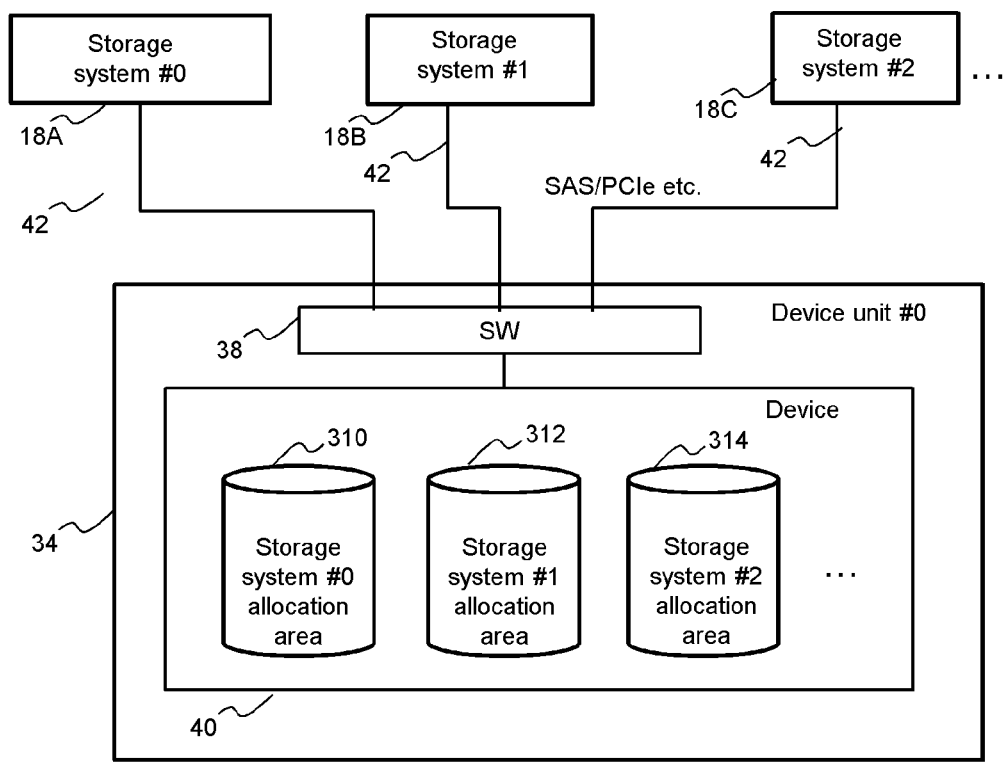
FIG. 20 is a drawing for illustrating an area, which is allocated to a storage system, related to the first example.

FIG. 20 is a drawing illustrating an area, which is allocated to a storage system, related to the first example.

A plurality of storage systems 18 are coupled to the switch 38 of the shared device unit 34 via the cable 42 such as a SAS/PCIe. The storage area of the device 40 is managed as a logical space, and this logical space is divided and managed as an allocation area 310, which has been allocated to the storage system #0 (storage system 18A), an allocation area 312, which has been allocated to the storage system #1 (storage system 18B), and an allocation area 314, which has been allocated to the storage system #2 (storage system 18C), and is managed such that the area capable of being accessed by each storage system 18 is limited.

Next, processing operations in the computer system related to the first example will be explained.

First, a shared device unit new registration process for newly registering a shared device unit in the storage system will be explained.

Figure 21:
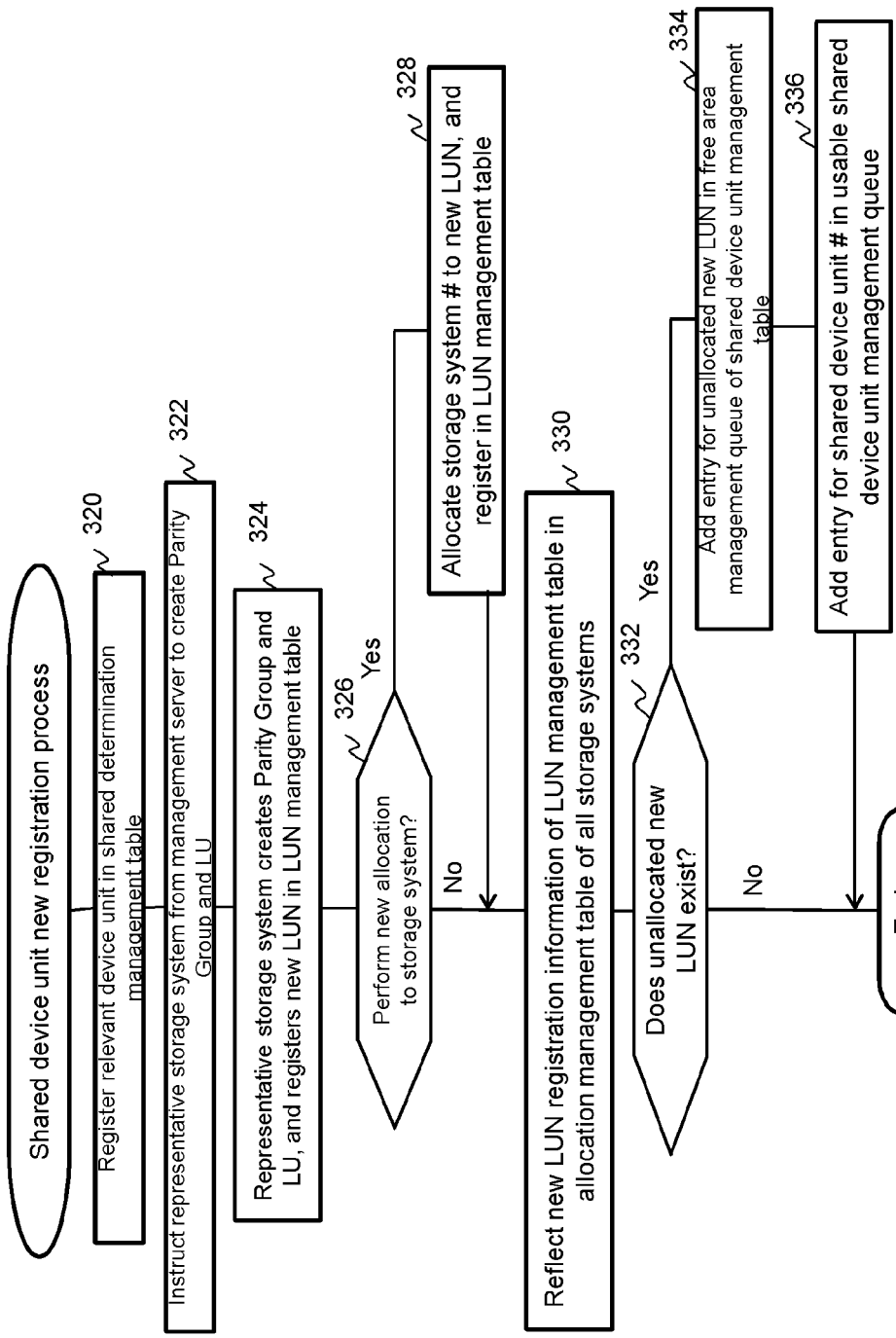
FIG. 21 is a flowchart of a shared device unit new registration process related to the first example.

FIG. 21 is a flowchart of a shared device unit new registration process related to the first example.

The management server 14 receives from the administrator of the computer system a specification for a device unit, which is to be newly registered, adds a device unit number 194a row for the specified device unit to the shared determination management table 194, and configures the shared bit 194b of the relevant row to "1" (Step 320). In a case where the device unit number 194a row for the specified device unit exists in the shared determination management table 194, there is no need to perform the task for adding the row, and the shared bit 194b of the corresponding row is configured to "1".

Next, the management server 14 instructs a representative storage system 18 to create a logical configuration (RAID group, LU, or the like) inside the specified device unit (Step 322). As used here, a representative storage system 18 refers to the storage system 18, which plays a key roll in the processing for creating a logical configuration and the like, and may be one of the storage systems 18 in the computer system, may be any storage system 18, which was decided beforehand, or may be an arbitrarily selected storage system 18.

Next, in Step 324, the representative storage system 18, which received an indication from the management server 14, creates a parity group 300 from a plurality of storage media 50 inside the relevant device unit 34, and creates a LU 302 from the parity group 300. At this time, the storage system 18 also configures an internal LUN and a host LUN. The management server 14 may configure a default value related to the configuration of the created parity group 300 and LU 302 in the representative storage system 18 beforehand, and in Step 322, the management server 14 may instruct the configuration to the representative storage system 18. After creating the LU 302, the management server 14 creates a shared LUN management table 102 in the LUN management table 74, and registers the management information of the newly created LU 302.

Next, in Step 326, the management server 14 determines whether to newly allocate the newly registered LU 302 to the storage system 18.

In a case where the result is that the newly registered LU 302 is newly allocated to the storage system (Step 326: Yes), in Step 328, the management server 14 allocates a storage system number to the newly created LU 302, and registers the relevant storage system number as the owner storage system number 102g in the shared LUN management table 102 of the LUN management table 74. The allocation of the storage system number here may be done by equitably allocating the storage system numbers of all the storage systems coupled to the relevant shared drive unit 34 round-robin style, or may be done by fixedly allocating the storage system number of one storage system. However, from the standpoint of performance, the round-robin approach is more practical.

Alternatively, either in a case where the newly registered LU 302 is not newly allocated to a storage system (Step 326: No), or after Step 328 has ended, in Step 330, the management server 14 reflects the information of the shared LUN management table 102 in an updated LUN management table 74 in the consolidated shared device unit management table 278 inside the storage controllers 28 of all the storage systems 18 coupled to the relevant shared device unit 34. At this time, the management server 14 configures to "1" the owner bit 279g of the row, which corresponds to the host LUN 279a of the LU, for which this storage system 18 is in charge of processing, in the consolidated shared management table 279 inside the consolidated shared device unit management table 278.

Next, in Step 332, the management server 14 checks whether or not the storage system 18 has an unallocated newly created LUN.

In a case where the result is that the storage system has an unallocated newly created LUN (Step 332: Yes), in Step 334, the management server 14 adds an entry corresponding to the unallocated newly created LUN to the free area management queue 204 of the relevant shared device unit management table 200 in the shared device unit management table 78.

Next, in Step 336, the management server 14 adds an entry corresponding to the device unit number of the relevant shared device unit 34 to the usable shared device unit management queue 196, and ends the shared device unit new registration process. In a case where the storage system 18 does not have an unallocated newly created LUN (Step 332: No), the management server 14 ends the shared device unit new registration process.

Next, a new area allocation process for allocating a new are of the shared device unit 34 will be explained.

Figure 22:
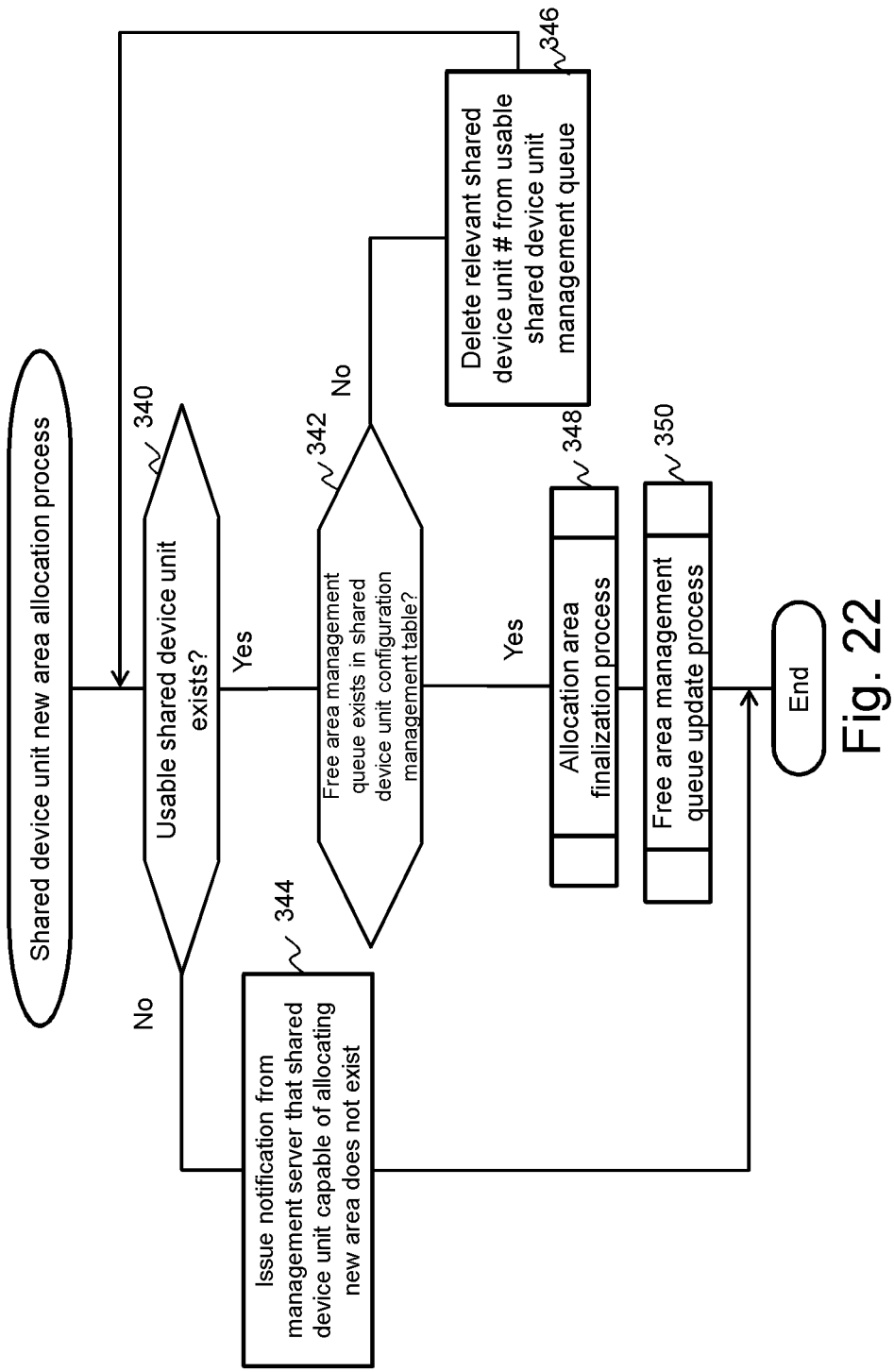
FIG. 22 is a flowchart of a new area allocation process related to the first example.

FIG. 22 is a flowchart of a new area allocation process related to the first example.

The new area allocation process, for example, is executed in a case where a new allocation was not performed to the storage system in Step 326 of FIG. 21, or in a case where the LU 302 inside the shared device unit 34 was deleted from the storage controller 28, and, for example, execution starts on the basis of an area allocation request from the management server 14 or the host computer 10.

Initially, in Step 340, the management server 14 determines whether or not there is a shared device unit 34, which is able to be used, by checking whether or not there is an entry in the usable shared device unit management queue 196 of the shared device unit management table 78.

In a case where the result of the determination is that a usable shared device unit 34 does not exist (Step 340: No), the management server 14 notifies either the host computer 10 or another management server 14 for building a storage system 18 to the effect that a shared device unit 34, which is able to allocate a new area, does not exist, and ends the new area allocation process.

Alternatively, in a case where it is determined that a useable shared device unit 34 exists (Step 340: Yes), in Step 342, the management server 14 judges that the shared device unit 34, which corresponds to the shared device unit number shown by the first entry 199 in the usable shared device unit management queue 196, is able to be used, and determines whether an entry exists in the free area management queue 204 of the shared device unit configuration management table 200 corresponding to the relevant shared device unit 34.

In a case where the result is that an entry does not exist in the free area management queue 204 of the shared device unit configuration management table 200 corresponding to the shared device unit 34 (Step 342: No), in Step 346, the management server 14 deletes the entry of the shared device unit number corresponding to the relevant shared device unit 34 in the usable shared device unit management queue 196, and moves the processing to Step 340.

Alternatively, in a case where an entry exists in the free area management queue 204 of the shared device unit configuration management table 200 corresponding to the shared device unit 34 (Step 342: Yes), in Step 348, the management server 14 judges that the LU of the LUN, which is shown by the first entry in the free area management queue 204 of the relevant shared device unit configuration management table 200, is usable (allocatable), decides that the relevant LU is the allocation area, and performs an allocation area finalization process (refer to FIG. 23).

Next, in Step 350, the management server 14 performs a free area management queue update process (refer to FIG. 24) for updating the free area management queue 204, and ends the new area allocation process.

Figure 23:
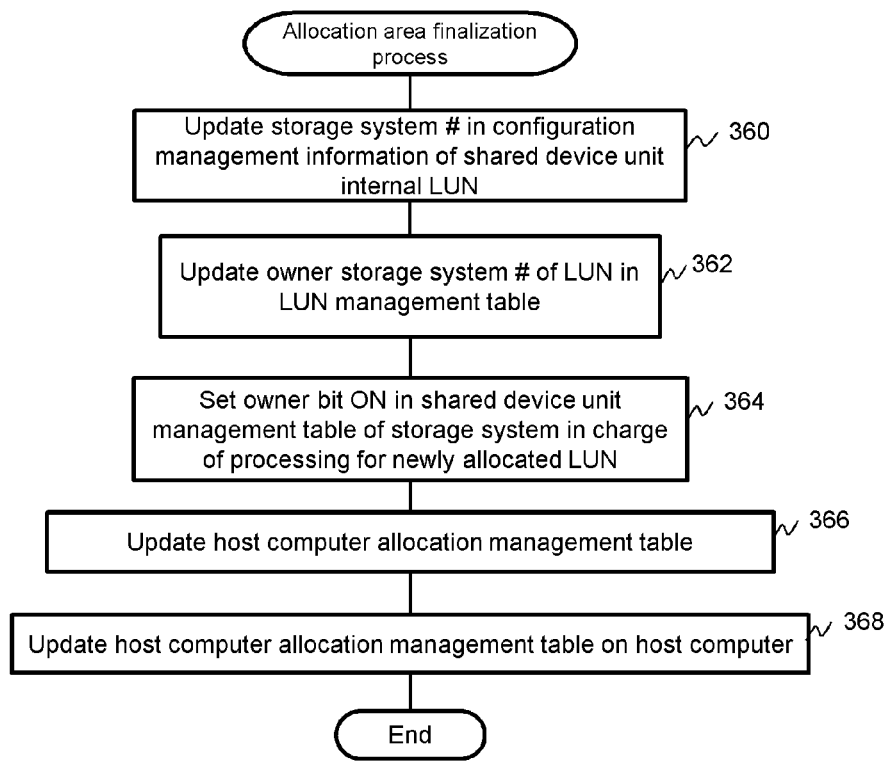
FIG. 23 is a flowchart of an allocation area finalization process related to the first example.

FIG. 23 is a flowchart of an allocation area finalization process related to the first example.

The allocation area finalization process corresponds to the processing of Step 348 in FIG. 22.

Initially, in Step 360, the management server 14 updates the storage system number 202b, which corresponds to the internal LUN 202a corresponding to an allocatable LU, in the configuration management information 202 of the shared device unit configuration management table 200 corresponding to the shared device unit 34 for which an allocation area has been decided. The owner storage system number 202b may be a default value, or may be configured as the smallest number inside the storage system 18.

Next, in Step 362, the management server 14 updates the owner storage system number 102g corresponding to the LUN of an allocatable LU related to the shared LUN management table 102 of the LUN management table 74 of the shared device unit 34 to the owner storage system number 202b updated in Step 360.

Next, in Step 364, the management server 14 accesses the consolidated shared management table 279 corresponding to an allocation-target shared device unit 34 in the shared device unit management table 278 of the storage system 18, which corresponds to the owner storage system number 202b updated in Step 360. Next, the management server 14 updates the owner bit 279g, which corresponds to the LUN of the LU, to ON ("1") in the consolidated shared management table 279.

Next, in Step 366, the management server 14 accesses the management information 90, which corresponds to the allocation-destination host computer 10 of the host computer allocation management table 72. The management server 14 updates the owner storage system number 94 corresponding to the host LUN 92, which corresponds to the allocatable LU in the management information 90 corresponding to the allocation-destination host computer 10, to the storage system number 202b updated in Step 360.

Lastly, the management server 14 accesses the host computer allocation management table 257, which is stored in the allocation-destination host computer 10, and the same as in Step 366, updates the owner storage system number, which corresponds to the host LUN corresponding to the allocatable LU, to the owner storage system number 202b updated in Step 360, and ends the allocation area finalization process.

Figure 24:
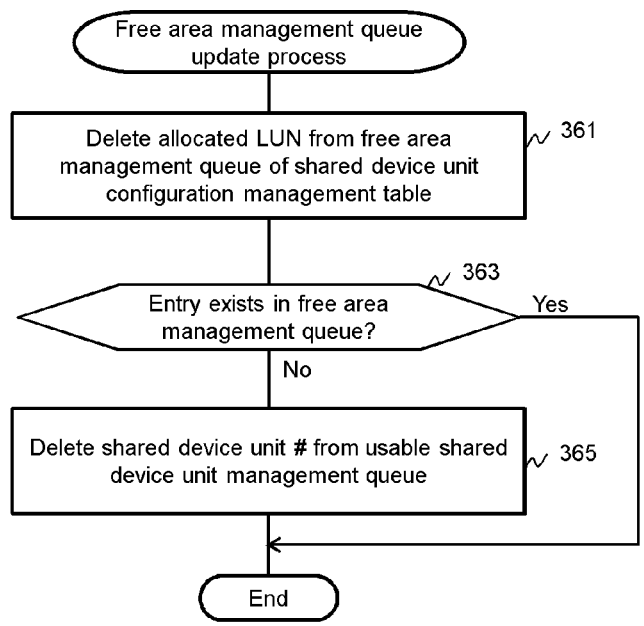
FIG. 24 is a flowchart of a free area management queue update process related to the first example.

FIG. 24 is a flowchart of a free area management queue update process related to the first example.

The free area management queue update process corresponds to the processing of Step 350 in FIG. 22.

Initially, in Step 361, the management server 14 deletes the entry showing the LUN of the newly allocated LU 302 from the free area management queue 204 of the configuration management table 182 of the allocation-target shared device unit 34. Next, in Step 363, the management server 14 determines whether an entry exists in the free area management queue 204 accessed in Step 361.

In a case where the result is that an entry exists in the free area management queue 204 accessed in Step 361 (Step 363: Yes), the management server 14 ends the free area management queue update process.

Alternatively, in a case where the result is that an entry does not exist in the free area management queue 204 accessed in Step 361 (Step 363: No), in Step 365, the management server 14 deletes the entry (for example, entry 199) showing the device unit number of the relevant shared device unit 34 from the usable shared device unit management queue 196 of the shared determination information 180 in the shared device unit management table 78, and ends the free area management queue update process.

Next, an I/O processing request process, which is executed when an I/O processing request has been received from the host computer 10, will be explained. The I/O processing request, for example, is issued as a command comprising the host LUN information of an I/O processing-target and the like.

Figure 25:
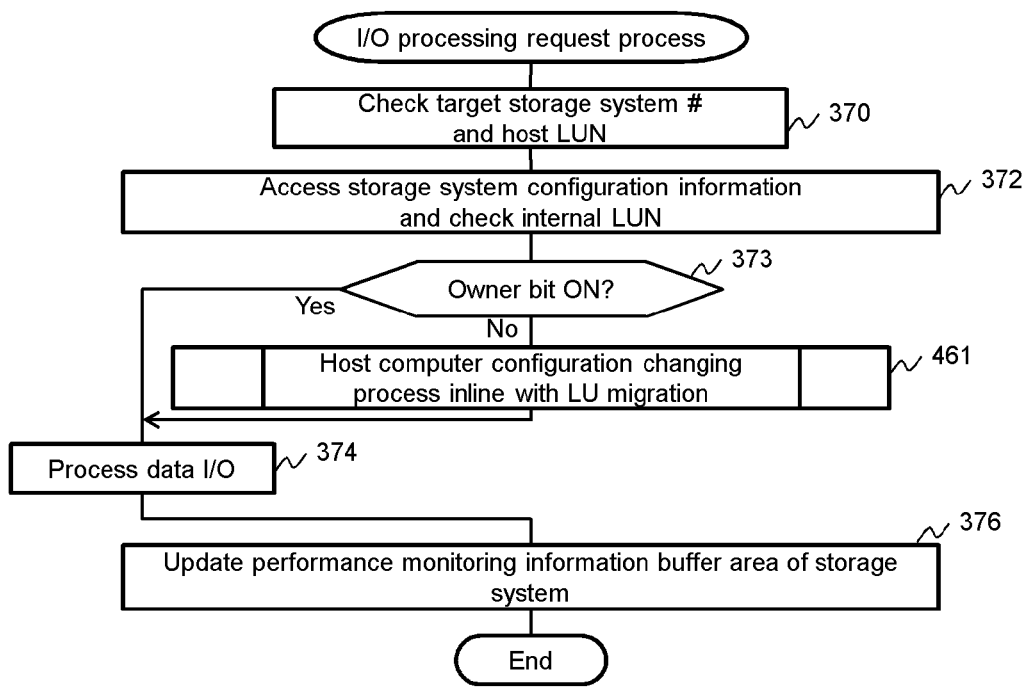
FIG. 25 is a flowchart of an I/O processing request process related to the first example.

FIG. 25 is a flowchart of an I/O processing request process related to the first example.

Initially, in Step 370, the host computer 10 accesses the host computer allocation management table 257 stored in the host computer 10, which is the source of the I/O processing request, and checks the owner storage system number corresponding to the storage system 18 that processes the LU (referred to as target LU in the explanation of the processing of FIG. 25), which is the target of the I/O processing request.

Next, in Step 372, the storage system 18 accesses the storage controller 28 of the storage system 18 corresponding to the storage system number, which was checked in Step 370, references the configuration information 268, and checks the internal LUN (110b, 270b) corresponding to the target LU host LUN.

Next, in Step 373, the storage system 18 determines whether the owner bit 279g corresponding to the target LUN in the configuration information 268 is ON, that is, whether the LU corresponding to the target LUN is a LU capable of being processed by the relevant storage system 18.

In a case where the result is that the LU is not capable of being processed by the storage system 18 (Step 373: No), this means that the storage system 18 in charge of processing the relevant LU has undergone a change. Hence, in line with this, in Step 461 the host computer configuration changing process for the host computer 10 is implemented. The contents of the processing of Step 461 will be explained in detail using FIG. 31B.

In a case where the LU is capable of being processed by the storage system 18 (Step 373: Yes) or when Step 461 has ended, nNext, in Step 374, the storage system 18 access the storage medium 50 corresponding to the relevant internal LUN, and performs an I/O process with respect to a data area of the first physical address corresponding to the relevant internal LUN.

Lastly, in Step 376, the storage system 18 accesses the storage controller 28 of the storage system 18, which corresponds to the storage system number checked in Step 370, stores information related to the IOPS performance of the relevant I/O process in the performance monitoring information buffer area 270, and ends the I/O processing request process.

Next, an overview of a process for changing a storage system in charge of an allocation area will be explained.

Figure 26:
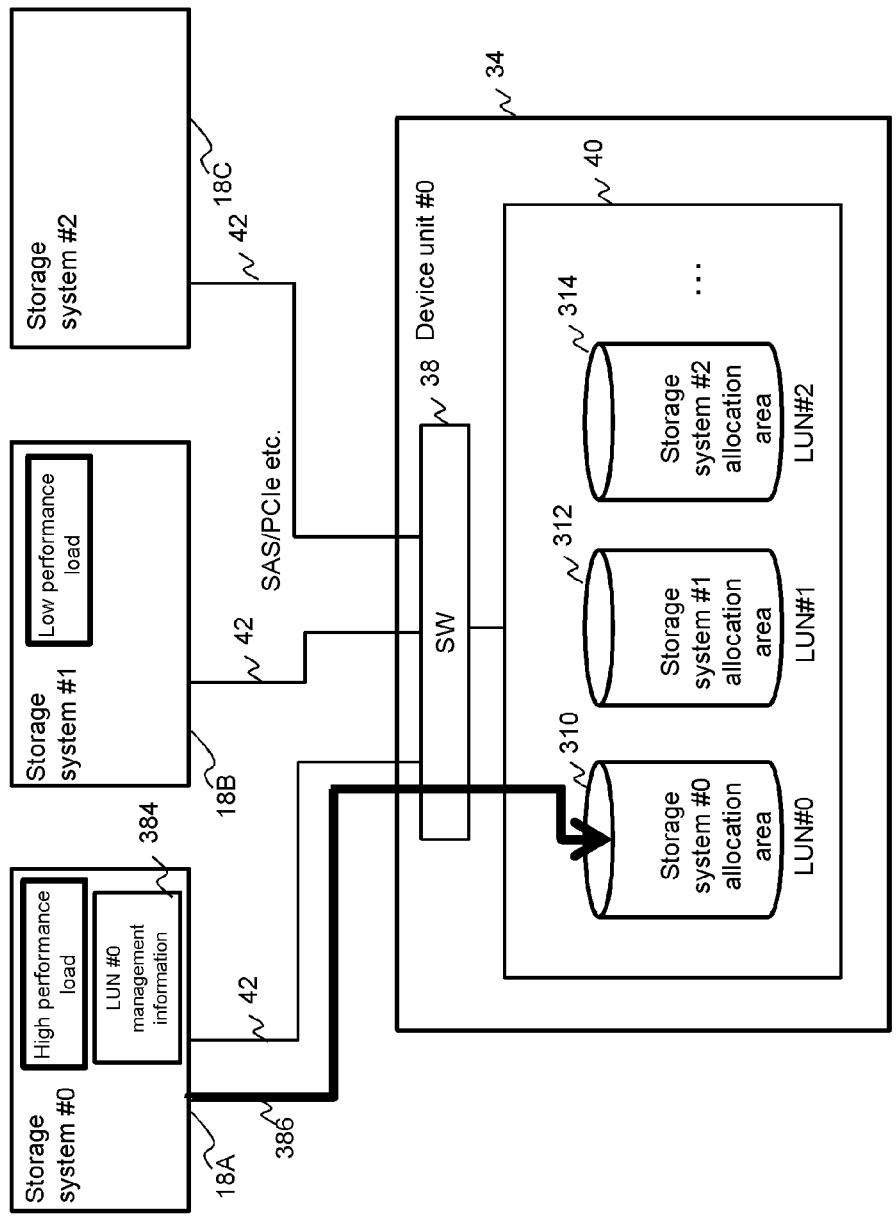
FIG. 26 is a conceptual drawing showing a performance load state at a certain time point related to the first example.
Figure 27:
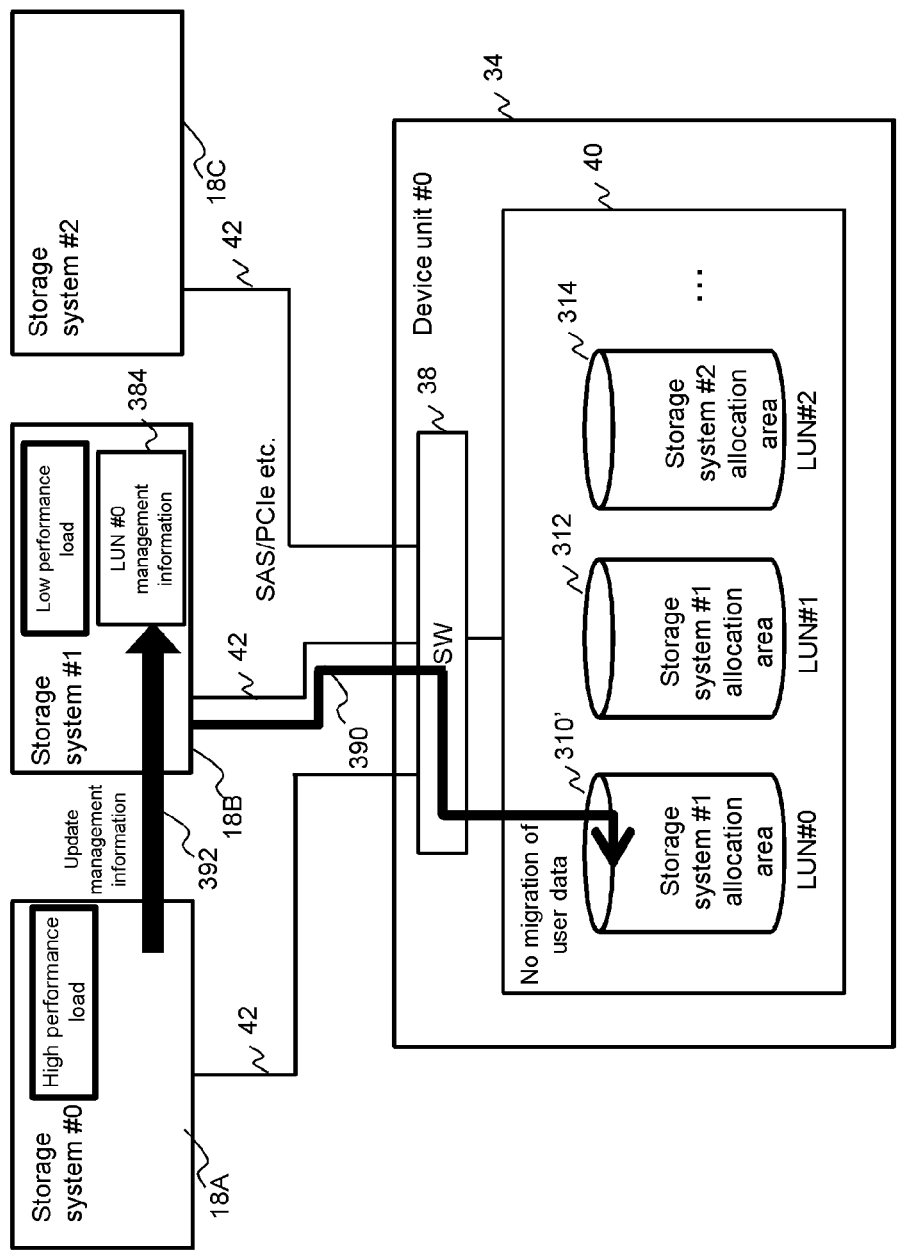
FIG. 27 is a conceptual drawing showing the state of a post-change allocation area of a storage system in charge related to the first example.

FIG. 26 is a conceptual drawing showing a performance load state at a certain time point related to the first example. FIG. 27 is a conceptual drawing showing the state of a post-change allocation area of a storage system in charge related to the first example.

It is supposed that at a certain time point, as shown in FIG. 26, the allocation area 310 is allocated to the storage system #0 (storage system 18A), and the management information 384 of the LUN #0 is stored in the storage system #0 (storage system 18A). It is also supposed that the performance load of the storage system #0 (storage system 18A) is high, the performance load of the storage system #1 (storage system 18B) is low, and that the performance loads between the plurality of storage systems 18 are not in balance. The storage system #0 accesses the LU (allocation area 310) of the LUN #0 via the cable 386 and the switch 38.

In this state, the management server 14 changes the storage system 18 in charge of the allocation area as shown in FIG. 27. That is, in order to level the balancing of the performance loads between the plurality of storage systems 18 and effectively utilize the resources of the shared device unit 34, the management server 14 changes the owner storage system (storage system in charge) of the LUN #0 LU (allocation area 310) from the storage system. #0 (storage system 18A), for which the performance load is high, to the storage system #1 (storage system 18B) for which the performance load is low. Specifically, the method may be such that the management server 14 executes the management information update process 392 to store the LUN #0 management information 384, which has been stored in the storage system #0 (storage system 18A), in the storage system #1 (storage system 18B), eliminating the need for a migration of user data at the device level.

Next, a performance load balancing process, which balances the performance load in accordance with changing the storage system in charge of the allocation area, will be explained.

Figure 28:
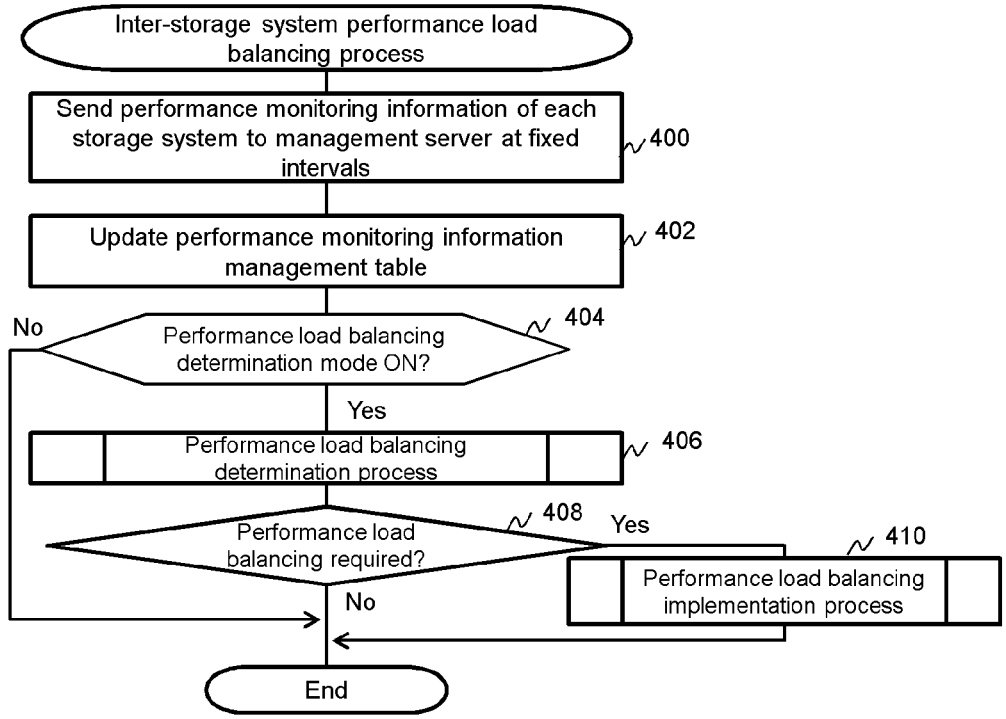
FIG. 28 is a flowchart of a performance load balancing process related to the first example.

FIG. 28 is a flowchart of a performance load balancing process related to the first example.

An overview of the performance load balancing process is as was explained using FIGS. 26 and 27.

Initially, in Step 400, each storage system 18 sends to the management server 14 performance load-related information (performance load information) stored in the performance monitoring information buffer area 270 of its own storage system 18. The timing for sending the performance load information, for example, maybe a periodic timing at fixed intervals, and this timing may be controlled from the management server 14 by sending a performance load information send request command to the storage system 18, or controlled by the storage control program 278 inside the storage system 18.

Next, in Step 402, the management server 14 reflects the performance load information, which was received in Step 400, in the performance monitoring information management table 68 to updates the performance monitoring information management table 68.

Next, in Step 404, the management server 14 determines whether or not the inter-storage system 18 performance load balancing determination mode is "ON". For example, the performance load balancing determination mode is configured by the management server 14 application program 80.

In a case where the result is that the performance load balancing determination mode is not "ON" (Step 404: No), the management server 14 ends the performance load balancing process. For example, this is the processing flow in a case where the administrator manually adjusts the performance load between the storage systems 18, or in a case where it is desirable to lock-in the storage system 18, which processes the LU 302.

Alternatively, in a case where the performance load balancing determination mode is "ON" (Step 404: Yes), in Step 406, the management server 14 performs a performance load balancing determination process (refer to FIG. 29).

Next, in Step 408, the management server 14, based on the result of Step 406, determines whether or not it is necessary to perform performance load balancing between the storage systems 18.

In a case where the result of the determination is that there is no need to perform the performance load balancing (Step 408: No), the management server 14 ends the performance load balancing process.

Alternatively, in a case where the result of the determination is that there is a need to perform the performance load balancing (Step 408: Yes), in Step 410, the management server 14 performs an inter-storage system 18 performance load balancing implementation process (refer to FIG. 30), and thereafter, ends the performance load balancing process.

Figure 29:
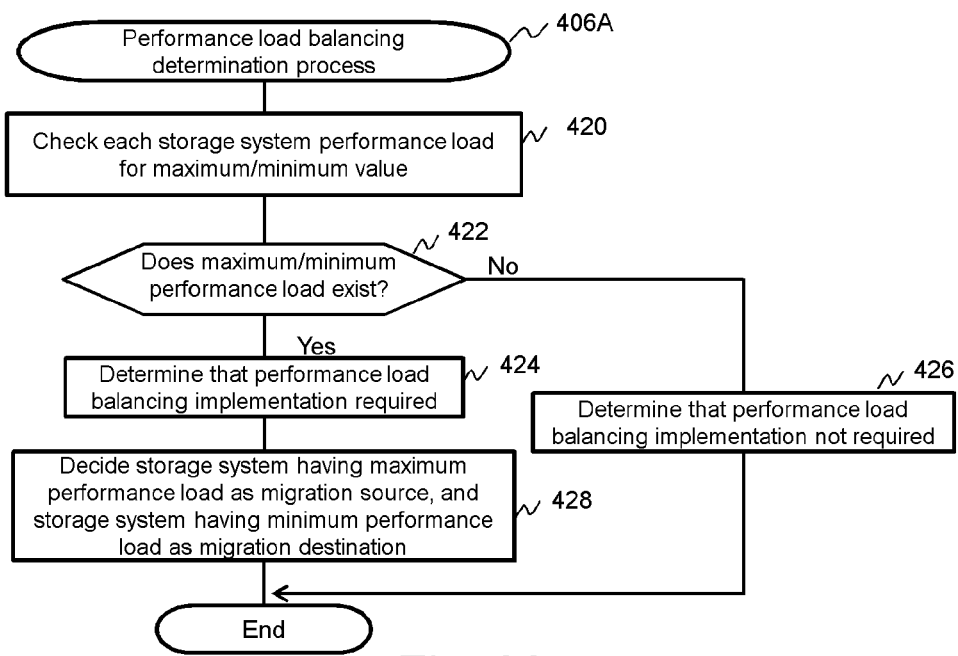
FIG. 29 is a flowchart of a performance load balancing determination process related to the first example.

FIG. 29 is a flowchart of a performance load balancing determination process related to the first example.

The performance load balancing determination process corresponds to the processing of Step 406 in FIG. 28. An example will be explained using FIG. 29.

Initially, in Step 420, the management server 14 references the performance monitoring information by storage system 230 of the performance monitoring information management table 68, and checks the storage system number 230*a* of the maximum performance load 230*b* and the storage system number 230*a* of the minimum performance load 230*b*. At this time, in a case where the utilization rate of the CPU 260 of the storage system 18, which has the minimum performance load 230*b*, exceeds a fixed value, for example, 85%, this storage system 18 is removed from the minimum performance load storage system 18 targets. The reason for this, for example, is to prevent the generation of new performance load on a storage system 18 for which the CPU 260 utilization rate is already high as a result of system performance limit values differing by storage system 18 in a case where the performance load 230*b* is the IOPS performance value. For the same reason, in a case where the utilization rate of the CPU 260 of the storage system 18, which has the maximum performance load 230*b*, falls below a fixed value, for example, 95%, this storage system 18 is removed from the maximum performance load storage system 18 targets.

Next, in Step 422, the management server 14 determines whether or not the maximum and minimum performance loads 230*b* checked in Step 420 exist.

In a case where the result is that the maximum and minimum performance loads 230*b* do not exist (Step 422: No), in Step 426, the management server 14 determines that it is not necessary to implement the performance load balancing, and ends the performance load balancing determination process.

Alternatively, in a case where the result is that the maximum and minimum performance loads 230*b* exist (Step 422: Yes), in Step 424, the management server 14 determines that it is necessary to implement the performance load balancing. Next, in Step 428, the management server 14 decides that the storage system 18 having the maximum performance load 230*b* is the migration source, and that the storage system 18 having the minimum performance load 230*b* is the migration destination, and ends the performance load balancing determination process.

Figure 30:
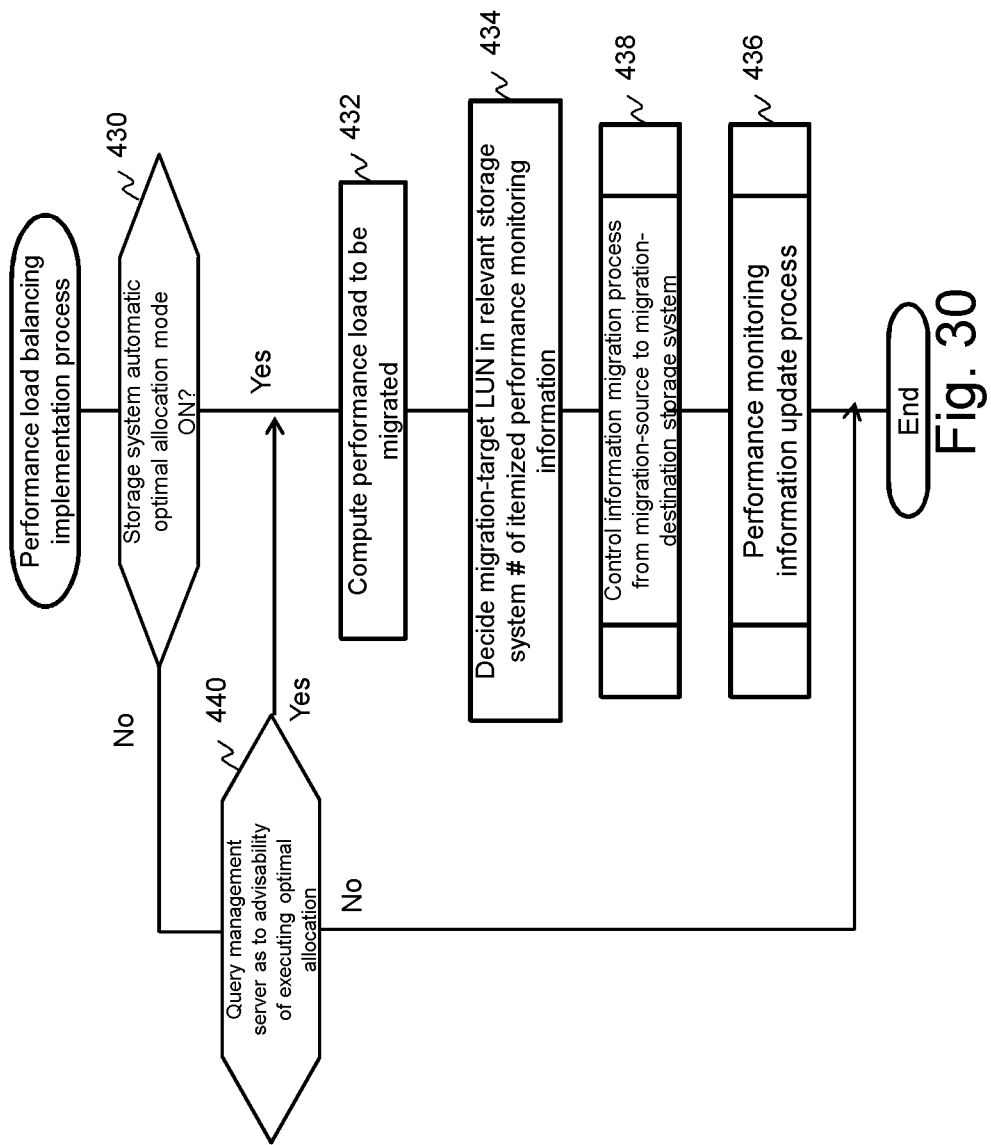
FIG. 30 is a flowchart of a performance load balancing implementation process related to the first example.

FIG. 30 is a flowchart of a performance load balancing implementation process related to the first example.

The performance load balancing implementation process corresponds to the processing of Step 410 in FIG. 28. In this example, the processing of Step 400 in FIG. 28 is not performed while executing the performance load balancing implementation process.

Initially, in Step 430, the management server 14 determines whether or not a mode, which enables the application program 80 to perform a storage system 18 automatic optimal allocation (automatic optimal allocation mode), is "ON".

In a case where the result is that the automatic optimal allocation mode is not "ON" (Step 430: No), the management server 14 queries the administrator as to whether or not storage system 18 optimal allocation may be executed. This step assumes a case in which a decision as to whether or not the storage system 18 optimal allocation is performed is made based on the judgment of the administrator.

In a case where the result is that optimal allocation must not be executed (Step 440: No), the management server 14 ends the performance load balancing implementation process.

Alternatively, in either a case where the automatic optimal allocation mode is "ON" (Step 430: Yes) or a case where optimal allocation may be executed (Step 440: Yes), in Step 432, the management server 14 calculates the performance load to be migrated.

An example of a method for calculating the performance load to be migrated will be explained here. A difference between the system performance limit value 90% of the migration-destination storage system 18 and the minimum performance load 230*b* is defined as the minimum difference, and the difference between the system performance limit value 90% of the migration-source storage system 18 and the maximum performance load 230*b* is defined as the maximum difference. Then, the values of the minimum difference and the maximum difference are compared, and the smaller of these values is regarded as the performance load to be migrated. In addition to this calculation method, a method in which an average value of the system performance limit values of all the storage systems 18 comprising the computer system is regarded as a threshold is also conceivable.

Next, in Step 434, the management server 14 accesses the management information 240 related to the migration-source storage system 18 in the itemized performance monitoring information 232, and based on the calculation result in Step 432, decides the internal LUN 240*a*, which corresponds to the migration-target LU.

Next, in Step 438, the management server 14 performs a control information migration process (refer to FIG. 31) for migrating control information from the migration-source to the migration-destination storage system 18. The processing of this step corresponds to the management information update process 392 shown in FIG. 27.

Lastly, in Step 436, the management server 14 executes the performance monitoring information update process for updating the performance monitoring information management table 68, and ends the performance load balancing implementation process.

Figure 31A:
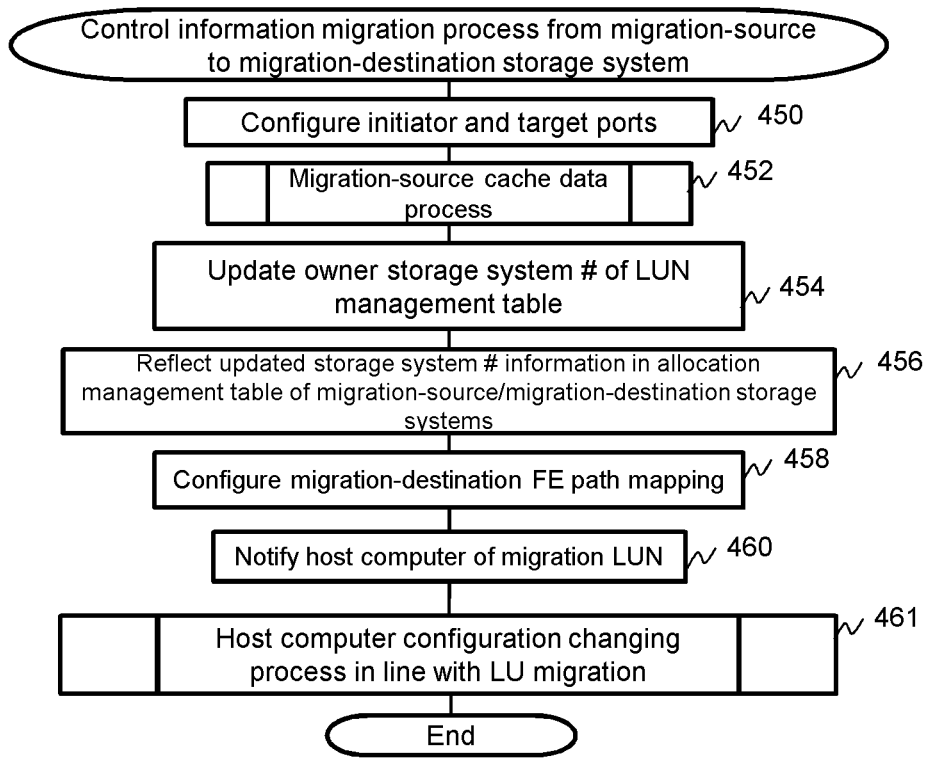
FIG. 31A is a flowchart of a control information migration process related to the first example.

FIG. 31A is a flowchart of a control information migration process related to the first example.

The control information migration process corresponds to the processing of Step 438 in FIG. 30.

Initially, in Step 450, the management server 14 configures the port of the network cable 22-coupled FEPK 32 in the migration-source storage system 18 as the initiator. Similarly, the management server 14 configures the port of the network cable 24-coupled FEPK 32 in the migration-destination storage system 18 as the target. As was also explained using FIG. 1, the network cable 22 and the network cable 24 may be configured as a single network cable.

Next, in Step 452, the storage system 18 executes a process (migration-source cache data process) with respect to data related to a migration-target LU (migration-target LU), which is being stored in the cache area 272 of the migration-source storage system 18. The migration-source cache data process comprises a migration-source cache directory cleaning process (refer to FIG. 32) and a migration-destination cache directory dirtying process (refer to FIG. 33).

Next, in Step 454, the management server 14 updates the owner storage system number 94, which corresponds to the internal LUN 240*a* of the migration-target LU, from the storage system number of the migration-source storage system to the storage system number of the migration-destination storage system with respect to the shared LUN management table 102 of the LUN management table 74.

Next, in Step 456, the management server 14, based on the result of Step 454, accesses the consolidated shared device unit management table 278 of the migration-source storage system 18 and the migration-destination storage system 18, and updates the owner bit 279*g* corresponding to the internal LUN of the migration-target LU. Specifically, the management server 14 updates the owner bit 279*g* of the consolidated shared device unit management table 278 of the migration-destination storage system 18 to OFF (that is, 0), and updates the owner bit 279*g* of the consolidated shared device unit management table 278 of the migration-source storage system 18 to ON (that is, 1).

Next, in Step 458, the management server 14 configures the mapping for the FEPK 32 port, to which is coupled the network cable 44 extending from the migration-destination storage system 18 to the host computer 10, and the migration-target LU (for example, the allocation area 310). This mapping setup may be realized using a path switching software or the like.

Next, in Step 460, at least one of the management server 14 and the storage system 18 notifies the host computer 10, which had accessed the migration-target LU, that the relevant LU has been migrated.

In a case where the storage system 18 makes the notification, one example of the notification method is as follows. In a case where the host computer 10 has generated a process for accessing a migrated LU, the host computer 10 accesses the storage system 18 for processing the migration-source LU since the relevant owner storage system number 94 in the host computer 10 configuration information 70 has not been updated. However, because the relevant owner bit 289*g* in the storage system 18 configuration information 268 is OFF, the storage system 18 for processing the migration-source LU notifies the host computer 10 of an error or the like, and the host computer 10 recognizes that the LU has been migrated.

Lastly, in Step 461, the host computer 10 implements the host computer configuration changing process in line with the LU migration for the host computer 10, and ends the processing. Step 461 will be explained in detail using FIG. 31B.

Figure 31B:
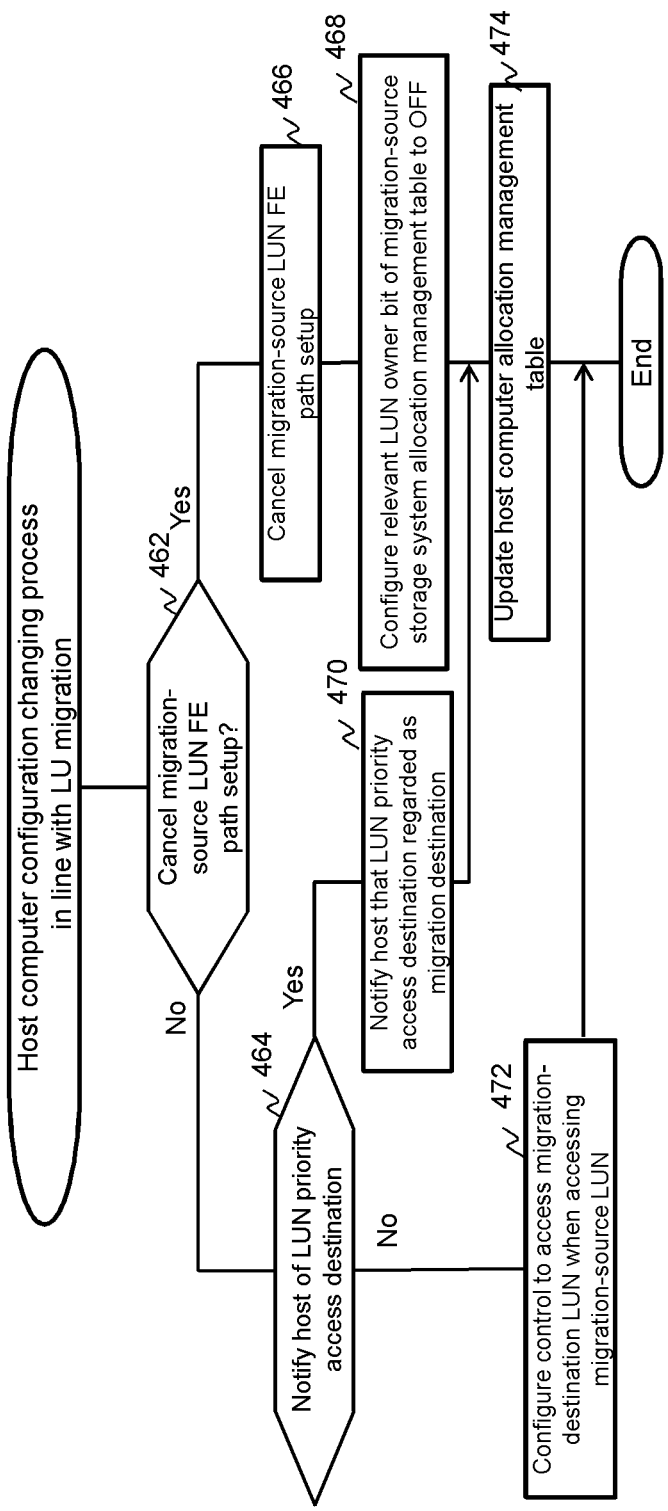
FIG. 31B is a flowchart of the host computer configuration changing process in line with the LU migration related to the first example.

FIG. 31B is a flowchart of a host computer configuration changing process in line with a LU migration related to the first example.

First, in Step 462, the management server 14 determines whether or not to cancel the mapping setup of the FEPK 32 of the migration-source LU.

In a case where the result is that the FEPK 32 mapping setup is to be canceled (Step 462: Yes), in Step 466, the management server 14 cancels the FEPK 32 mapping setup of the migration-source LU 310.

Next, in Step 468, the management server 14 accesses the consolidated shared device unit management table 278 related to the shared device unit of the migration-source storage system 18, and updates the owner bit 279*g*, which corresponds to the migration-source LU, to OFF (that is, 0).

Alternatively, in a case where the FEPK 32 mapping setup is not to be canceled (Step 462: No), since the host computer 10 is able to access both the migration-source LU and the migration-destination LU when the host computer 10 is coupled to the FEPK 32, in Step 464, the management server 14 determines whether or not to notify the host computer 10, which accessed the migration-source LU, to access the migration-destination LU (allocation area 310' in FIG. 27) on a priority basis. Access performed on the priority basis signifies a processing step for accessing the migration-destination LU without accessing the migration-source LU when the host computer 10 accesses the relevant LU.

In a case where the result of the determination is that the host computer 10 is not to be notified (Step 464: No), in Step 472, the migration-source storage system 18 performs a setup so that the host computer 10 accesses the migration-destination LU (for example, the allocation area 310') via the internal network 26 when accessing the migration-source LU (for example, allocation area 310). As an example of this setup, the migration-source storage system 18 enters the migration-destination storage system 18 ID number or other such identifier in the owner bit 279*g* in the relevant consolidated shared management table 279 of the migration-source LU, whereby the host computer 10 becomes able to access the migration-destination storage system 18 by way of the migration-source storage system 18 and ends the processing. Consequently, the host computer 10 can access the migration-destination storage system without updating the management information on the host computer 10 side, and the migration-source storage system can be prevented from updating or reading a LU.

Alternatively, in a case where it has been determined to notify the host computer 10 (Step 464: Yes), in Step 470, the management server 14 notifies the host computer 10 to the effect that the priority access destination is the migration-destination LU (for example, allocation area 310').

After the processing of either Step 470 or Step 468, in Step 474, the management server 14 updates the owner storage system number 94 corresponding to the host LUN to the storage system number of the storage system in charge of the migration-destination LU in the host computer allocation management table 90 related to the host computer 10, which is the access source of the migration-source LU of the host computer allocation management table 72, and ends the control information migration process.

Figure 32:
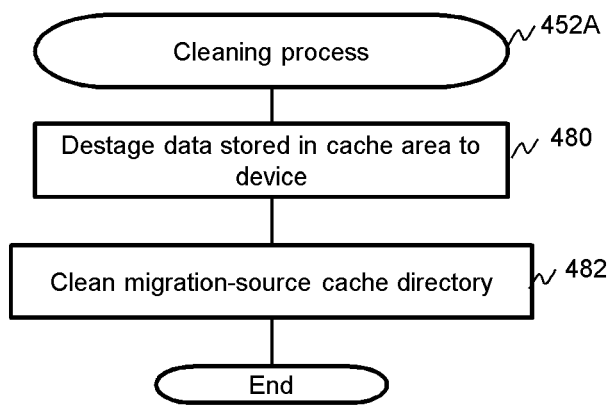
FIG. 32 is a flowchart of a migration-source cache directory cleaning process related to the first example.

FIG. 32 is a flowchart of a migration-source cache directory cleaning process related to the first example.

The migration-source cache directory cleaning process corresponds to a portion of the migration-source cache data processing of Step 452 in FIG. 31A.

Initially, in Step 480, the storage system 18 destages to a storage medium 50 the migration-source LU-related data stored in the cache area 272 of the migration-source storage system 18. During and after the processing of Step 480, the storage system 18 does not use the cache area 272 of the migration-source storage system 18 when accessing the migration-source LU until this data migration is complete.

Next, in Step 482, the management server 14 cleans the directory of the migration-source LU-related cache area 272 in the migration-source storage system 18, and updates the dirty flag 288 in the cache management table 274 so as to show that the data is not dirty, and, in addition, updates the destage permission flag 290 so as to show that destaging is not permitted, and ends the migration-source cache directory cleaning process.

Figure 33:
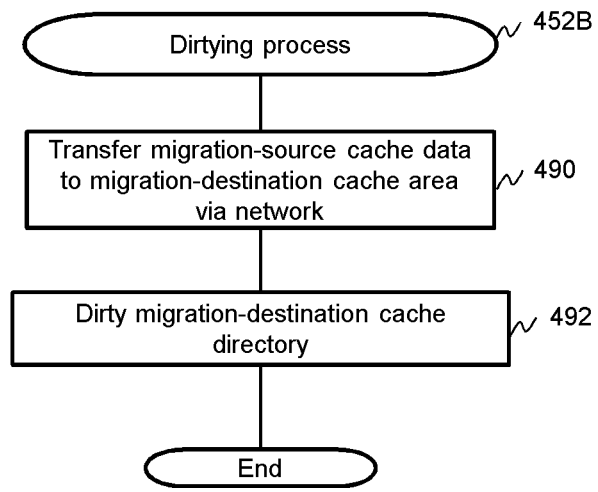
FIG. 33 is a flowchart of a migration-destination cache directory dirtying process related to the first example.

FIG. 33 is a flowchart of a migration-destination cache directory dirtying process related to the first example.

The migration-destination cache directory dirtying process corresponds to a portion of the migration-source cache data processing of Step 452 in FIG. 31A.

Initially, in Step 490, the management server 14 copies the migration-source LU-related data, which is stored in the cache area 272 of the migration-source storage system 18, to the cache area 272 of the migration-destination storage system 18 via the network 26. The network cables at this time are configured to the initiator and the target in accordance with the setup in Step 450 of FIG. 31A. Furthermore, during and after the processing of Step 490, the storage system 10 does not use the cache area 272 of the migration-source storage system 18 when accessing the relevant migration-source LU until the migration of the copy-target data has been completed.

Next, in Step 492, the management server 14 updates the dirty flag 288 of the cache management table 274 so as to show that the data is dirty in order to dirty the directory of the cache area 272 in the migration-destination storage system 18 for which the copy was completed, and, in addition, updates the destage permission flag 290 so as to show that destaging is permitted, and ends the migration-destination cache directory dirtying process.

Figure 34:
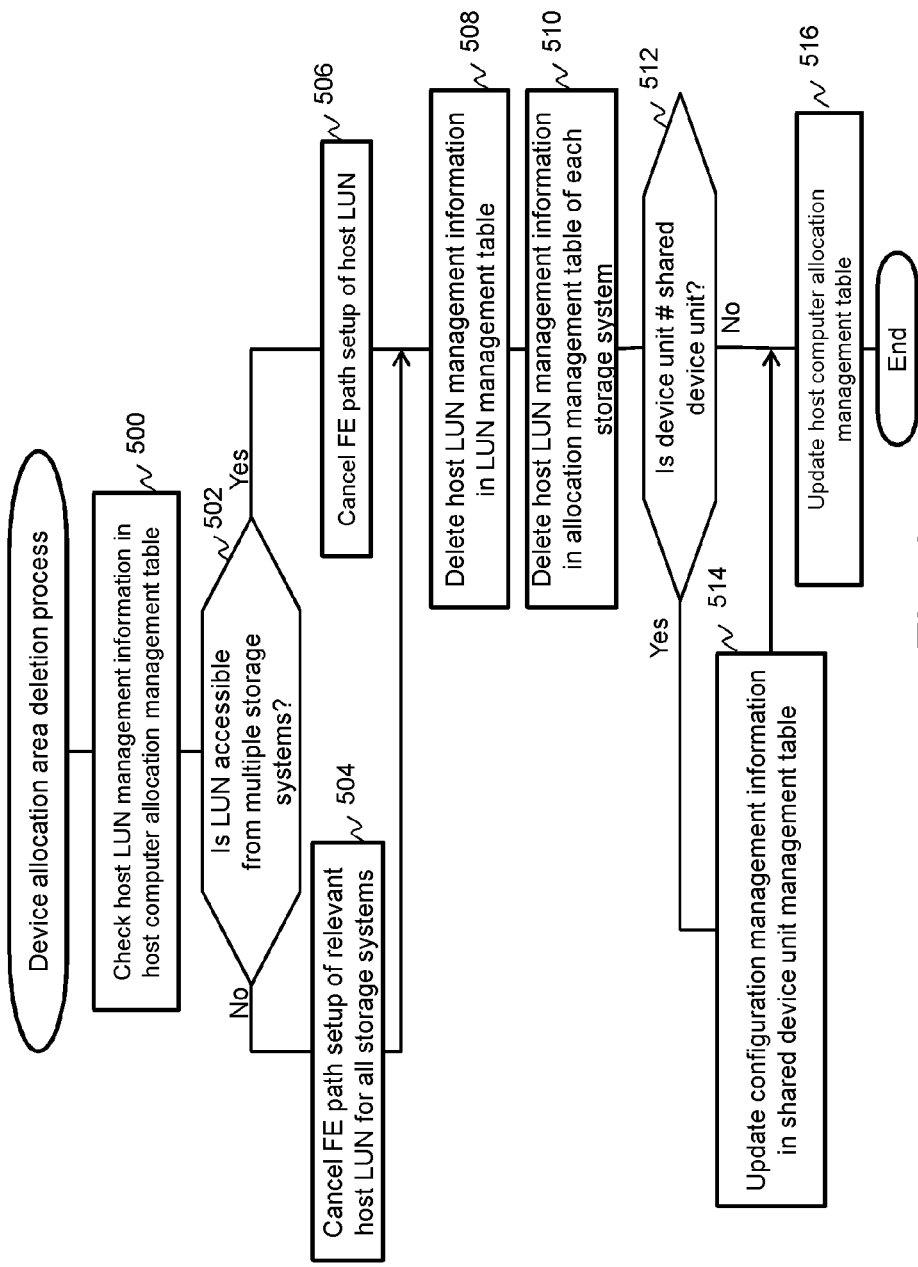
FIG. 34 is a flowchart of a device allocation area deletion process related to the first example.

FIG. 34 is a flowchart of a device allocation area deletion process related to the first example.

The device allocation area deletion process is for deleting the host LUN information to create a state in which the host computer 10 is unable to recognize the host LUN. In a case where the LU 302 corresponding to the host LUN is to be completely deleted, normally the internal LUN corresponding to the host LUN may be deleted after the device allocation area deletion process.

Initially, in Step 500, the management server 14 checks the allocation area deletion-target host LUN 92 and the owner storage system number 94 corresponding to this host LUN 92 in the host computer allocation management table 72.

Next, in Step 502, the management server 14 checks whether or not the allocation area deletion-target LUN is accessible from a plurality of storage systems 18. Specifically, in a case where, in the shared LUN management table 102A, the host LUN 102*a* and the host LUN 92 coincide, and, in addition, the owner storage system #102*g* and the owner storage number 94 coincide, the management server 14 checks that the owner storage system number 94 corresponding to this host LUN does not constitute a plurality of storage system numbers.

In a case where the result is that the allocation area deletion-target host LUN is not capable of being accessed from a plurality of storage systems (Step 502: No), in Step 504, the management server 14 deletes the mapping of the relevant host LUN 92 and the FEPK 32 with respect to all the storage systems 18.

Alternatively, in a case where the allocation area deletion-target host LUN is accessible from a plurality of storage systems (Step 502: Yes), in Step 506, the management server 14 deletes the mapping of the allocation area deletion-target host LUN 92 and the FEPK 32 in the storage system 18, which corresponds to the owner storage system number 94 checked in Step 500.

After the processing of either Step 504 or Step 506, in Step 508, the management server 14 deletes the management information of the allocation area deletion-target host LUN in the LUN management table 74. Specifically, the management server 14 deletes the entries related to the allocation area deletion-target host LUN in the exclusive device unit management table 110 and the shared LUN management table 102.

Next, in Step 510, the management server 14 deletes the management information of the allocation area deletion-target host LUN in either the storage system allocation management table 277 or the consolidated shared device unit management table 278 of each storage system 18.

Next, in Step 512, the management server 14 determines whether or not the deletion-target allocation area is in the shared device unit 34.

In a case where the result is that the deletion-target allocation area is in the shared device unit 34 (Step 512: Yes), the management server 14 changes the storage system number 202*b*, which corresponds to the allocation area deletion-target internal LUN, to null in the configuration management information 202 related to this shared device unit 34 in the shared device unit management table 78. In addition, the management server 14 adds an entry to the free area management queue 204 showing the allocation area deletion-target internal LUN. In a case where there is no entry for FAQ 220 at this stage, the management server 14 adds an entry showing the number of this shared device unit 34 to the usable shared device unit management queue 196 of the shared determination information 180.

Alternatively, either in a case where the deletion-target allocation area is not in the shared device unit 34 (Step 512: No), or after the processing of Step 514, in Step 516, the management server 14 deletes the information related to the allocation area deletion-target host LUN in the host computer allocation management table 90 of the host computer 10, which accesses the allocation area deletion-target host LUN in the host computer allocation management table 72, and ends the device allocation area deletion process.

Example 2

Next, a second example will be explained.

First, an overview of a computer system related to the second example will be given by explaining the differences with the computer system related to the first example. In the computer system related to the first example, the management server 14 controls the various processing, such as the allocation of a new area, but in the computer system related to the second example, the various processing is performed by a plurality of storage systems 18 working together. The computer system related to the second example will be explained in detail below.

Figure 35:
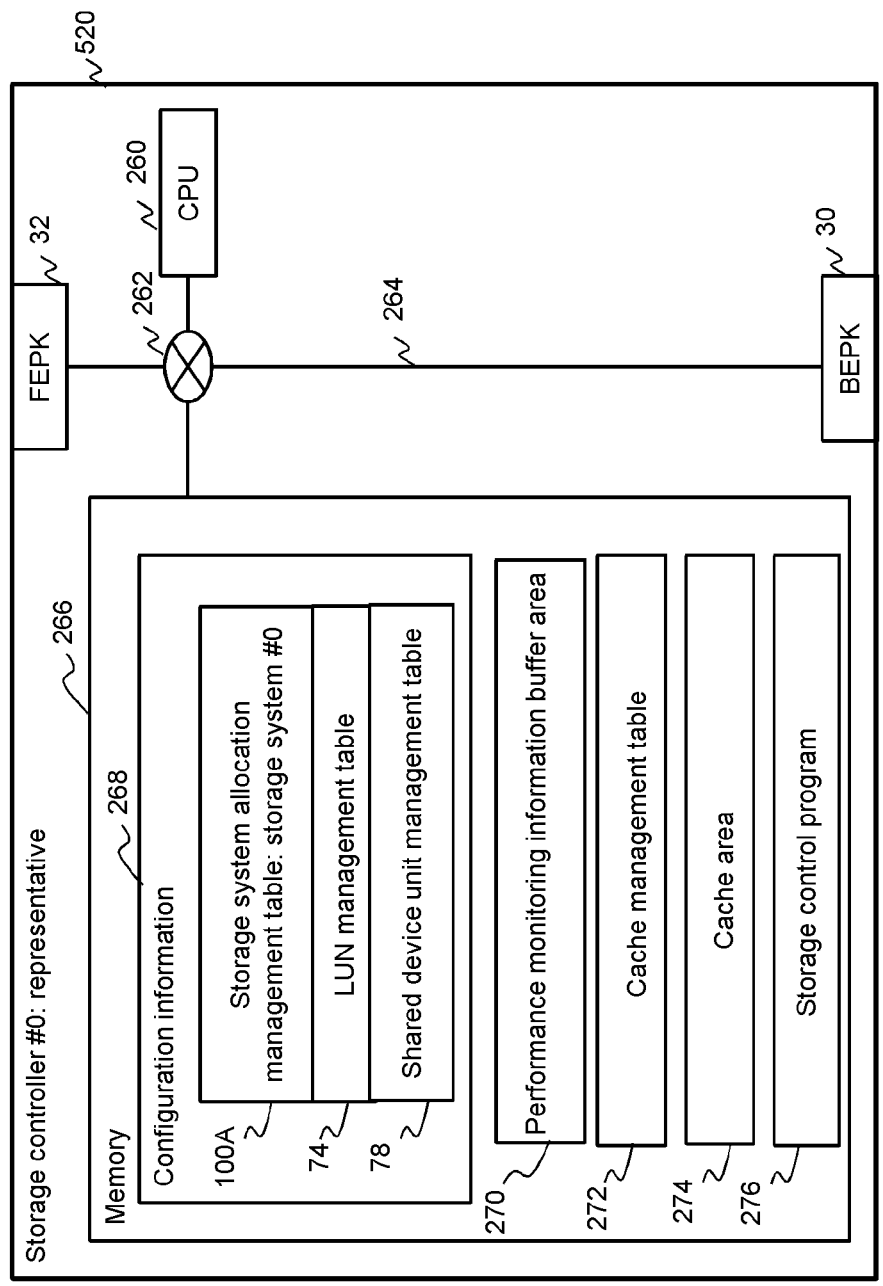
FIG. 35 is a block diagram of a storage controller related to a second example.

FIG. 35 is a block diagram of a storage controller related to the second example. The same reference signs are appended to parts, which are the same as those in the storage controller related to the first example shown in FIG. 17.

The storage controller related to the second example differs from the storage controller related to the first example in the following two points.

The first point is that any storage controller from among a plurality of storage controllers 28 is defined as the representative. In the example shown in FIG. 35, the storage controller #0 is defined as the representative. The storage controller 28, which is the representative, will be referred to as the representative storage controller 520.

In order for the plurality of storage systems 18 to work together, a storage system 18 must issue the storage systems 18 a work order for registering a new shared device unit 34. The storage controller 28 of the storage system 18, which issues this new registration work order, is the representative storage controller 520.

The second point is that the LUN management table 74 is stored as the configuration information 268 of the storage controller 28. As a pattern for the storage controller 28 to store the LUN management table 74 as the configuration information 268, a pattern by which only the representative storage controller 520 stores the LUN management table 74, and a pattern by which all the storage controllers 28 store the LUN management table 74 are conceivable. In the former pattern, the representative storage controller 520 performs the new area allocation process and other such processing. In the latter pattern, each storage controller 28 performs the new area allocation process and other such processing while checking the control information on the management server 14, and notifies all the storage systems 18 of the updated information in the LUN management table 74. This processing is the same as that of Step 362 in FIG. 23.

Next, the processing operations of the computer system related to the second example will be explained. The focus of the explanation here will be on the differences with the processing of the computer system related to the first example.

Figure 36:
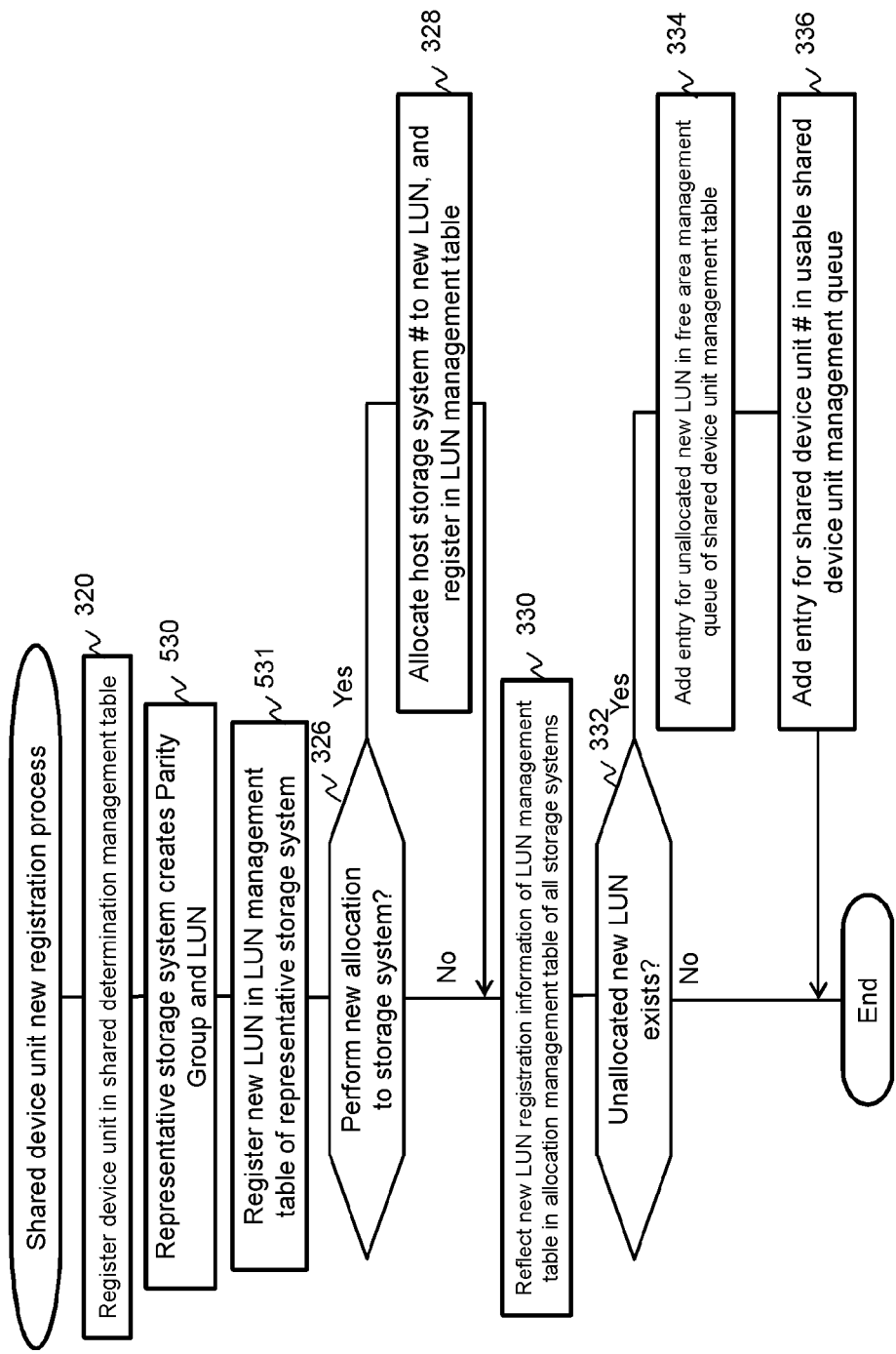
FIG. 36 is a flowchart of a shared device unit new registration process relate to the second example.

FIG. 36 is a flowchart of a shared device unit new registration process related to the second example. The same reference signs are appended to steps, which are the same as those of the shared device unit new registration process shown in FIG. 21.

Initially, in Step 320, the representative storage controller 520 receives a specification to register a new device unit from the computer system administrator, adds a device unit number 194a row for the specified device unit to the shared determination management table 194, and configures the shared bit 194b of the relevant row to "1" (Step 320). In a case where a device unit number 194a row exists for the specified device unit in the shared determination management table 194, the representative storage controller 520 configures the shared bit 194b of the corresponding row to "1" without having to perform the row addition task.

Next, in Step 530, the representative storage controller 520 creates a parity group 300 from a plurality of storage media 50 in the device units (34, 36), and, in addition, creates a LU 302 in the parity group 300. At this time, the representative storage controller 520 also performs the setup for the internal LUN and the host LUN. Regarding the configurations of the created parity group 300 and the LU 302, a default value may be configured in the representative storage controller 520 beforehand, or the management server 14 may issue a configuration indication to the representative storage controller 520 in Step 322.

Next, in Step 531, the representative storage controller 520 creates the shared LUN management table 102 of the LUN management table 74 after creating the LU 302, and registers the management information of the newly created LU 302.

Next, in Step 326, the representative storage controller 520 determines whether to perform a new allocation to the storage system for the newly registered LU 302.

In a case where the result is that a new allocation to the storage system is performed for the newly registered LU 302 (Step 326: Yes), in Step 328, the representative storage controller 520 allocates a storage system number to the newly created LU 302, and registers the relevant storage system number as the owner storage system number 102g in the shared LUN management table 102 of the LUN management table 74. The allocation of the storage system number here may be done by equitably allocating the storage system numbers of all the storage systems coupled to the relevant shared drive unit 34 round-robin style, or may be done by fixedly allocating the storage system number of one storage system. However, from the standpoint of performance, the round-robin approach is more practical.

Alternatively, either in a case where a new allocation to the storage system is not performed for the newly registered LU 302 (Step 326: No), or after Step 328 has ended, in Step 330, the representative storage controller 520 reflects the information of the shared LUN management table 102 of the updated LUN management table 74 in the consolidated shared device unit management table 278 of the storage controllers 28 in all the storage systems 18 coupled to the relevant shared device unit 34. At this time, the storage controller 28, which received the indication from the representative storage controller 520, configures to "1" the owner bit 279g of the row, which corresponds to the host LUN 279a of the LU for which this storage system 18 is in charge of processing, in the consolidated shared management table 279.

Next, in Step 332, the representative storage controller 520 checks whether or not the storage system has an unallocated newly created LU 302.

In a case where the result is that the storage system has an unallocated newly created LU 302 (Step 332: Yes), in Step 334, the representative storage controller 520 adds an entry corresponding to the unallocated newly created LU 302 to the free area management queue 204 in the relevant shared device unit management table 200 of the shared device unit management table 78.

Next, in Step 336, the representative storage controller 520 adds an entry corresponding to the device unit number of the relevant shared device unit 34 to the usable shared device unit management queue 196, and ends the shared device unit new registration process. In a case where the storage system does not have an unallocated newly created LU 302 (Step 332: No), the representative storage controller 520 ends the shared device unit new registration process.

As explained hereinabove, in the computer system related to the second example, it is possible for a plurality of storage controllers 28 to work together to register a new shared device unit in the storage system.

Example 3

Next, a third example will be explained.

First, an overview of a computer system related to the third example will be given by explaining the differences with the computer system related to the first example. In the computer system related to the first example, the type of the storage medium 50 inside the shared device unit 34 was not particularly limited, but in the computer system related to the third example, the storage medium 50 is a flash drive 550. Although the same configuration and control as those of the first example and the second example are possible even though the storage medium 50 is a flash drive 550, in the third example, a configuration control method, which is possible using a flash storage 552 in a flash drive 550, and which differs from that of the first example and the second example, will be performed. The computer system related to the third example will be explained in detail below.

Figure 37:
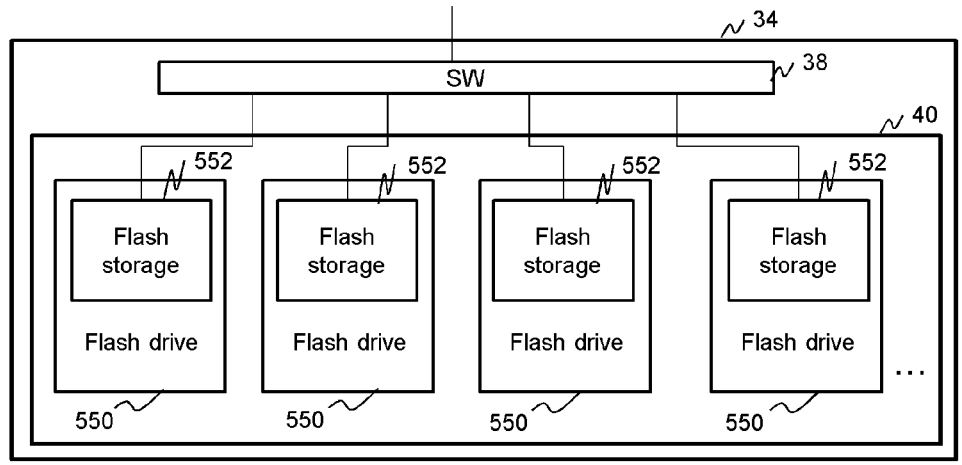
FIG. 37 is a block diagram of a device unit related to a third example.

FIG. 37 is a block diagram of a device unit related to the third example. The same reference sign is appended to a configuration, which is the same as that of the device unit related to the first example shown in FIG. 2.

The shared device unit 34 comprises a switch 38, and a device 40 comprising a plurality of flash drives 550. The flash drive 550 and the switch 38 are coupled via a cable. The flash drive 550 comprises a flash storage 552.

Figure 38A:
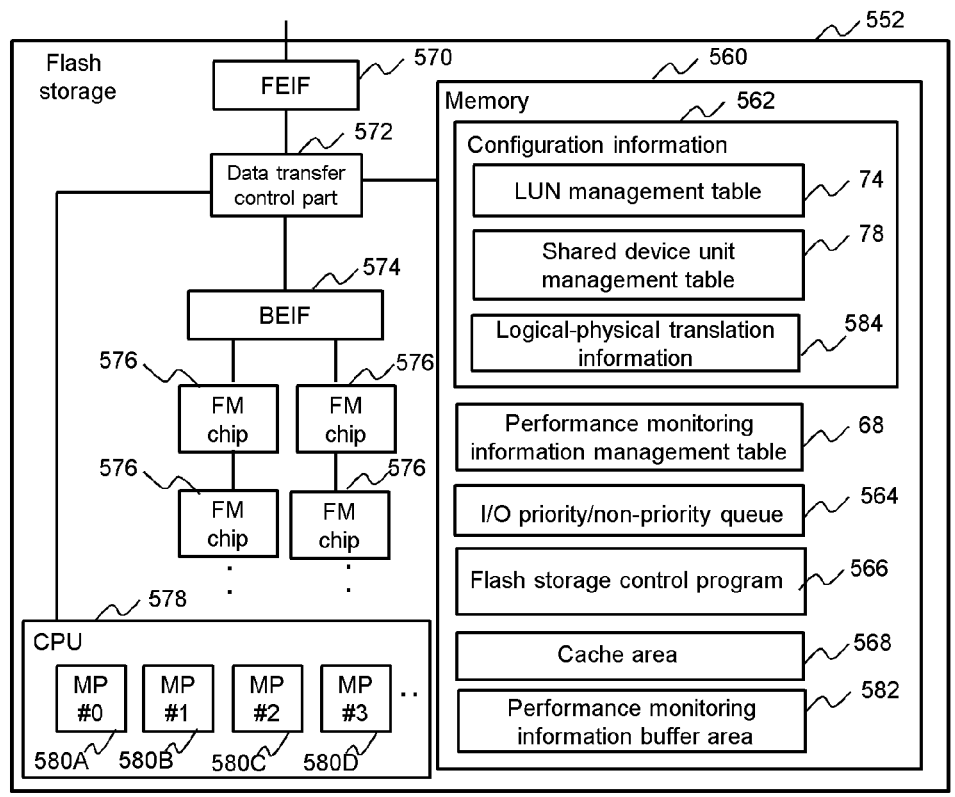
FIG. 38A is a block diagram of a flash storage related to the third example.

FIG. 38A is a block diagram of a flash storage related to the third example.

The flash storage 552 comprises a FEIF (Front End IF) 570, a CPU 578, a memory 560, a BEIF (Back End IF) 574, one or more flash memory (FM) chips 576, and a data transfer control part 572. The FEIF (Front End IF) 570, the CPU 578, the memory 560, and the BEIF (Back End IF) 574 are coupled via the data transfer control part 572.

The FEIF 570 is coupled to the switch 38 via a cable. The CPU 578 stores a plurality of microprograms (MP) 580, and is able to perform I/O processing and so forth in parallel.

The memory 560 stores configuration information 562, a performance monitoring information management table 68, an I/O priority/non-priority queue 564, a flash storage control program 566, a caching area 568, and a performance monitoring information buffer area 582. The I/O priority/non-priority queue 564 will be explained in detail using FIG. 39. The configuration information 562 stores the LUN management table 74, the shared device unit management table 78, and logical-physical translation information 584. The logical-physical translation information 584 manages a corresponding relationship between a unique logical address inside the flash storage 552 and a physical layer of the FM chip 576. The logical-physical translation information 584 will be explained in detail further below. The flash storage control program 566 is for executing various processes for controlling the flash storage. The caching area 568 is for use in data caching. The performance monitoring information buffer area 582 is for temporarily storing performance monitoring information. The BEIF 574 is an interface for coupling the FM chip 576, and a plurality of FM chips 576 are coupled to the BEIF 574. The FM chip 576 stores user data and so forth.

Figures 38B, 39:
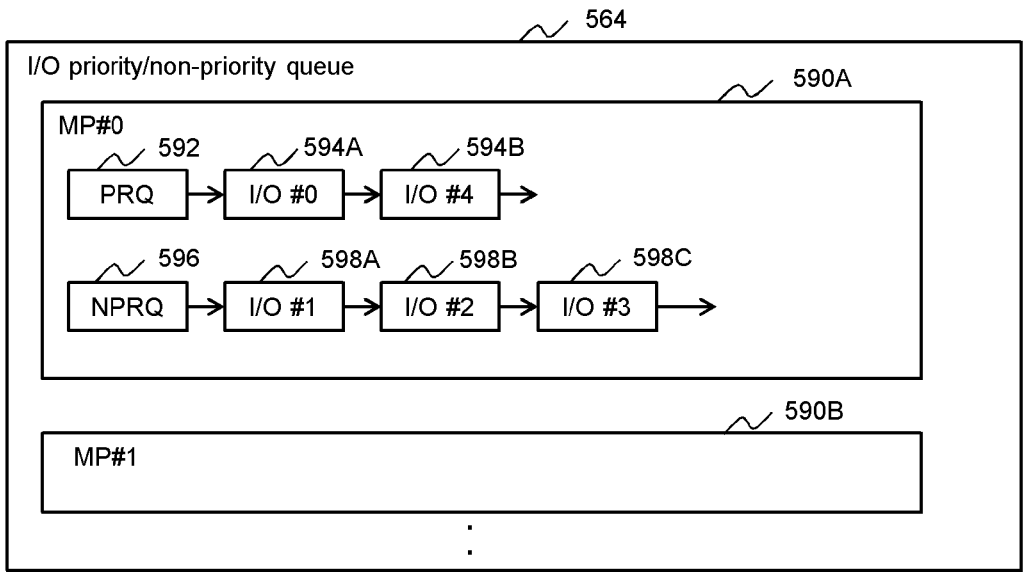
FIG. 38B is a block diagram of logical-physical translation information related to the third example.
FIG. 39 is a block diagram of an I/O priority/non-priority queue related to the third example.

FIG. 38B is a block diagram of logical-physical translation information related to the third example.

In the flash drive 500, data is controlled in units of blocks, and data is managed in units of pages, which are partitioned into units smaller than a block. The logical-physical translation information 584 is a table for managing the information of a logical address of a block (block logical address). The logical-physical translation information 584 stores a block number (#) 2068, a FM chip number (#) 2070, a FM chip block number (#) 2071, a page number (#) 2072, and an offset address 2074 for each in-block page.

The block logical number 2068 is the logical address when accessing data inside the storage in block units. The FM chip number 2070 stores the number of the FM chip 576 in which the relevant block logical address 2068 is stored. The FM chip block number 2072 is the number associated with a single block in a case where the inside of the FM chip has been divided into fixed block sizes, and stores the number corresponding to the relevant block logical address. The page number 1072 is the number of a page obtained by partitioning the FM chip block into even smaller units.

FIG. 39 is a block diagram of an I/O priority/non-priority queue related to the third example.

The I/O priority/non-priority queue 564 is for managing the priority of an I/O process. For example, for an I/O process, such as a Read request from the host computer 10, it is desirable to speed up processing (=processing has a high priority) in order to improve host response. Alternatively, for an I/O process involving an application process for performing a data copy in the background, a slight processing delay does not really matter (=processing has a low priority). In addition, Write data is asynchronously written to a device after the Write data has been stored in the storage system memory and a Write-processing-complete notification has been issued to the host computer 10 in order to improve host response in a case where a Write request has been received from the host computer 10. The processing load for writing the Write data to the device is high, and to further improve the efficiency of the asynchronous Write data write process, there may be cases in which the write to the device is performed after gathering the Write data together to a certain extent (called a gather write), and the load of this one process is high in this case. Ordinarily, the I/O priority/non-priority queue 564 is managed on the respective storage controller 28, but in a case where a plurality of storage systems 18 are coupled to a single shared device unit 34 such as the present invention, the device unit 34 is unable to determine the priority of the processing when a certain storage system 18 has issued a gather write indication and a different storage system 18 has issued an indication for a high priority process, such as a host computer 10 Read process, and there is the danger that the gather write process will be executed first causing the Read process host response to deteriorate. Consequently, in this example, I/O processing is performed efficiently in accordance with using the I/O priority/non-priority queue 564 based on the flash storage 552 to manage the I/O processing sequence by priority. The I/O priority/non-priority queue 564 may be managed in units of flash storages 552, FM chips, CPUs, or MPs. In FIG. 39, a case in which the I/O priority/non-priority queue 564 is managed in units of MPs in the flash storage 552 will be explained as an example.

Regarding the I/O priority/non-priority queue 564, an individual I/O priority/non-priority queue 590 (590A, 590B, and so forth) is allocated to each MP 580 of the CPU 578. For example, the individual I/O priority/non-priority queue 590A is allocated to the MP #0 (MP 580A), and the individual I/O priority/non-priority queue 590B is allocated to the MP #1 (MP 580B).

The individual I/O priority/non-priority queue 590 stores a priority queue (PRQ) 592 and a non-priority queue (NPRQ) 596. An entry showing an I/O process having a high priority is managed in the priority queue 592, and an entry showing an I/O process having a low priority is managed in the non-priority queue 596. In the example shown in FIG. 39, the entry 594A showing I/O number 0 and the entry 594B showing I/O number 4, which are high priority, are coupled to the priority queue 592. Also, the entry 598A of I/O number 1, the entry 598B of I/O number 2, and the entry 598C of I/O number 3, which are low priority, are coupled to the non-priority queue 596. The priority of each I/O process, for example, is assigned by the storage control program 276 of each storage system 18. A specific process, which uses the I/O priority/non-priority queue 564, will be explained further below using FIG. 43.

Figures 40, 41:
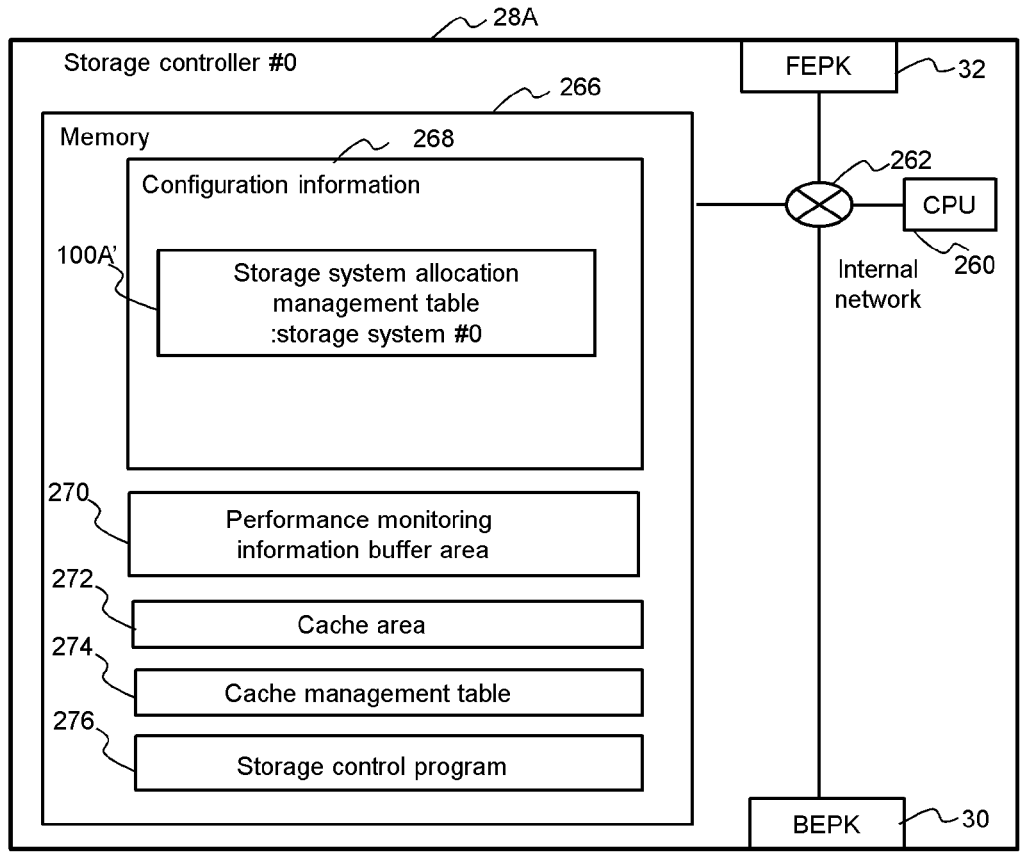
FIG. 40 is a block diagram of a storage controller related to the third example.
FIG. 41 is a block diagram of storage system allocation management information related to the third example.

FIG. 40 is a block diagram of a storage controller related to the third example. The same reference signs are appended to parts, which are the same as those in the storage controller related to the first example shown in FIG. 17.

The storage controller 28 related to the third example stores only a storage system allocation management table 100' (100A') as the configuration information 268.

FIG. 41 is a block diagram of storage system allocation management information related to the third example.

The storage system allocation management information 100' is substantially the same configuration as the storage system allocation management information 100 related to the first example shown in FIG. 7, but rather than storing only the exclusive device unit management table 110, also comprises the management information of the host LUN 92, which is allocated to the relevant storage system 18. Also, the storage system allocation management information 100' stores a first flash drive logical address 110h instead of the first physical address 110f of the storage system allocation management information 100.

The host LUN 110a is not only the host LUN, which corresponds to the LU allocated from the exclusive device unit 36, but may also be the host LUN, which corresponds to a LU allocated from the shared device unit 34. For example, by referencing the storage system allocation management information 100' shown in FIG. 41, it is clear that the LU, which corresponds to the host LUN 110a "2", is allocated from the device unit of the device unit number 110g "0", that is, the shared device unit 34. In a case where the shared device unit 34 here comprises a flash drive 550, a flash storage 552 is mounted in the flash drive 550, and as such, it is possible to show only the area allocated to the storage system 18. Consequently, the management information for all the areas allocated to all the storage systems 18 need not be stored for each storage system using the shared device unit management table 278 as shown in FIG. 18 of the first example.

The first flash drive logical address 110h is the first logical address in the flash drive 550 of the LU, which corresponds to the internal LUN 110b. The in-block page number for a LU can be calculated by dividing the first flash drive logical address 110h by the size of the in-block page.

Next, the processing of the computer system related to the third example will be explained. The explanation will focus on the differences with the processing of the computer system related to the first example.

Figure 42:
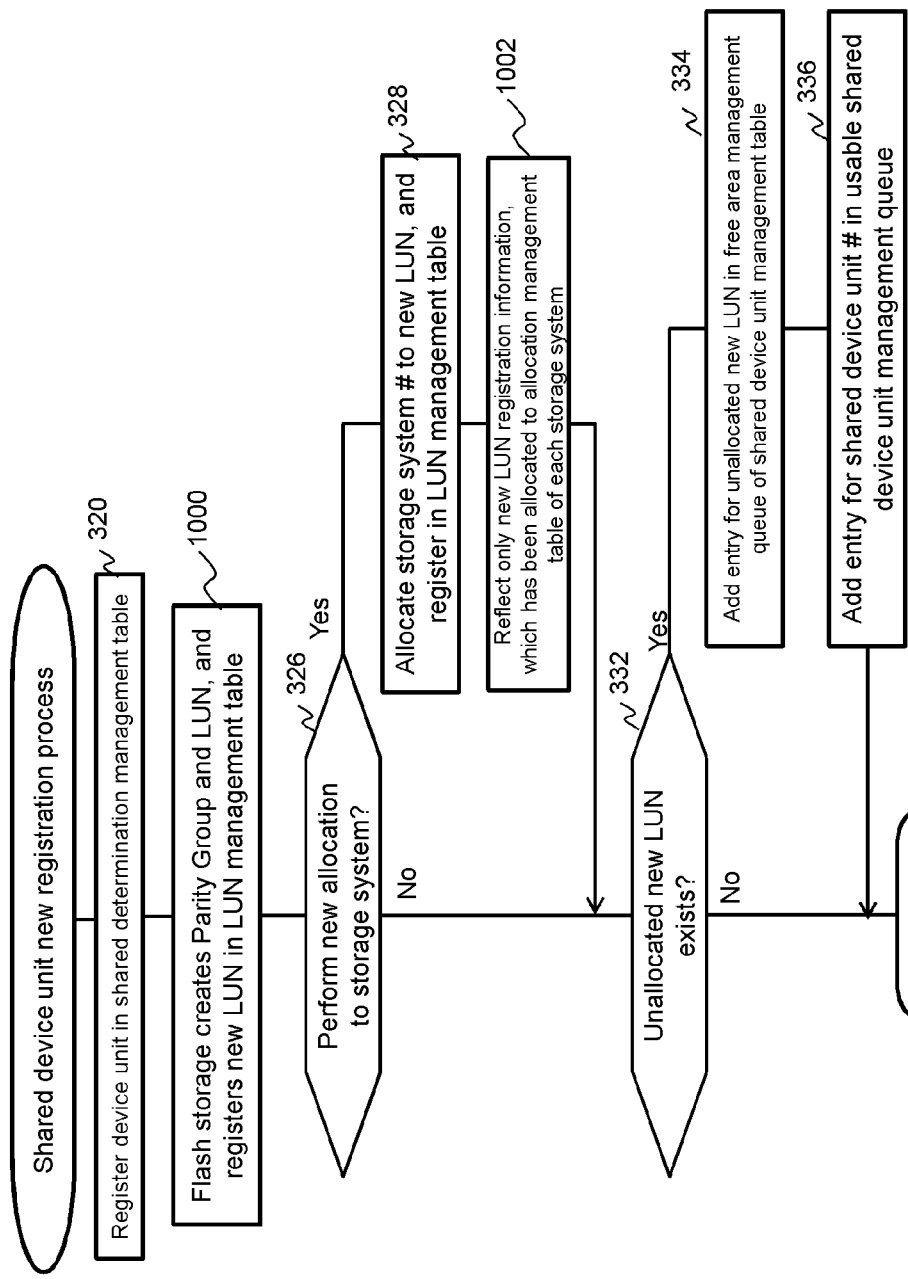
FIG. 42 is a flowchart of a shared device unit new registration process related to the third example.

FIG. 42 is a flowchart of a shared device unit new registration process related to the third example. The same reference signs are appended to parts, which are the same as those of the shared device unit new registration process related to the first example shown in FIG. 21, and detailed explanations will be omitted.

Initially, in Step 320, the management server 14 registers a new-registration shared device unit 34 in the shared determination management table 180.

Next, in Step 1000, the flash storage 552 (for example, of the plurality of flash storages 552 inside the shared device unit 34, each of one or more flash storages 552, which received a prescribed indication from a certain storage controller) creates a parity group 300 from a plurality of flash drives 550 inside the relevant shared device unit 34, and, in addition, creates a LU 302 based on the parity group 300. At this time, the flash storage 552 also performs the setups for the internal LUN and the host LUN. Regarding the configuration of the created parity group 300 and LU 302, a default value may be configured in the management server 14 beforehand, or in Step 322 the management server 14 may instruct the flash storage 552 as to the configuration. After creating the LU 302, the flash storage 552 creates a shared LUN management table 102 in the LUN management table 74, and registers the management information of the newly created LU 302.

Thereafter, the flash storage 552 advances the processing to Step 326 the same as in FIG. 21 of the first example, and in a case where Step 326 is Yes, executes the processing of Step 328. Next, in Step 1002, the flash storage 552 reflects only the registration information of the new LU 302 allocated to the relevant storage system 18 in the storage system allocation management table 100' of each storage system 18.

Alternatively, either in a case where Step 326 is No, or after the processing of Step 1002, the flash storage 552 advances the processing to Step 332, executes the subsequent processing, and ends the shared device unit new registration process.

Figure 43:
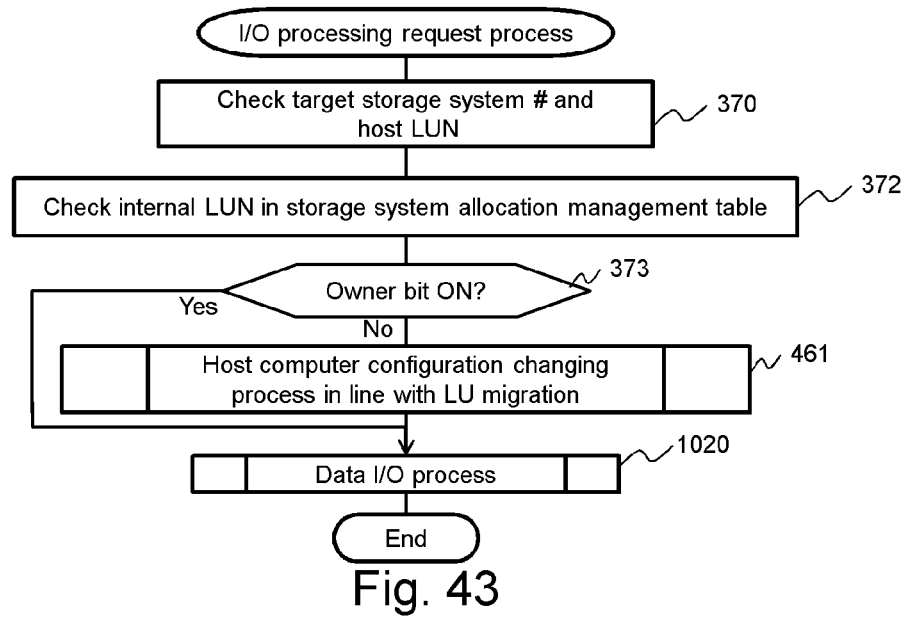
FIG. 43 is a flowchart of an I/O processing request process related to the third example.

FIG. 43 is a flowchart of an I/O processing request process related to the third example. The same reference signs are appended to parts, which are the same as those of the I/O processing request process related to the first example shown in FIG. 25, and detailed explanations will be omitted.

Initially, in Step 370, the host computer 10 accesses the host computer allocation management table 257, which is stored in the host computer 10 that is the source of the I/O processing request, and checks the host LUN corresponding to the LU, which is the target of the I/O processing request, and the owner storage system number corresponding to the storage system 18, which processes the relevant LU.

Next, in Step 327, the storage system 18 accesses the storage controller 28 of the storage system 18, which corresponds to the storage system number that was checked in Step 370, references the configuration information 268, and checks the internal LUN (110b), which corresponds to the host LUN of the target LU.

Next, in Step 373, the storage system 18 determines whether the owner bit 279g corresponding to the target LUN in the configuration information 268 is ON, that is, whether the LU corresponding to the target LUN is a LU capable of being processed by the relevant storage system 18.

In a case where the result is that the LU is not capable of being processed by the storage system 18 (Step 373: No), this means that the storage system 18 in charge of processing the relevant LU has undergone a change. Hence, in line with this, in Step 461 the host computer configuration changing process for the host computer 10 is implemented.

Lastly, in a case where the LU is capable of being processed by the storage system 18 (Step 373: Yes) or when Step 461 has ended, in Step 1020, the storage controller 28 performs the data I/O processing (refer to FIG. 44), and ends the I/O processing request process.

Figure 44:
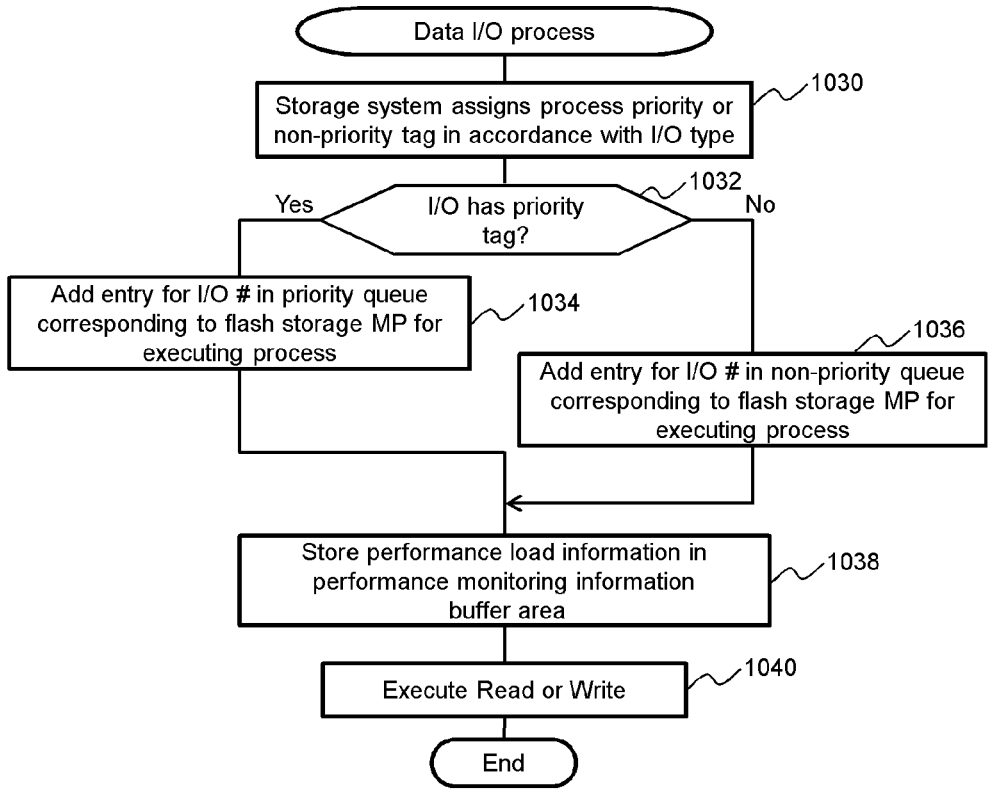
FIG. 44 is a flowchart of a data I/O process related to the third example.

FIG. 44 is a flowchart of a data I/O process related to the third example.

The data I/O process corresponds to the processing of Step 1020 in FIG. 43.

Initially, in Step 1030, the storage controller 28 of the storage system 18 determines the priority/non-priority of the I/O process in accordance with the type of I/O, and attaches either a priority or a non-priority tag to the I/O processing instruction. This I/O processing instruction is sent to the I/O-target flash drive 550.

Next, in Step 1032, when the I/O processing instruction reaches the flash drive 550 from the storage system 18, the flash storage 552 of the flash drive 550 determines whether or not a priority tag is attached to the relevant I/O processing instruction.

In a case where the result is that a priority tag is attached to the I/O processing instruction (Step 1032: Yes), in Step 1034, the flash storage 552 adds an entry showing the number of the relevant I/O processing instruction to the priority queue 592 corresponding to the MP 580, which executes the processing.

Alternatively, in a case where a priority tag is not attached to the I/O processing instruction (Step 1032: No), in Step 1036, the flash storage 552 adds an entry showing the number of the relevant I/O processing instruction to the non-priority queue 596 corresponding to the MP 580, which executes the processing.

After either Step 1034 or Step 1036 has ended, in Step 1038, the flash storage 552 stores information related to the performance load of the LU, which is the processing target of the I/O processing instruction, to the performance monitoring information buffer area 582 inside the flash storage 552.

Lastly, in Step 1040, the flash storage 552 executes the I/O processing, such as either a read or a write from/to the FM chip 576, and ends the data I/O process.

Figure 45:
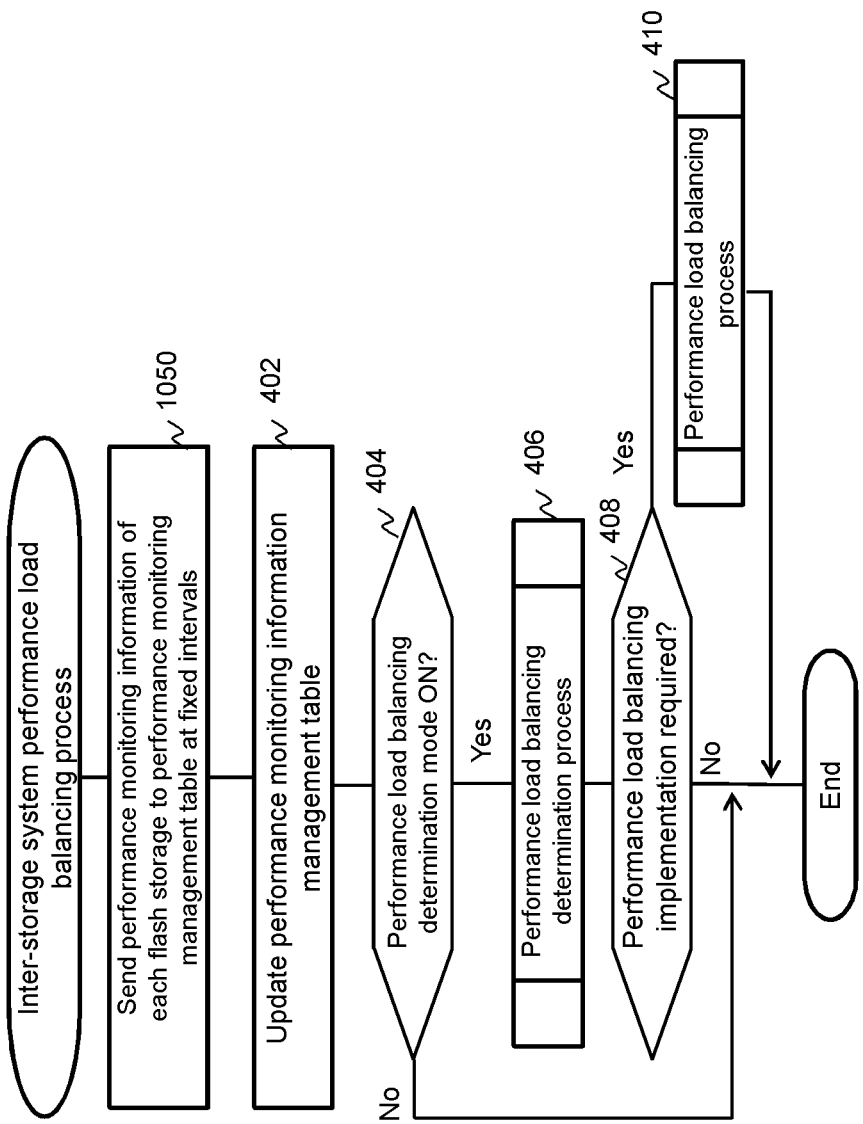
FIG. 45 is a flowchart of a performance load balancing process related to the third example.

FIG. 45 is a flowchart of a performance load balancing process related to the third example. The same reference signs are appended to parts, which are the same as those of the performance load balancing process related to the first example shown in FIG. 28, and detailed explanations will be omitted.

Initially, in Step 1050, each storage system 18 at fixed intervals sends information on the performance load, which is stored in the performance monitoring information buffer area 582 of each flash storage 552, to the performance monitoring management table 68, which manages all performance load information.

The processing of Step 402 and beyond is the same as the performance load balancing process related to the first example shown in FIG. 28.

Example 4

Next, a fourth example will be explained.

First, an overview of a computer system related to the fourth example will be explained. In the fourth example, it is assumed that the computer system utilizes a thin provisioning function and a tiered storage virtualization function.

A pool 1062, for example, comprises a mixture of storage areas of a shared device unit 34 and an exclusive device unit 36. The pool 1062 is managed in a plurality of layers called Tiers 1060 (1060A, 1060B, 1060C). As used here, a Tier is a layer obtained by partitioning an area allocated to a LU based on the characteristics of the storage media 50, which provide this area. In this example, Tier 1 (Tier 1060A) shows the layer of the area configured using high-speed storage media, and Tier 3 (Tier 1060C) shows the layer of the area configured using low-speed storage media. In a tiered storage virtualization function, the pool 1062 is managed by being partitioned into a units of data called pages 304, and realizes a reduction in the capacity of the area being used by showing an area to the host computer 10 as a virtual LU 302' but allocating a page 304 of the pool 1062 only to the area in which the data is actually being stored. In the tiered storage virtualization function, optimum page allocation and enhanced I/O processing performance are achieved by performing an inter-Tier page migration (specifically, a migration of the data stored in the page) in accordance with the page access frequency. The frequency with which the page is accessed, for example, is managed by the management server 14.

The area allocation unit of the device units 34 and 36 is either a page 304 or a chunk 306, which is a set of pages 304, but in this example, the inter-storage system migration unit for a performance load balancing process is the LU 302. Performance monitoring information and the like, for example, may be stored in the flash storage 552 of the flash drive 500 in a case where the shared device unit 34 comprises the flash drive 550. In a case where the shared device unit 34 comprises a SSD, an SAS disk, or a SATA disk other than the flash drive 550, the performance monitoring information may be stored in the management server 14.

The computer system related to the fourth example will be explained in detail below.

Figure 46:
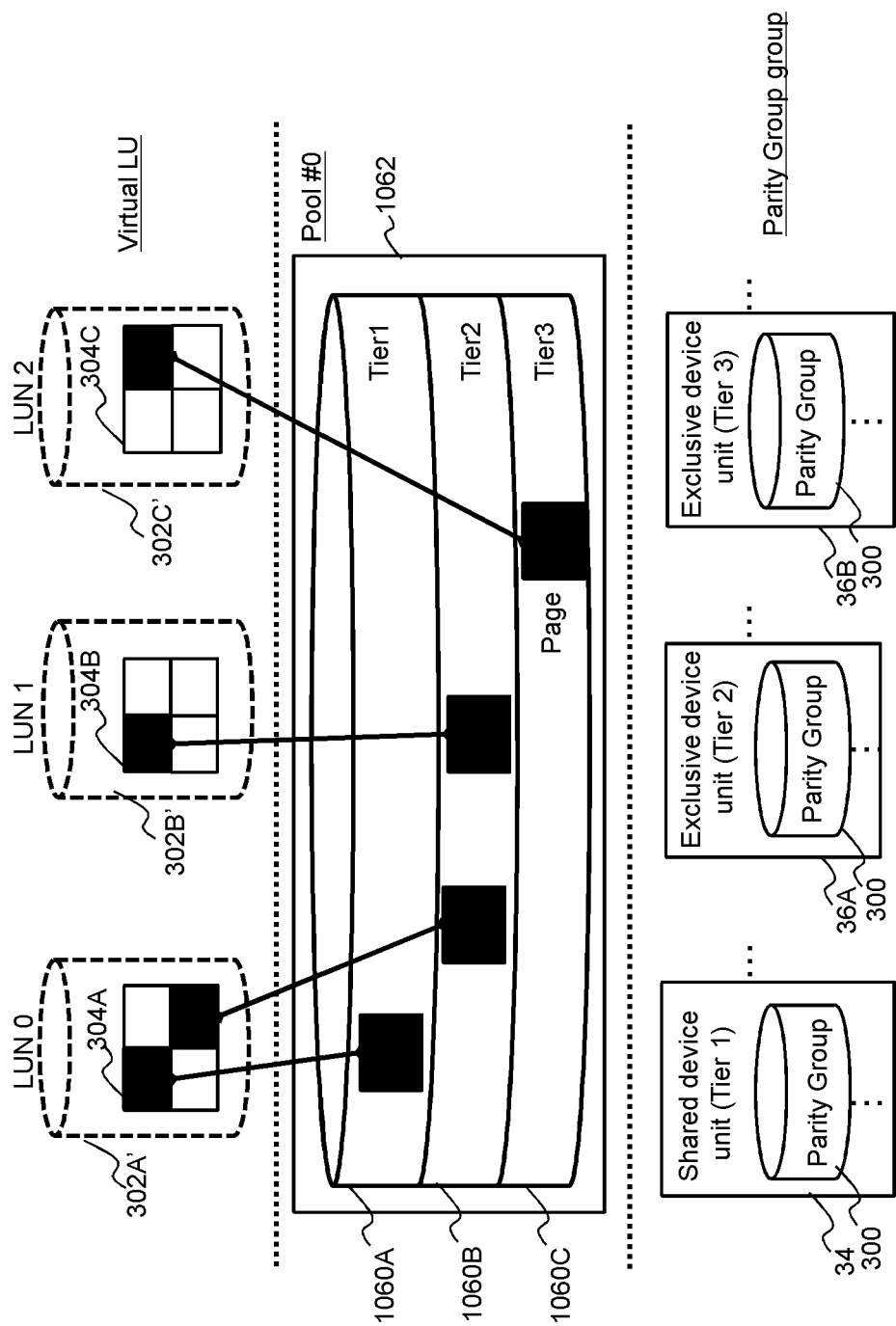
FIG. 46 is a drawing showing an overview of device allocation related to a fourth example.

FIG. 46 is a drawing showing an overview of device allocation related to the fourth example.

The pool 1062 is configured from the parity group 300 of each of the device units 34 and 36, and is managed using a plurality of Tiers 1060. FIG. 46 shows an example in which the parity group 300 of the shared device unit 34 corresponds to Tier 1, but the present invention is not limited thereto, and the Tier that a parity group 300 corresponds to is decided in accordance with the device type of the device unit, which comprises the parity group 300. Also, in FIG. 46, there are three layers of Tiers, but the number of Tier layers is not limited thereto, and may be an arbitrary number of layers.

Figure 47:
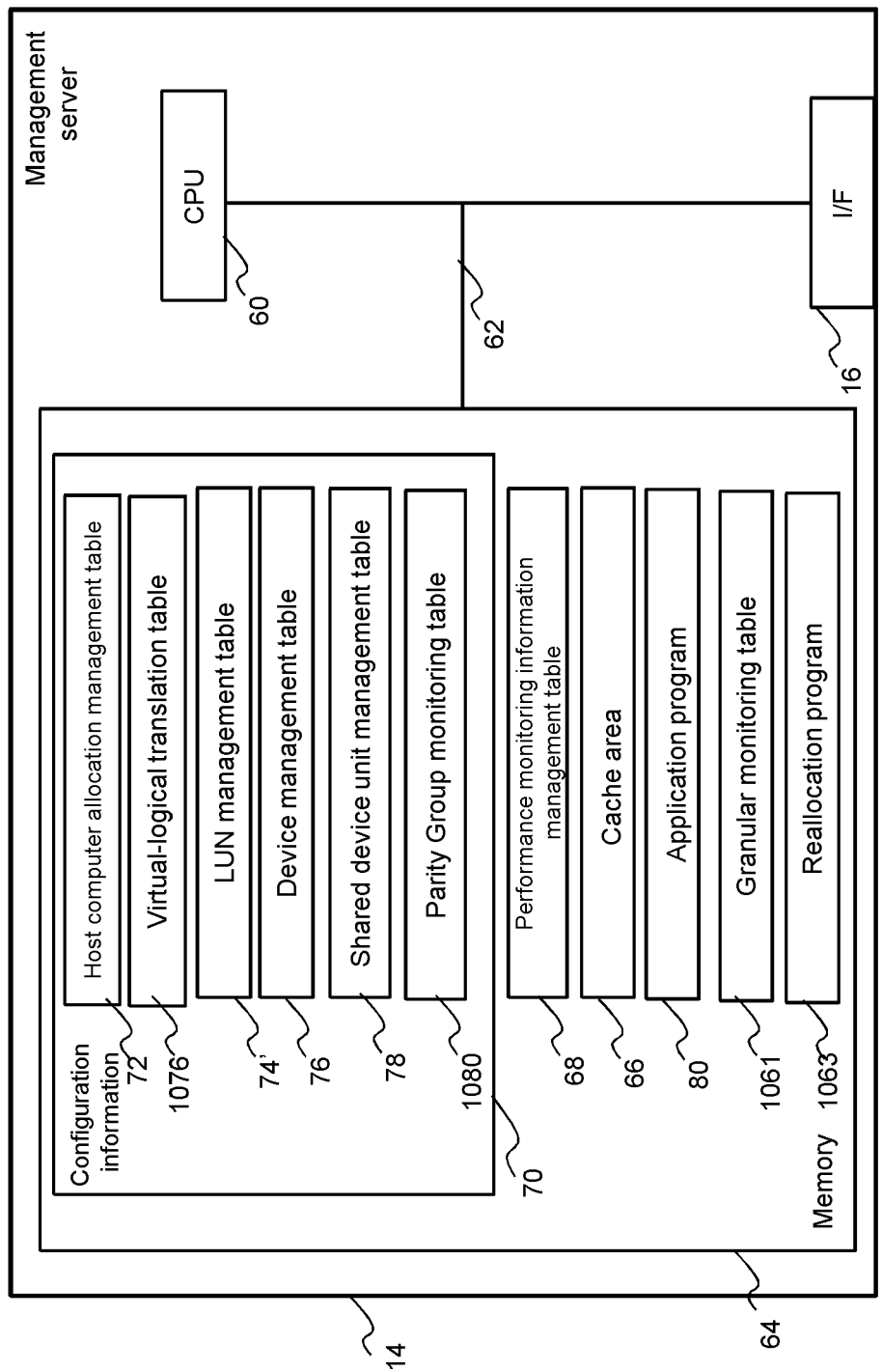
FIG. 47 is a block diagram of a management server related to the fourth example.

FIG. 47 is a block diagram of a management server related to the fourth example. The same reference signs are appended to parts, which are the same as those in the management server related to the first example shown in FIG. 4.

The management server 14 related to the fourth example, in contrast to the management server 14 related to the first example, also stores a virtual-logical translation table 1076 and a parity group monitoring table 1080 in the configuration information 70, and, in addition, also stores a granular monitoring table 1061 for managing information obtained by monitoring the number of I/Os per page, and a reallocation program 1063 for reallocating a page.

FIG. 48 is a block diagram of a LUN management table related to the fourth example. The same reference signs are appended to parts, which are the same as those in the LUN management table related to the first example shown in FIG. 6.

The LUN management table 74' related to the fourth example manages a host LUN 102a, an internal LUN 102b, a size 102c, and an owner storage system number 102g, but does not manage the parity group number 102d, the RAID level 102e, and the first physical address 102f, which are managed in the shared LUN management table 102 of the LUN management table 74 related to the first example, as these parts are managed separately. The LUN management table 74' related to the fourth example manages the LUNs corresponding to the LUs of both the shared device unit 34 and the exclusive device unit 36 without making a distinction between the two.

FIG. 49 is a block diagram of a virtual-logical translation table related to the fourth example.

The virtual-logical translation table 1076 manages a page number (#) 1076a, an internal LUN 1076b, a virtual address 1076c, a pool number (#) 1076d, a parity group number (#) 1076e, and a physical address 1076f. The page number 1076a is the number for identifying a page. The internal LUN 1076b is the identifier of the internal LUN to which the page corresponding to the page number 1076a belongs. The virtual address 1076c corresponds to a page, which is recognized by the host computer. The pool number 1076d is the identifier of the pool from which the page is provided. The parity group number 1076e is the number of the parity group to which the page belongs. The physical address 1076f shows the physical data storage location in the device in which the page data is stored. In a case where the device in which the data is stored is a flash drive 550, the logical address in the flash drive 550 is stored in the physical address 1076f.

Figures 50, 51:
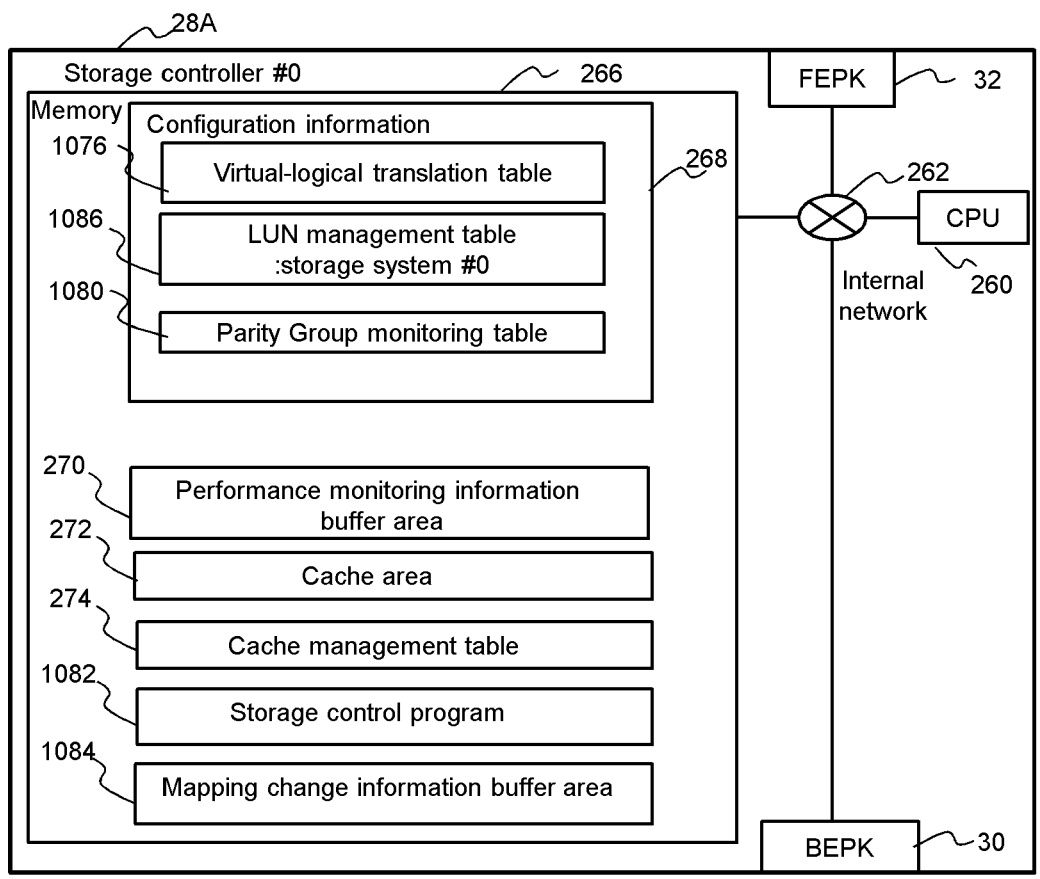
FIG. 50 is a block diagram of a granular monitoring table related to the fourth example.
FIG. 51 is a block diagram of a storage controller related to the fourth example.

FIG. 50 is a block diagram of a granular monitoring table related to the fourth example.

The granular monitoring table 1061 manages monitoring information used for determining a page reallocation. The granular monitoring table 1061 manages a page number (#) 1061a, the internal LUN 1061b, a virtual address 1061c, and a number of I/Os 1061d. The page number 1061a is the number, which identifies a page. The internal LUN 1061b is the identification number of the internal LUN to which the page corresponding to the page number 1061a belongs. The virtual address 1061c is the virtual address corresponding to the page recognized by the host computer. The number of I/Os 1061d is the number of times that an I/O processing request has been issued for the page.

FIG. 51 is a block diagram of a storage controller related to the fourth example. The same reference signs are appended to parts, which are the same as those in the storage controller related to the first example shown in FIG. 17.

In the storage controller 28 related to the fourth example, in contrast to the storage controller 28 related to the first example, a virtual-logical translation table 1076, a LUN management table 1086, and a parity group monitoring table 1080 are added to the configuration information 268. The storage controller 28 related to the fourth example stores a storage control program 1082 instead of the storage control program 274 in the storage controller 28 related to the first example, and, in addition, also stores a mapping change information buffer area 1084.

When the contents of the virtual-logical translation table 1076 have changed, the storage controller 28 performs processing for updating change information in the virtual-logical translation table 1076 of the other storage systems 18 as well. The load incurred in line with performing the update processing increases each time these contents are changed, and as such, as long as the management information used by the storage controller 28 itself basically is not in error, the storage controller 28 buffers the change contents in the mapping change information buffer area 1084 and notifies the management server 14 and the storage systems 18 at fixed intervals. This notification of the change contents is not a problem since management is performed so that a separately prepared free page is allocated at new page allocation, thereby eliminating the fear of mistakenly reserving an area, which has already been reserved by another storage system 18. The management of a free page will be explained further below using FIG. 55.

FIG. 52 is a block diagram of a LUN management table related to the fourth example.

The LUN management table 1086 is for managing the processing of a LU allocated to itself for each storage system 18. The LUN management table 1086 manages a host LUN 1086a, an internal LUN 1086b, and a size 1086c. The host LUN 1086a is the identification number of the LU recognized by the host computer 10. The internal LUN 1086b is the identification number of the LU recognized by the storage system 18. The size 1086c is the size of the LU, which corresponds to the host LUN 1086a.

FIG. 53 is a block diagram of a parity group monitoring table related to the fourth example.

The parity group monitoring table 1080 is for managing which Tier a parity group is to be recognized as. The parity group monitoring table 1080 manages a parity group number 1080a, a Tier 1080b, and a pool number 1080c. The parity group number 1080a is the number of a parity group. The Tier 1080b is information showing a Tier layer. The pool number 1080c is the identification number of the pool to which the parity group belongs.

FIG. 54 is a block diagram of configuration management information related to the fourth example.

Configuration information 202' comprises Tier configuration management information 1090 (1090A, 1090B, and so forth) for managing an allocation for each Tier. The Tier configuration management information 1090 manages a parity group number (#) 1090a and a page number (#) 1090b. The parity group number 1090a is the number of a parity group. The page number 1090b is the number of a page in the parity group.

Figure 55:
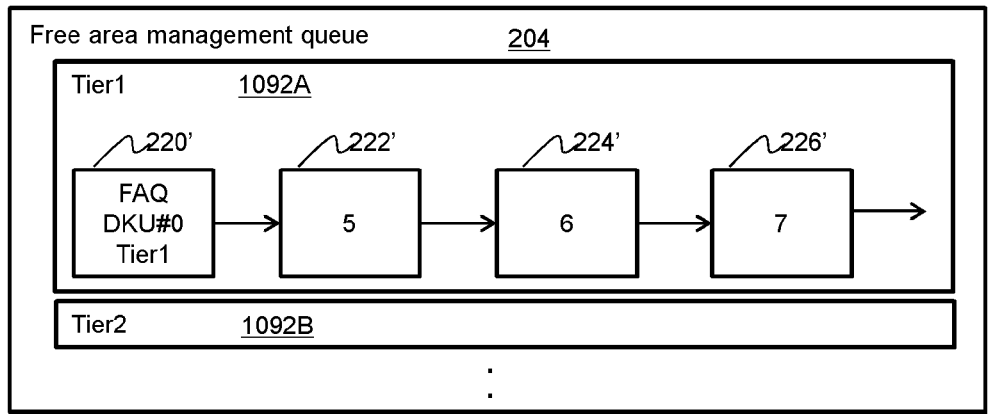
FIG. 55 is a block diagram of a free area management queue related to the fourth example.

FIG. 55 is a block diagram of a free area management queue related to the fourth example.

The free area management queue 204 is similar to the free area management queue 204 related to the first example shown in FIG. 13, but comprises a Tier free area management queue 1092 (1092A, 1092B, and so forth) for managing a free area for each Tier, and uses a page unit as the unit of the entry for managing a free area. In the example shown in FIG. 55, the entry 222', which shows the page "5", is coupled to the start 220' of the Tier free area management queue 1092A of Tier 1, and subsequent to that, the entry 224' showing the page "6" is coupled, and, in addition, the entry 226' showing the page "7" is coupled. According to this Tier free area management queue 1092A, it is clear that pages "5", "6", and "7" are free areas.

Figure 56:
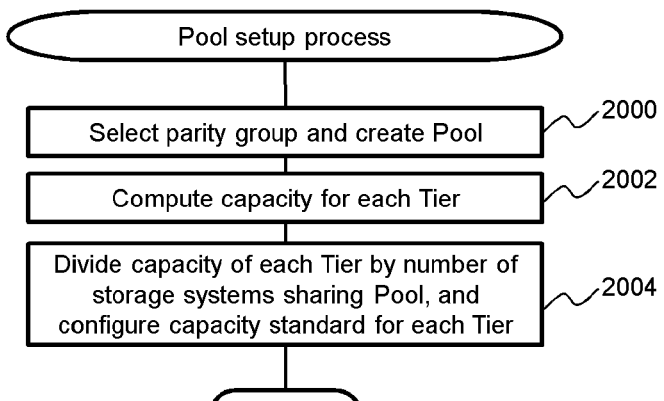
FIG. 56 is a flowchart of a Pool setup process related to the fourth example.

FIG. 56 is a flowchart of a Pool setup process related to the fourth example.

Initially, in Step 2000, the management server 14 receives a selection of a parity group to be added to the Pool. Next, in Step 2002, the management server 14 calculates the capacity to be allocated to the Tier based on the added parity group information.

Lastly, in Step 2004, the management server 14 divides the capacity of each Tier by the number of storage systems 18 capable of accessing the Pool, and configures a capacity standard for each Tier. In the tiered storage virtualization function, a trigger for determining the implementation of a page reallocation could be either a case in which a Tier data storable capacity exceeds an upper limit, or a case in which a Tier-supportable performance value exceeds an upper limit. The capacity standard is for establishing the upper limit of a data storable capacity for the former.

Regarding a new allocation, the management server 14 allocates a page as needed the same as in an ordinary thin provisioning function. A page can be allocated using the same method as in the past provided the Pool has been defined.

Figure 57:
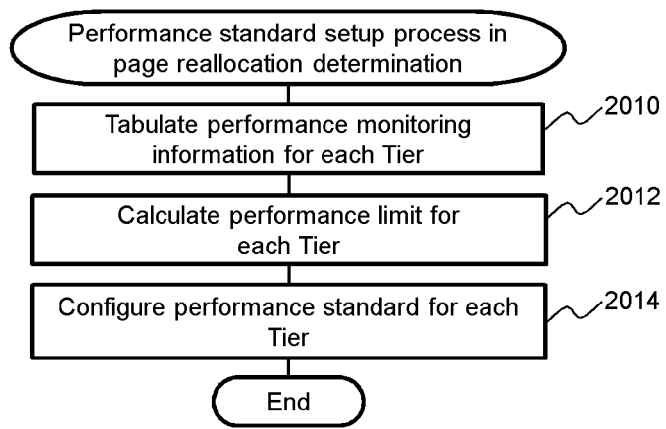
FIG. 57 is a flowchart of a performance standard setup process related to the fourth example.

FIG. 57 is a flowchart of a performance standard setup process related to the fourth example.

The performance standard setup process is for deciding a performance value, which can be supported by a Tier.

Initially, in Step 2010, the management server 14 tabulates the performance monitoring information for each Tier. The performance monitoring information makes use of information in the performance monitoring information management table 68.

Next, in Step 2012, the management server 14 calculates the performance limit for each Tier. The performance limit can be calculated based on the value tabulated in Step 2010 and the CPU utilization rate and so forth. A method for calculating the performance limit is disclosed in WO 2011/001775.

Lastly, in Step 2014, the management server 14 configures the performance standard for each Tier and ends the performance standard setup process.

Figure 58:
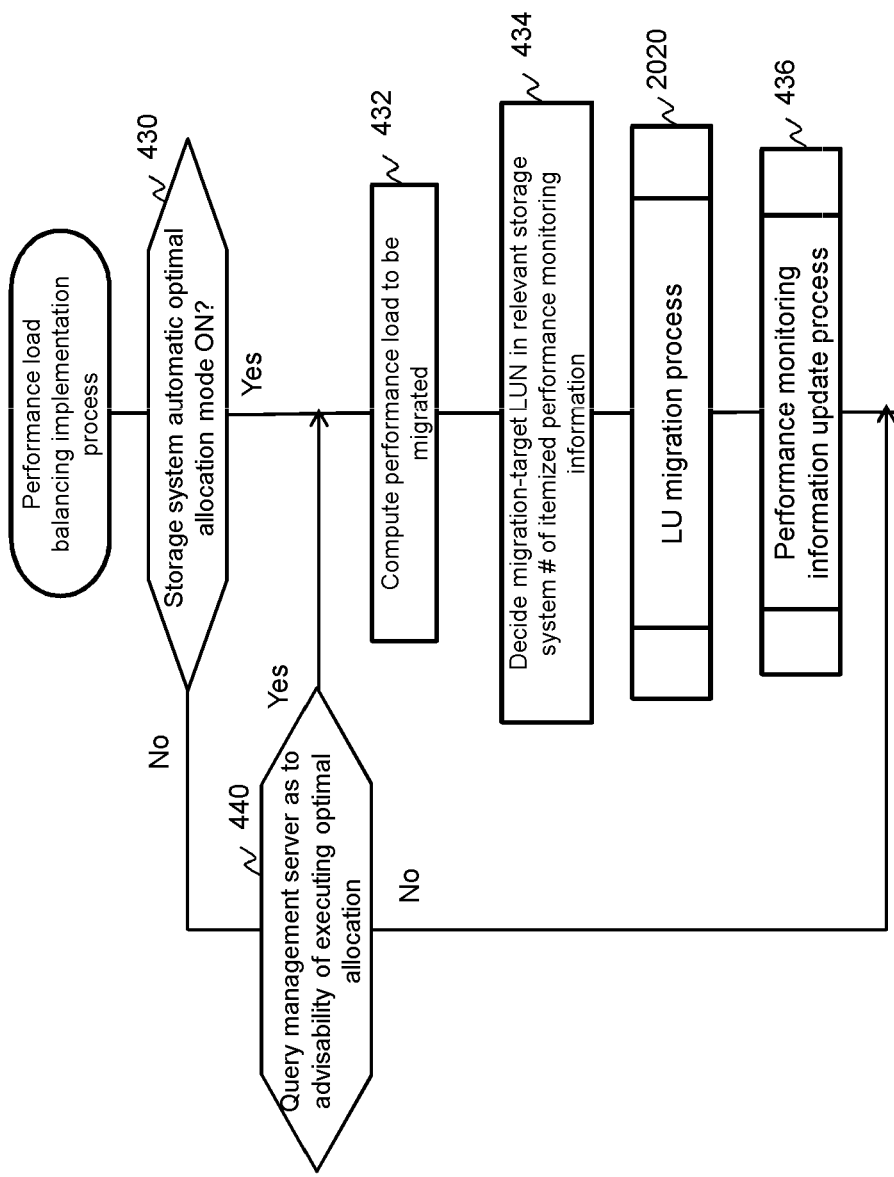
FIG. 58 is a flowchart of a performance load balancing implementation process related to the fourth example.

FIG. 58 is a flowchart of a performance load balancing implementation process related to the fourth example. The same reference signs are appended to parts, which are the same as those in the performance load balancing implementation process related to the first example shown in FIG. 30.

In the performance load balancing implementation process related to the fourth example, the management server 14 executes the LU migration process shown in Step 2020 (refer to FIG. 59) instead of Step 438 of the performance load balancing implementation process related to the first example.

Figure 59:
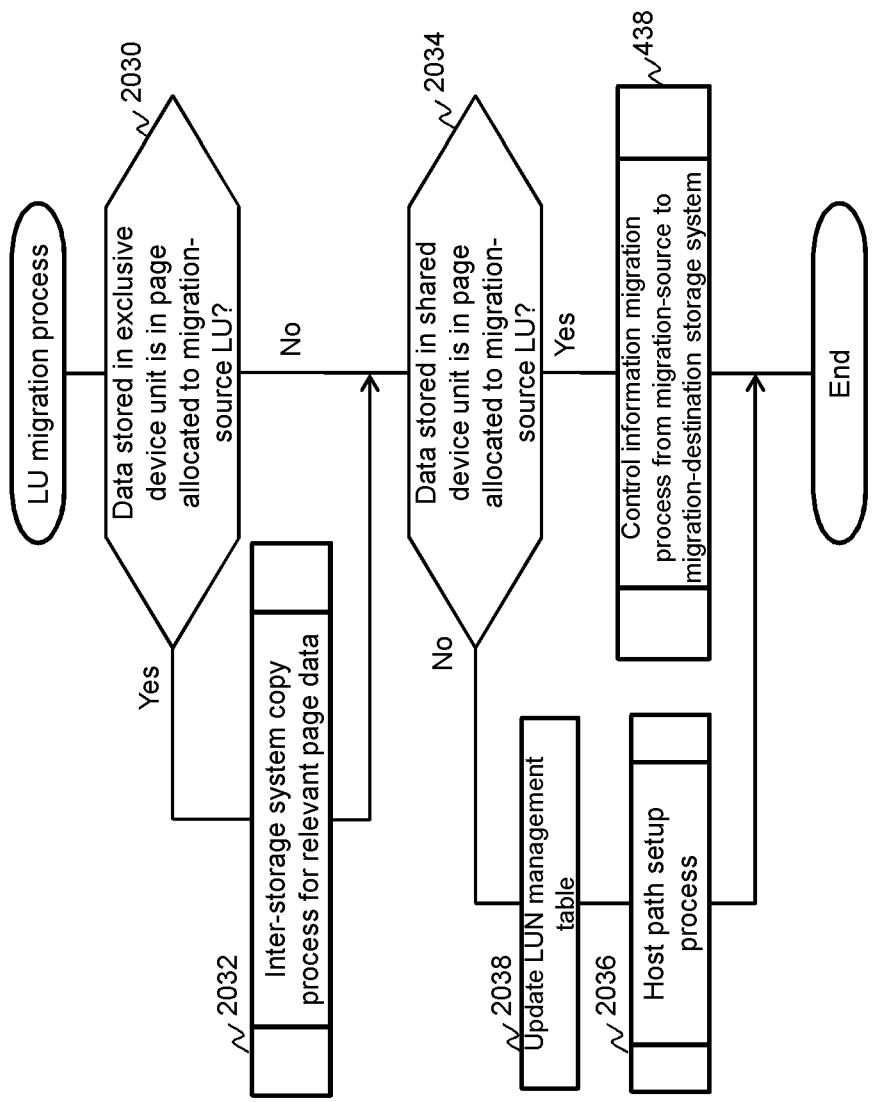
FIG. 59 is a flowchart of a LU migration process related to the fourth example.

FIG. 59 is a flowchart of a LU migration process related to the fourth example.

The LU migration process corresponds to the Step 2020 of FIG. 58.

Initially, in Step 2030, the management server 14 determines whether or not data stored in the exclusive device unit 36 exists in the page allocated to the migration-source LU.

In a case where the result is that the data stored in the exclusive device unit 36 exists in the page allocated to the migration-source LU (Step 2030: Yes), in Step 2032, the management server 14 executes a copy process (refer to FIG. 60) for copying the data of the relevant page between the storage systems.

Alternatively, either in a case where the data stored in the exclusive device unit 36 does not exist in the page allocated to the migration-source LU (Step 2030: No), or after Step 2032 has ended, in Step 2034, the management server 14 determines whether or not data stored in the shared device unit 34 exists in the page allocated to the migration-source LU.

In a case where the result is that the data stored in the shared device unit 34 does not exist in the page allocated to the migration-source LU (Step 2034: No), in Step 2038, the management server 14 updates the LUN management table of the migration-destination storage system, in Step 2036, executes a host path setup process for configuring a host path (refer to FIG. 61), and ends the LU migration process.

Alternatively, in a case where the data stored in the shared device unit 34 exists in the page allocated to the migration-source LU (Step 2034: Yes), in Step 438, the management server 14 performs a control information migration process from the migration-source to the migration-destination storage system, and ends the LU migration process. The control information migration process of Step 438 is basically as shown in FIG. 31, but the migration-source LUN does not exist in the LUN management table of the migration-destination storage system. Consequently, the management information of the relevant LUN must be added to the LUN management table of the migration-destination storage system.

Figure 60:
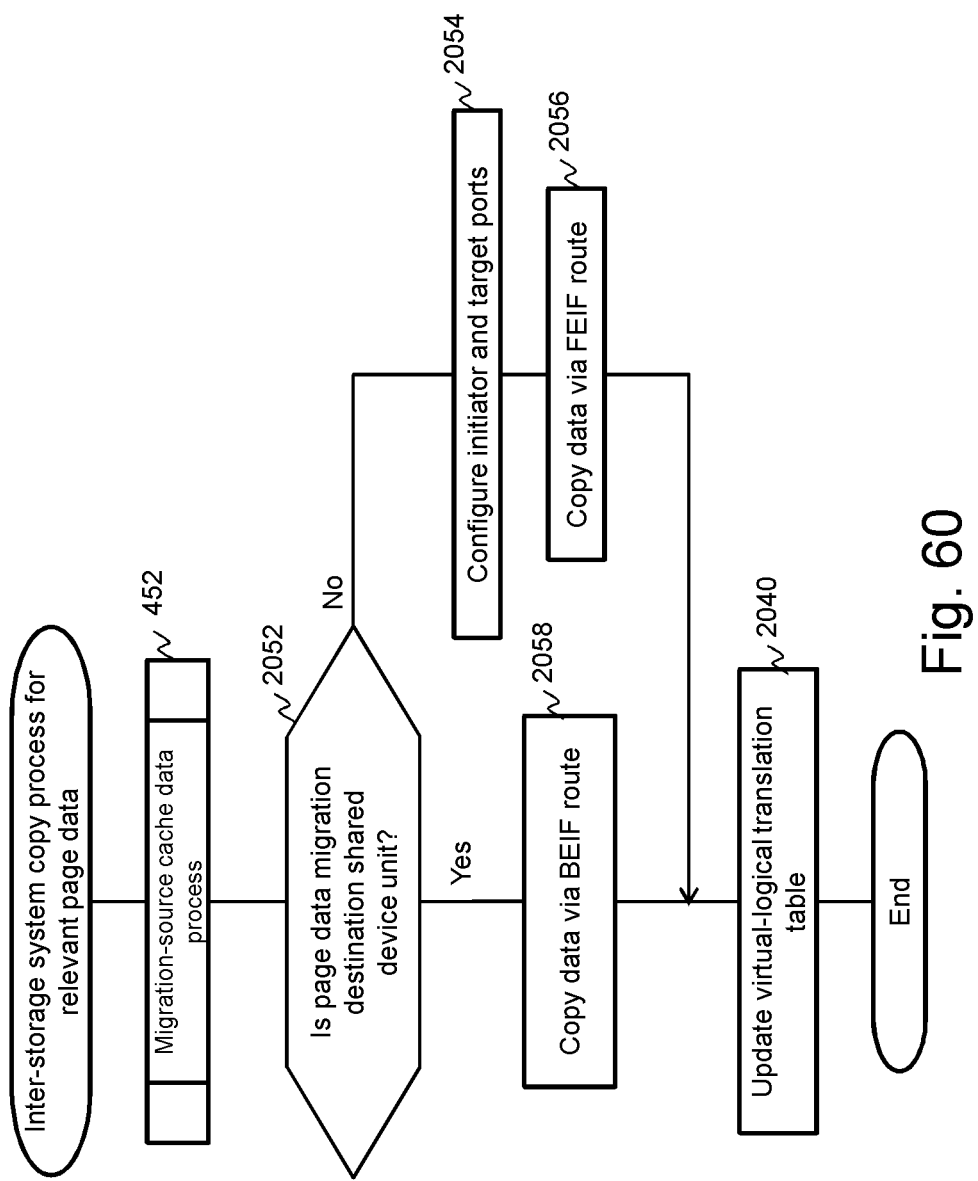
FIG. 60 is a flowchart of a copy process related to the fourth example.

FIG. 60 is a flowchart of a copy process related to the fourth example.

The copy process corresponds to Step 2032 of FIG. 59.

Initially, in Step 452, the management server 14 performs a migration-source cache data process. The migration-source cache data process is the same processing as that of Step 452 of FIG. 31 related to the first example, and, specifically, the migration-source cache data process comprises a migration-source cache directory cleaning process (refer to FIG. 32) and a migration-destination cache directory dirtying process (refer to FIG. 33).

Next, in Step 2052, the management server 14 determines whether or not the data migration destination of the relevant page is the shared device unit 34.

In a case where the result is that the relevant page data migration destination is the shared device unit 34 (Step 2052: Yes), in Step 2058, the management server 14 copies the data by way of the BEPK 30 of the storage controller 28.

Alternatively, in a case where the relevant page data migration destination is not the shared device unit 34 (Step 2052: No), in Step 2054, the management server 14 configures the initiator port and the target port of the FEPK 32. Next, in Step 2056, the management server 14 copies the data via the network 26 from the FEPK 32.

Lastly, either after Step 2058 has ended, or after Step 2056 has ended, in Step 2040, since the page migration has occurred, the management server 14 updates the virtual-logical translation table 1076 to contents that correspond to the page migration, and ends the copy process.

Figure 61:
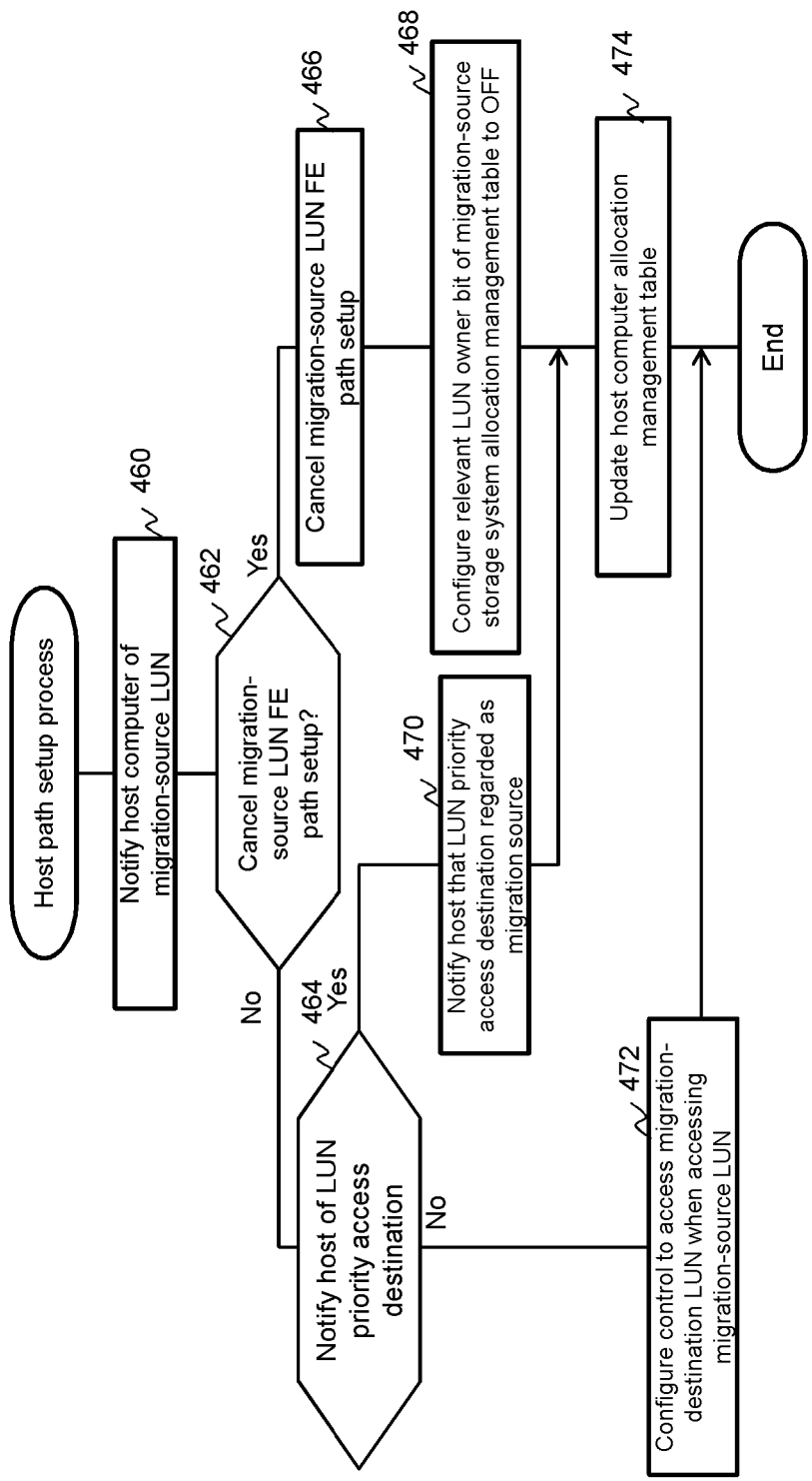
FIG. 61 is a flowchart of a host path setup process related to the fourth example.

FIG. 61 is a flowchart of a host path setup process related to the fourth example.

The host path setup process is the same processing as that during and subsequent to Step 462 of the control information migration process related to the first example shown in FIG. 31.

A number of examples have been explained hereinabove, but these are examples for illustrating the present invention, and do not purport to limit the scope of the present invention solely to these examples. That is, the present invention can be put into practice using various other modes. For example, each storage system 18 may comprise a switch 38, which is coupled to the switch 38 of the shared device unit 34. This can be expected to enhance connectivity.

REFERENCE SIGNS LIST

14 Management server
18, 18A, 18B, 18C Storage system
34 Shared device unit

The invention claimed is:

1. A storage system comprising:
a plurality of storage systems including at least a first storage system having a first storage controller and a second storage system having a second storage controller; and
a shared storage device whose storage areas provide a pool and are coupled to each of the plurality of storage systems,
wherein a first storage area in the pool is allocated to a first virtual logical unit for storing data to the first virtual logical unit and a second storage area in the pool is allocated to a second virtual logical unit for storing data to the second virtual logical unit,
wherein the first virtual logical unit is a logical unit provided by the first storage controller to a first host computer and the second virtual logical unit is a logical unit provided by the second storage controller to a second host computer.

2. The storage system according to claim 1:
further including a management system which
is configured to store allocation management information which comprises an ID for the storage area in the pool allocated to a virtual logical unit and an ID for one of the plurality of storage systems providing the virtual logical unit to which the storage area is allocated.

3. The storage system according to claim 1:
wherein at least one of the plurality of storage systems includes an exclusive storage device,
and either a storage area in the exclusive storage device or the pool is allocated to the virtual logical unit for storing data.

4. The storage system according to claim 3:
wherein the storage areas providing pool and storage areas in the exclusive storage device comprise a plurality of tiers.

5. The storage system according to claim 4:
wherein a management system is configured to select a logical unit (LU) provided by a first one of the storage systems as a migration source LU based on a performance load of the first one of the storage devices,
migrate the migration source LU to a second one of the storage systems selected based on a performance load of the second one of the storage systems,
wherein the migration source LU and the migration destination LU belong to the same tier.

6. The storage system according to claim 5:
wherein the migration source LU whose data is stored in the shared storage device is migrated by migrating control information with respect to the migration source LU from the first one of the storage systems to the second one of the storage devices.

7. The storage system according to claim 5:
wherein the migration source LU whose data is stored in the exclusive storage device is migrated by copying the data of the migration source LU to the second one of the storage systems.

8. A storage control method for operating a storage system having a plurality of storage systems including at least a first storage system having a first storage controller and a second storage system having a second storage controller, and having a shared storage device whose storage areas provide a pool and are coupled to each of the plurality of storage systems, the method comprising:
allocating a first storage area in the pool to a first virtual logical unit for storing data to the first virtual logical unit, the first virtual logical unit being a virtual logical unit provided by the first storage controller to a first host computer,
allocating a second storage area in the pool to a second virtual logical unit for storing data to the second virtual logical unit, the second virtual logical unit being a virtual volume provided by the second storage controller to a second host computer.

9. The storage control method according to claim 8, further comprising:
storing, by a management system of the storage system, allocation management information which comprises an ID for the storage area in the pool allocated to a virtual logical unit and an ID for one of the plurality of storage systems providing the virtual logical unit to which the storage area is allocated.

10. The storage control method according to claim 8:
wherein at least one of the plurality of storage systems includes an exclusive storage device,
and either a storage area in the exclusive storage device or the pool is allocated to the virtual logical unit for storing data.

11. The storage control method according to claim 10,
wherein the storage areas providing pool and storage areas in the exclusive storage device comprises a plurality of tiers.

12. The storage control method according to claim 11, further comprising:
selecting, by a management system, a logical unit (LU) provided by a first one of the storage systems as a migration source LU based on a performance load of the first one of the storage devices,
migrating the migration source LU to a second one of the storage systems selected based on a performance load of the second one of the storage systems,
wherein the migration source LU and the migration destination LU belong to the same tier.

13. The storage system according to claim 12:
migrating the migration source LU whose data is stored in the shared storage device by migrating control information with respect to the migration source LU from the first one of the storage systems to the second one of the storage devices.

14. The storage control method according to claim 12:
migrating the migration source LU whose data is stored in the exclusive storage device by copying the data of the migration source LU to the second one of the storage systems.

15. The storage control method according to claim 4:
wherein the data in the logical unit is migrated between the tiers based on the access frequency of the data.

16. The storage control method according to claim 11:
wherein the data in the logical unit is migrated between the tiers based on the access frequency of the data.

* * * * *